(12) United States Patent
Perry et al.

(10) Patent No.: US 7,992,177 B2
(45) Date of Patent: Aug. 2, 2011

(54) POINT-TO-MULTIPOINT HIGH DEFINITION MULTIMEDIA TRANSMITTER AND RECEIVER

(75) Inventors: Jedd Perry, Monroe, WA (US); James Pursel, Fort Collins, CO (US); Lawrence Lo, Issaquah, WA (US); Phil Kent, Monroe, WA (US); Bob Seifert, Redmond, WA (US); Luis Reyes, Woodinville, WA (US); Jeff Fore, Snohomish, WA (US); Wes Wirth, Seattle, WA (US); Doug Collins, Tacoma, WA (US); John Hoskyn, Redmond, WA (US); Edwin Wong, Bellevue, WA (US); Mike Straub, Boca Raton, FL (US); John Reed, Concord, NC (US); Keith Schuettpelz, Coral Springs, FL (US); Karl Mills, Lynnwood, WA (US)

(73) Assignee: Avocent Huntsville Corporation, Huntsville, CA (US)

( * ) Notice: Subject to any disclaimer, the term of this patent is extended or adjusted under 35 U.S.C. 154(b) by 742 days.

(21) Appl. No.: 11/896,970

(22) Filed: Sep. 7, 2007

(65) Prior Publication Data
US 2008/0172708 A1    Jul. 17, 2008

Related U.S. Application Data

(60) Provisional application No. 60/842,706, filed on Sep. 7, 2006.

(51) Int. Cl.
*H04N 7/18* (2006.01)
*H04L 9/32* (2006.01)
*G06F 1/12* (2006.01)
*H04J 3/00* (2006.01)
*G04B 18/00* (2006.01)
*G04B 9/00* (2006.01)

(52) U.S. Cl. ............... 725/81; 725/74; 725/78; 725/110; 725/118; 725/149; 713/178; 713/400; 370/464; 368/201; 368/211

(58) Field of Classification Search .................. None
See application file for complete search history.

(56) References Cited

U.S. PATENT DOCUMENTS

| | | | |
|---|---|---|---|
| 5,243,415 A | 9/1993 | Vance | |
| 5,670,958 A | 9/1997 | Hauser et al. | |
| 6,125,365 A | 9/2000 | Nakatsugawa | |
| 6,972,661 B2 | 12/2005 | Wang | |
| 7,392,301 B1 | 6/2008 | Perry et al. | |
| 2004/0068744 A1 | 4/2004 | Claussen et al. | |
| 2004/0187164 A1* | 9/2004 | Kandasamy et al. | 725/132 |
| 2005/0060760 A1 | 3/2005 | Jaffe et al. | |

(Continued)

OTHER PUBLICATIONS

International Search Report and Written Opinion mailed Feb. 26, 2008 in appln. No. PCT/US2007/019542.

(Continued)

*Primary Examiner* — Hunter B. Lonsberry
*Assistant Examiner* — James R Marandi
(74) *Attorney, Agent, or Firm* — Davidson Berquist Jackson & Gowdey, LLP

(57) ABSTRACT

A high definition video transmitter and receiver are disclosed. The transmitter provides high definition video to a one-point receiver or to multipoint receivers. The transmission network is asynchronous and the receiver re-synchronizes the video. The transmission can be wired or wireless.

20 Claims, 64 Drawing Sheets

U.S. PATENT DOCUMENTS

| | | | |
|---|---|---|---|
| 2005/0105498 A1 | 5/2005 | Hardacker et al. | |
| 2005/0135304 A1 | 6/2005 | Wentlink et al. | |
| 2006/0095472 A1 | 5/2006 | Krikorian et al. | |
| 2006/0110067 A1 | 5/2006 | Kahan | |
| 2006/0117367 A1* | 6/2006 | Lyle | 725/114 |
| 2006/0123053 A1 | 6/2006 | Scannell, Jr. | |
| 2006/0209745 A1 | 9/2006 | MacMullan et al. | |
| 2006/0271954 A1 | 11/2006 | Lankford et al. | |
| 2007/0165997 A1 | 7/2007 | Suzuki et al. | |

OTHER PUBLICATIONS

"RTP extension for Scalable Reliable Multicast", by Peter Parnes, Internet Engineering Task Force, Internet-Draft, "draft-parnes-rtp-ext-srm-00.txt," dated Nov. 16, 1996.

Emerge MPX1500 HD Multipoint Extender: Installer/User Guide (590-906-501A), 2008.

U.S. Appl. No. 11/931,301 Jan. 4, 2011 PTO Office Action.
U.S. Appl. No. 11/931,349 Jan. 4, 2011 PTO Office Action.
U.S. Appl. No. 11/931,417 Jan. 4, 2011 PTO Office Action.
U.S. Appl. No. 11/931,454 Jan. 4, 2011 PTO Office Action.
U.S. Appl. No. 12/254,124 Feb. 18, 2011 PTO Office Action.
U.S. Appl. No. 11/931,301 Jun. 23, 2010 PTO Office Action.
U.S. Appl. No. 11/931,417 Jun. 23, 2010 PTO Office Action.
U.S. Appl. No. 11/931,349 Jul. 9, 2010 PTO Office Action.
U.S. Appl. No. 11/931,454 Jul. 9, 2010 PTO Office Action.
RFC1889: RTP: A Transport Protocol for Real-Time Applications, Jan. 1996.

* cited by examiner

| Video Header (32 bytes) | ADV202 Header (16 bytes) | JPEG2000 Compliant Header | Codeblock 1 Attribute Data | Codeblock n Attribute Data | Compressed Data |
|---|---|---|---|---|---|

Figure 28

| Big Endian Byte Offset | Number of Bytes | Description |
|---|---|---|
| 0x0 | 4 | Timestamp <br> A 32-bit counter value placed by the FPGA, representing the sampling instant of the first byte of the video frame. |
| 0x4 | 4 | Frame Number <br> A 32-bit counter, starting at zero and incrementing for each video frame. |
| 0x8 | 4 | Data Packet Count <br> The number of 'blocks' contained within the entire video frame. |
| 0xC | 4 | Reserved |
| 0x10 | 4 | Y/C Order |
| 0x14 | 4 | Y Size |
| 0x18 | 4 | C Size |
| 0x1C | 4 | Reserved |

Figure 29

| Big Endian Byte Offset | Number of Bytes | Description |
|---|---|---|
| 0x0 | 4 | Field Header<br>0xFFFFFFF0 = even field delimiter<br>0xFFFFFFF1 = odd field delimiter |
| 0x4 | 4 | Compressed image index in captured stream. Starting with 0, and incrementing for each successive image that is captured during the encode session. |
| 0x8 | 1 | Output code stream format – COD_STYLE parameter setting:<br>bit 0 = ADV202 Raw Format<br>bit 1 = J2C Format<br>bit 2 = Jp2 Format<br>bit 3 = 1 = ADV202 header not generated<br>bit 3 = 0 = ADV202 header generated<br>bit 4 to 7 only valid with J2c or Jp2 format, otherwise these bits must all be 0.<br>bit 4 = 1 = Include EPH<br>bit 4 = 0 = EPH not included<br>bit 5 = 1 = Include SOP<br>bit 5 = 0 = SOP not included<br>bit 6 = 1 = Include PLT<br>bit 6 = 0 = PLT not included<br>bit 7 = 1 = include PPT<br>bit 7 = 0 = Packet headers with Packet Body |
| 0x9 | 1 | VFORMAT parameter:<br>0 = NTSC 4:2:2<br>1 = PAL 4:2:2<br>2 = 1080i Luminance<br>3 = 1080i Chrominance<br>4 = Custom specific<br>5 = 720p/60 Luminance<br>6 = 720p/60 Chrominance<br>8 = NTSC de-interlaced<br>9 = PAL de-interlaced |
| 0xA | 1 | Reserved (0x00) |
| 0xB | 1 | Header version:<br>0x02 for encode firmware with App ID = 0xFF82 |
| 0xC | 4 | Size of compressed data<br>Number of 32-bit words in compressed data andattribute data. This does not include this 16 byte ADV202 header. |

Figure 30

| JPEG2000 Compliant Marker | Description |
| --- | --- |
| FF4F | SOC - Start of Code |
| FF52 | COD – Contains information about the coding style |
| FF5C | QCD Contains information about the Quantization used |
| FF90 | SOT – This marker follows immediately the SOC marker and contains information about the input image/title size |
| FFD9 | EOC – End of codestream. Can be found at the end of a field and will always be the last mrker in the codestream. |

Figure 31

| Audio Header (20 bytes) | Audio Data |
| --- | --- |

Figure 32

| Big Endian Byte Offset | Number of Bytes | Description |
|---|---|---|
| 0x0 | 4 | Timestamp <br> A 32-bit counter value placed by the FPGA, representing the sampling instant of the first byte of the audio frame. |
| 0x4 | 4 | Frame Number <br> A 32-bit counter, starting at zero and incrementing for each audio frame. |
| 0x8 | 4 | Data Packet Count <br> The number of 'blocks' contained within the entire audio frame. |
| 0xC | 3 | N Value – For audio clock regeneration |
| 0xF | 3 | CTS Value – For audio clock regeneration |
| 0x12 | 4 | Reserved |

Figure 33

| DDR MEMORY CONFIGURATION After boot( bit 31 of the Boot Configuration Register = 0) CS0 |||||||
|---|---|---|---|---|---|
| Start Addr | End Addr | Data width | Memory Size | Technology | Use |
| 0000_0000 | 003FF_FFFF | 32bits | 64Mbytes | 16M * 16bits(256Mbit)* 2 Chips | Kernal, Application Code, Memory |
| 0000_0000 | 07FF_FFFF | 32bits | 128Mbytes | 32M * 16bits(512Mbit) * 2 Chips | Kernal, Application Code, Memory |
| 0000_0000 | 0FFF_FFFF | 32bits | 256Mbytes | 64M * 16bits(1Gbit♣) * 2 Chips | Kernal, Application Code, Memory |
|  |  |  |  | ♣ requires optional resistor stuff on board |  |

Figure 38

| FLASH MEMORY CONFIGURATION After boot( bit 31 of the Boot Configuration Register= 1) CS0 ||||||
|---|---|---|---|---|---|
| Start Addr | End Addr | Data width | Memory Size | Technology | Use |
| 0000_0000 | 01FF_FFFF | 16bits | 32Mbytes | 16M * 16bits(256Mbit) | TAR Image of Linux Kernel and application |
| FLASH MEMORY CONFIGURATION After boot( bit 31 of the Boot Configuration Register = 0) CS0 ||||||
| Start Addr | End Addr | Data width | Memory Size | Technology | Use |
| 5000_0000 | 51FF_FFFF | 16bits | 32Mbytes | 16M * 16bits(256Mbit) | TAR Image of Linux Kernel and application |

Figure 39

| Start Addr | End Addr | Data width | Memory Size | Usage |
|---|---|---|---|---|
| 6000_0000 | 6000_0FFF* | 8bits | 4Kbytes | Expansion bus connector for Video/Audio I/O Definition of specific addresses TBD depending on future requirements |

* assumes that bit 31 of the Boot Configuration Register = 1

Figure 40

| Start Addr | End Addr | Data width | Memory Size | Note |
|---|---|---|---|---|
| 4000_0000 | 5FFF_FFFF* | 8bits | 512bytes | There is really only one location in the FPGA being written two, which is latched when CS and WR go high. Any write in this space will allow this to happen |

Figure 41

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| CSx_EN | PAR_EN | T1 | | | | T2 | | | | T3 | | | | T4 | | | | T5 | | | | CYC_TYPE | | CFNG(4:0) | | | | | Sync_Intel | EXP_CHIP | BYTE_RD16 | HRDY_POL | MUX_EN | SPLT_EN | WORD_EN | WR_EN | BYTE_EN |
| 1 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 | 0 | 1 | X | 1 | 0 | 0 | 1 | 1 |

Figure 42

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| CSx_EN | PAR_EN | T1 | | | | T2 | | | | T3 | | | | T4 | | | | T5 | | | | CYC_TYPE | | CFNG(4:0) | | | | | Sync_Intel | EXP_CHIP | BYTE_RD16 | HRDY_POL | MUX_EN | SPLT_EN | WORD_EN | WR_EN | BYTE_EN |
| 1 | 0 | 0 | 1 | 0 | 1 | 0 | 0 | 1 | 0 | 1 | 0 | 0 | 1 | 0 | 0 | 0 | 0 | 0 | 0 | 0 | 0 | 0 | 0 | 1 | X | 0 | 0 | 0 | 1 | 1 |

Figure 43

| Slot | Grant/Req Pair | ID_SEL | Function | Connector | Compatibility |
|---|---|---|---|---|---|
| 0 | Grant0/Req 0 | PCI_AD(31) | PCI to ADV202 bridge | FPGA Direct Connect | 3.3V |
| 1 | Grant1/Req 1 | PCI_AD(30) | Radio | Mini PCI Type 3 | 3.3V |
| 2 | Grant2/Req 2 | PCI_AD(29) | Expansion | Mini PCI Type 3 | 3.3V |

Figure 44

| Source | Function | Format | Min Baud Rate | Max Baud Rate | RTS/CTS | FIFO |
|---|---|---|---|---|---|---|
| IXP455 | Linux Debug Port | N:8:1 | 1200 | 921600 | No | 64 rec/snd |
| IXP455 | Front Panel I/O | N:8:1 | 1200 | 921600 | Yes | 64 rec/snd |
| FPGA | ZIGBEE | N:8:1 | 1200 | 115200 | Yes | 8 rec/snd |
| FPGA | Pass Through | N:8:1 | 1200 | 115200 | Yes | 8 rec/snd |

Figure 45

| GPIO | Signal | I/O | Active Level | Definition |
|---|---|---|---|---|
| 0 | CLK_USB_DEVICE | CLK Input | NA | 48MHz USB Device Clock Input (No Spread Spectrum) Required if processor clock is spread spectrum |
| 1 | CLK_USB_HOST | CLK Input | NA | 60MHz USB Device Clock Input (No Spread Spectrum) Required if processor clock is spread spectrum |
| 2 | FPGA_BUSY | Input | HIGH | High Indicates that the FPGA is not ready to take any more configuration data |
| 3 | FPGA_INIT_B | I/O | LOW | Low at the beginning of FPGA configuration |
| 4 | FPGA_PROG_B | Output | HIGH | Must be high to allow configuration to start |
| 5 | FPGA_RDWR_B | Output | LOW | Low Indicates Configuration is in Write mode |
| 6 | FP_SOFT_RESET_N | Input | LOW | Active Low indicates the front panel soft reset has been |
| 7 | FP_UP_PROGRAM_N | Output | LOW | Asserted Low to start IR processor program sequence |
| 8 | FP_UP_RESET_N | Output | LOW | After FP_UP_PROGAM_N is asserted toggle FP_UP_RESET_N to initiate upload process to the IR processor |
| 9 | UP_RESET_SW | Output | HIGH | Initiates a reset of the entire board. Power is up in stable during this reset |
| 10-16 | NC | | | |

Figure 48

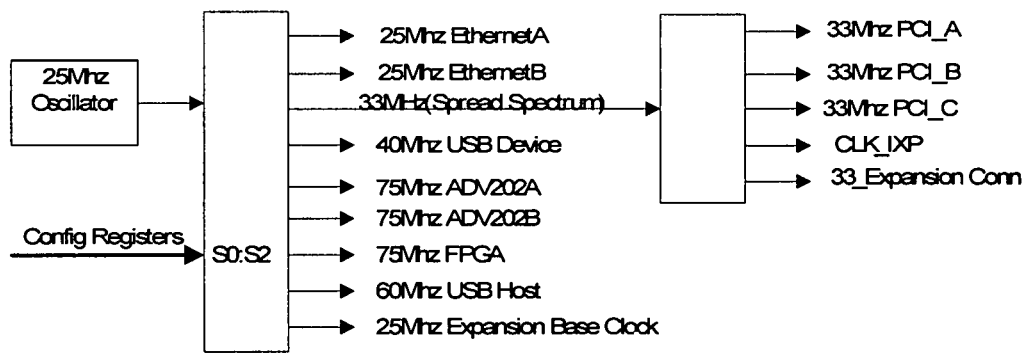

Figure 46

| | S0:S2 | REGISTER | | | | | | | |
|---|---|---|---|---|---|---|---|---|---|
| | | 1 | 2 | 3 | 4 | 5 | 6 | 7 | 8 |
| CLK_25MHZ_A | 1 | 25Mhz | 25Mhz | Off | Off | Off | Off | Off | Off |
| CLK_25MHZ_B | 2 | 25Mhz | 25Mhz | 25Mhz | 25Mhz | 25Mhz | 25Mhz | 25Mhz | 25Mhz |
| 33MHZ | 3 | 33Mhz* | 33Mhz | 33Mhz* | 33Mhz | 33Mhz* | 33Mhz | 33Mhz | 33Mhz* |
| CLK_ADV202_A | 5 | 75Mhz | 75Mhz | 75Mhz | 75Mhz | 75Mhz | 75Mhz | 75Mhz | 75Mhz |
| CLK_ADV202_B | 6 | 75Mhz | 75Mhz | 75Mhz | 75Mhz | 75Mhz | 75Mhz | 75Mhz | 75Mhz |
| CLK_FPGA_75 | 7 | 75Mhz | 75Mhz | 75Mhz | 75Mhz | 75Mhz | 75Mhz | 75Mhz | 75Mhz |
| CLK_USB_HOST | 4 | 48Mhz | 48Mhz | 48Mhz | 48Mhz | Off | 48Mhz | Off | Off |
| CLK_USB_DEV | 8 | 60Mhz | 60Mhz | 60Mhz | 60Mhz | 60Mhz | Off | Off | Off |
| CLK_EXP_BOARD_REF | 9 | 25Mhz | 25Mhz | 25Mhz | 25Mhz | 25Mhz | 25Mhz | 25Mhz | 25Mhz |
| | | * Spread Spectrum 32Khz -2% downspread On | | | | | | | |

Figure 47

| BIT | NAME | RESET VALUE | MEANING | NOTE |
|---|---|---|---|---|
| 0 | 8/16 FLASH | 0 | 18 BIT FLASH | WORKS WITH BIT 7 |
| 1 | PCI_HOST | 1 | PCI AS HOST | |
| 2 | PCI_ARB | 1 | PCI ARBITER ENABLED | |
| 3 | RESERVED | 1 | RESERVED | MUST BE HIGH AT RESET |
| 4 | PCI_CLK | 0 | 33Mhz PCI INTERFACE | |
| 5 | EXP_DRIVE | 1 | MEDIUM DRIVE | WORKS WITH BIT 9 |
| 6 | EXP_ARB | 1 | EXPANSION BUS ARBITER ENABLED | |
| 7 | 32_FLASH | 0 | 16 BIT FLASH | WORKS WITH BIT 0 |
| 8 | USB CLOCK | 0 | EXTERNALLY DRIVEN CLOCK FOR SPREAD SPECTRUM STABILITY ON USB | |
| 9 | EXP_MEM_DRIVE | 0 | MEDIUM DRIVE | WORKS WITH BIT 5 |
| 10 | IO_WAIT | 0 | IO_WAIT IS IGNORED | |
| 16:11 | RESERVED | 111111 | RESERVED | |
| 20:17 | CUSTOMER DEFINED | SEE TABLE BELOW | BOARD ID | |
| 23:21 | XSCALE CORE CLOCK | X010 | 266Mhz | |
| 30:24 | RESERVED | 1111111 | RESERVED | |
| 31 | MEM_MAP | 1 | EXPANSION BUS AT 0x0000_0000 | |

FIG. 49

| AD17 | AD18 | AD19 | AD20 | Board Rev |
|------|------|------|------|-----------|
| 0 | 0 | 0 | 0 | Rev A First Release |

Figure 50

| Signal | Function | I/O | Connects to |
|---|---|---|---|
| Y(0:7) | 4:2:2 Luminance signal to ADV202A | Bidirectional | ADV202 |
| C(0:7) | 4:2:2 Chrominance signal to ADV202B | Bidirectional | ADV202 |
| HSYNC | Horizontal Synchronization Pulse | Bidirectional | ADV202 |
| VSYNC | Vertical Synchronization Pulse | Bidirectional | ADV202 |
| DE | Data Enable for HDMI Transmitter | Bidirectional | Not Used |
| SYNC | Composite Sync Signal | Bidirectional | Not Used |
| PIXEL_CLK | Pixel Clock | Input | ADV202 |
| 25Mhz | 25Mhz Base clock for AV board | Output | Clock Synthesizer |
| 33.33Mhz | 33Mhz Base clock for AV board | Output | Clock Synthesizer |
| SPDIF_IN | SPDIF Serial Audio data in | Input | FPGA |
| SPDIF_OUT | SPDIF Serial Audio data out | Output | FPGA |
| I2S(0:3) | I2S serial Audio Data L/R channels | Bidirectional | FPGA |
| LRCLK | I2S serial Audio L/R audio clock | Bidirectional | FPGA |
| SCLK | I2S serial Audio Serial Data clock | Bidirectional | FPGA |
| MCLK | I2S serial Audio Master clock | bidirectional | FPGA |
| DAC_DOUT | Audio Digital DAC data | Output | FPGA |
| ADC_DIN | Audio Digital ADC data | Input | FPGA |
| DAC_BCLK | DAC Bit Clock | Output | FPGA |
| DAC_WCLK | DAC Word Clock | Output | FPGA |
| ADC_BCLK | ADC Bit Clock | Input | FPGA |
| ADC_WCLK | ADC Word Clock | Input | FPGA |

Figure 51A

| Signal | Function | I/O | Connects to |
|---|---|---|---|
| ENC_N | Encoder Enable | Input | FPGA |
| SCL_FPGA | I2C Clock from FPGA | Output | FPGA |
| SDA_FPGA | I2C Data from FPGA | Output | FPGA |
| HP_DETA | Hot Plug detect A | Bidirectional | FPGA |
| HP_DETB | Hot Plug detect A | Bidirectional | FPGA |
| PCI_D_CLK | Serial Pixel Clock to strobe data bits | Output | FPGA |
| PCL_LOAD | Pixel Clock Load Signal | Output | FPGA |
| PCLK_DATA | Pixel Clock Data | Output | FPGA |
| CEC | HDMI Control channel | Bidirectional | FPGA |
| SCL_IXP455 | I2C clock from IXP455 used to determine version of AV module plugged in | | IXP455 |
| SDA_IXP455 | I2C Data from IXP455 used to determine version of AV module plugged in | | IXP455 |
| EXP_BOARD_INT_N | Interupt signal from AV Board | Input | FPGA |
| SPI_DIN | Serial peripherial Interface Data in | Input | IXP455 |
| SPI_DOUT | Serial peripherial Interface Data Out | Output | IXP455 |
| AV(0:2) | General Purpose I/O | Bidirectional | FPGA |
| EX_RD_N | Expansion bus read | Output | IXP455 |
| EX_WR_N | Expansion bus write | Output | IXP455 |
| EX_ALE | Expansion bus ALE | Output | IXP455 |
| EX_CS_N | Chip Select #3 From IXP455 | Output | IXP455 |
| EX_DATA(0:11) | Expansion bus address/data bus | Bidirectional | IXP455 |
| VBAT | Battery back up power for the real time clock | Input | LPC2103 IR processor |
| GND | Signal Ground | Ground | |
| 3.3V | 3.3V supply | | |
| 2.5V | 2.5V supply 1A max | | |
| 1.8V | 1.8V supply 2A max | | |

Figure 51B

| Field Name | Offset | Length | Description |
|---|---|---|---|
| Start of Header | 0 | 4 | 0x41, 0x4C, 0x49, 0x50 ("ALIP") Protocol Name. |
| Version | 4 | 2 | 0x01, 0x00 (1.0) Protocol Version. |
| Sequence Number | 6 | 2 | Sequence number for matching request/confirmation and indication/response pairs. |
| Message Type | 8 | 2 | Type code for the message. |
| Length | 10 | 2 | Length of entire message including the header. Minimum length is 12. |

Figure 55

| Status Code | Value | Description |
|---|---|---|
| SUCCESS | 0 | Command successful |
| ALIP_REASON_UNKNOWN | 1 | Unspecified reason. |
| ALIP_REASON_TOO_MANY_RECEIVERS | 2 | Number of receivers in the network has exceeded limit (currently 8). |
| ALREADY_JOINED | 3 | A receiver with the given MAC is already connected |
| ALIP_REASON_MAC_NOT_APPROVED | 4 | The MAC address of the receiver is not on the approved list. |
| ALIP_REASON_OEM_MISMATCH | 5 | The OEM code of the receiver does not match that of the transmitter. |
| ALIP_REASON_SYS_TYPE_MISMATCH | 6 | The system type of the receiver does not match that of the transmitter. |

Figure 56

| Field Name | Offset | Length | Description |
|---|---|---|---|
| OEM Code | 12 | 1 | An enumeration identifying the OEM of the transmitter. |
| Product Type | 13 | 1 | An enumeration identifying the product type of the transmitter. |
| Transmitter MAC Address | 14 | 6 | A byte-array containing the MAC address identifying the transmitter.<br>When the transmitter has more than one network interface, it is application specific as to which MAC address is used here. For example, it can always use the Ethernet MAC address regardless to which interface actually carries this message (Ethernet or wireless.) |
| Transmitter IP Address | 20 | 16 | A byte-array containing the IP address of the transmitter.<br>For IPv4, only the first 4 bytes are used. |
| Subnet Mask | 36 | 16 | A byte-array containing the subnet mask of the network.<br>For IPv4, only the first 4 bytes are used. |

Figure 57

| Field Name | Offset | Length | Description |
|---|---|---|---|
| OEM Code | 12 | 1 | An enumeration identifying the OEM of the receiver. |
| Product Type | 13 | 1 | An enumeration identifying the product type of the receiver. |
| Transmitter MAC Address | 14 | 6 | A byte-array containing the MAC address of the transmitter to which this request is targeted. A receiver obtains this field from ALIP_PROBE_CFM. |
| Receiver MAC Address | 20 | 6 | A byte-array containing the MAC address of the receiver for which this request is made. The transmitter checks it against the approved list of receivers. When the receiver has more than one network interface, it is application specific as to which MAC address is used here. For example, it can always use the Ethernet MAC address regardless to which interface actually carries this message (Ethernet or 802.11a.) |
| Receiver IP Address | 26 | 16 | A byte-array containing the IP address of the receiver if it has been assigned. Otherwise, this field contains all zero. For IPv4, only the first 4 bytes are used. |
| Subnet Mask | 42 | 16 | A byte-array containing the subnet mask of the network if an IP address has been assigned to the receiver. Otherwise, this field contains all zero. For IPv4, only the first 4 bytes are used. |

Figure 58

| Field Name | Offset | Length | Description |
| --- | --- | --- | --- |
| Status | 12 | 2 | ALIP_SUCCESS (0) if the request is accepted.<br>Failure reason if the request is rejected:<br>ALIP_REASON_UNKNOWN<br>ALIP_REASON_TOO_MANY_RECEIVERS<br>ALIP_REASON_MAC_NOT_APPROVED<br>ALIP_REASON_OEM_MISMATCH<br>ALIP_REASON_SYS_TYPE_MISMATCH |
| Transmitter MAC Address | 14 | 6 | A byte-array containing the MAC address of the transmitter sending this response. |
| Receiver MAC Address | 20 | 6 | A byte-array containing the MAC address of the receiver to which this response is targeted. |
| Receiver IP Address | 26 | 16 | A byte-array containing the IP address of the receiver.<br>If the Status field is ALIP_SUCCESS, this field is either the IP address of the receiver assigned by the transmitter or the original IP address of the receiver as reported in ALIP_JOIN_REQ.<br>Otherwise, this field is all zero.<br>The subnet mask is the same as reported in ALIP_PROBE_CFM.<br>For IPv4, only the first 4 bytes are used. |

Figure 59

| Field Name | Offset | Length | Description |
|---|---|---|---|
| Transmitter MAC Address | 12 | 6 | A byte-array containing the MAC address of the transmitter to which this request is targeted. |
| Receiver MAC Address | 18 | 6 | A byte-array containing the MAC address of the receiver sending this request. |

Figure 60

| Field Name | Offset | Length | Description |
|---|---|---|---|
| Transmitter MAC Address | 12 | 6 | A byte-array containing the MAC address of the transmitter sending this response. |
| Receiver MAC Address | 18 | 6 | A byte-array containing the MAC address of the receiver to which this response is targeted. |

Figure 61

| Field Name | Length | Description |
|---|---|---|
| Start of Header | 4 | 0x41, 0x53, 0x49, 0x50 ("ASIP") <br> Protocol Name. |
| Version | 2 | 0x01, 0x00 (1.0.0.0) <br> Protocol Version. |
| Sequence Number | 2 | Sequence number for matching request/confirmation and indication/response pairs. |
| Message Type | 2 | Type code for the message. |
| Length | 2 | Length of entire message including the header. <br> Minimum length is 12. |

Figure 68

| Status Code | Value | Description |
|---|---|---|
| SUCCESS | 0 | Command successful |
| ASIP_REASON_UNKNOWN | 1 | Unspecified reason. |
| ASIP_SRC_UNAVAIL | 2 | The default program source is unavailable. For example, no HDMI signal is detected. |
| ASIP_AUTH_FAILED | 3 | HDCP authentication failed. |
| ASIP_NO_SESSION | 4 | There is no established ASIP session with the receiver. |
| ASIP_SESSION_ENDED | 5 | The ASIP session is ended (either by receiver or transmitter). |
| ASIP_SRC_CHANGED | 6 | The audio/video parameters (e.g. video resolution) of the program source are changed. |

Figure 69

| Field Name | Length | Description |
|---|---|---|
| EDID | 128 | Extended Display Identification Data (EDID) Ver 1 Rev 3 |
| EDID Extension | 128 | EDID Timing Extension Version 3 |

Figure 70

| Byte # | Bit 7 | Bit 6 | Bit 5 | Bit 4 | Bit 3 | Bit 2 | Bit 1 | Bit 0 |
|---|---|---|---|---|---|---|---|---|
| 0 | Version = 0x02 ||||||||
| 1 | 0 | 0 | 0 | Length = 13 |||||
| 2 | Rsvd (0) | Y1 | Y0 | A0 | B1 | B0 | S1 | S0 |
| 3 | C1 | C0 | M1 | M0 | R3 | R2 | R1 | R0 |
| 4 | Rsvd(0) |||||| SC1 | SC0 |
| 5 | Rsvd(0) | VIC6 | VIC5 | VIC4 | VIC3 | VIC2 | VIC1 | VIC0 |
| 6 | Rvsd(0) |||| PR3 | PR2 | PR1 | PR0 |
| 7 | Line Number of End of Top Bar (lower 8 bits) ||||||||
| 8 | Line Number of End of Top Bar (upper 8 bits) ||||||||
| 9 | Line Number of start of Bottom Bar (lower 8 bits) ||||||||
| 10 | Line Number of start of Bottom Bar (upper 8 bits) ||||||||
| 11 | Pixel Number of End of Left Bar (lower 8 bits) ||||||||
| 12 | Pixel Number of End of Left Bar (upper 8 bits) ||||||||
| 13 | Pixel Number of End of Right Bar (lower 8 bits) ||||||||
| 14 | Pixel Number of End of Right Bar (upper 8 bits) ||||||||

Figure 72

| Field Name | Offset | Length | Description |
| --- | --- | --- | --- |
| Status | 12 | 2 | ASIP_SUCCESS (0) if the request is accepted. Failure reason if the request is rejected: ASIP_REASON_UNKNOWN ASIP_REASON_SRC_UNAVAIL ASIP_REASON_AUTH_FAILED |
| Reserved | 14 | 2 | (reserved) |
| Current Transmitter Clock Value | 16 | 4 | The current value of the 32-bit counter maintained by encoding hardware in the transmitter. |
| RTP Audio Multicast Address | 20 | 16 | The IP address of the multicast group for RTP audio session. This field is all zeros when the Status field is not ASIP_SUCCESS. For IPv4, only the first 4 bytes are used. |
| RTP Video Multicast Address | 36 | 16 | The IP address of the multicast group for RTP video session. This field is all zeros when the Status field is not ASIP_SUCCESS. For IPv4, only the first 4 bytes are used. |
| RTP Audio Session Port | 52 | 2 | The even UDP port number for RTP audio session. An RTP session uses two adjacent UDP ports, with 2n used by RTP and 2n+1 used by RTCP. This field is all zeros when the Status field is not ASIP_SUCCESS. |
| RTP Video Session Port | 54 | 2 | The even UDP port number for RTP video session. This field is all zeros when the Status field is not ASIP_SUCCESS. |
| HDMI Source | 56 | 2 | True if the source is HDMI else source is DVI |
| DVI | 58 | 2 | Video Standard if not HDMI source. |
| AVI | 60 | 15 | Auxiliary video information. When Status is not ASIP_SUCCESS, this field is set to all zero. |
| AAI | 75 | 12 | Auxiliary audio information. When Status is not ASIP_SUCCESS, this field is set to all zero. |
| Init Vector | 87 | 16 | Initialization vector for AES encryption |

Figure 71

| Byte # | Bit 7 | Bit 6 | Bit 5 | Bit 4 | Bit 3 | Bit 2 | Bit 1 | Bit 0 |
|---|---|---|---|---|---|---|---|---|
| 0 | Version = 0x01 ||||||||
| 1 | 0 | 0 | 0 | Length = 10 |||||
| 2 | CT3 | CT2 | CT1 | CT0 | Rsvd | CC2 | CC1 | CC0 |
| 3 | Rsvd(0) ||| SF2 | SF1 | SF0 | SS1 | SS0 |
| 4 | Format depends on coding type ||||||||
| 5 | CA7 | CA6 | CA5 | CA4 | CA3 | CA2 | CA1 | CA0 |
| 6 | DM_INH | LSV3 | LSV2 | LSV1 | LSV0 | Rsvd(0) |||
| 7 | Rsvd(0) ||||||||
| 8 | Rsvd(0) ||||||||
| 9 | Rsvd(0) ||||||||
| 10 | Rsvd(0) ||||||||
| 11 | Rsvd(0) ||||||||

Figure 73

| Field Name | Offset | Length | Description |
|---|---|---|---|
| Status | 12 | 2 | Reason for teardown:<br>ASIP_REASON_UNKNOWN<br>ASIP_REASON_SESS_ENDED |

Figure 74

| Field Name | Offset | Length | Description |
|---|---|---|---|
| Status | 12 | 2 | ASIP_SUCCESS (0) if the request is accepted.<br>Failure reason if the request is rejected:<br>ASIP_REASON_UNKNOWN<br>ASIP_REASON_NO_SESS |

Figure 75

| Field Name | Offset | Length | Description |
|---|---|---|---|
| Status | 12 | 2 | Reason for teardown:<br>ASIP_REASON_UNKNOWN<br>ASIP_REASON_SESS_ENDED<br>ASIP_REASON_SRC_CHANGED |

Figure 76

| Field Name | Offset | Length | Description |
|---|---|---|---|
| Status | 12 | 2 | ASIP_SUCCESS (0) if the request is accepted.<br>Failure reason if the request is rejected:<br>ASIP_REASON_UNKNOWN |
| Device Count | 14 | 1 | Number of devices. |
| Depth | 15 | 1 | Number of cascading levels. |
| Max Cascade Exceeded | 16 | 1 | Set to 1 if depth exceeds 7. Otherwise set to 0. |
| Max Devs Exceeded | 17 | 1 | Set to 1 if device count exceeds 127. Otherwise set to 0. |
| KSV List | 18 | N*5 | List of Key Selection Vectors.<br>Each KSV contains 5 bytes.<br>N (0-127) is the number of KSV in the list.<br>N must be > 0 when Status is ASIP_SUCCESS (0). |

Figure 77

| Field Name | Offset | Length | Description |
|---|---|---|---|
| SPD | 12 | 28 | Source Product Description defined in Table 16 of EIA/CEA-861-B. |

Figure 78

| Byte # | Bit 7 | Bit 6 | Bit 5 | Bit 4 | Bit 3 | Bit 2 | Bit 1 | Bit 0 |
|---|---|---|---|---|---|---|---|---|
| 0 | colspan: Version = 0x01 | | | | | | | |
| 1 | 0 | 0 | 0 | colspan: Length = 25 | | | | |
| 2 | colspan: Checksum | | | | | | | |
| 3 | 0 | colspan: Vendor Name Character 1 (7bit ASCII code) | | | | | | |
| 4 | 0 | colspan: Vendor Name Character 2 | | | | | | |
| 5 | 0 | colspan: Vendor Name Character 3 | | | | | | |
| 6 | 0 | colspan: Vendor Name Character 4 | | | | | | |
| 7 | 0 | colspan: Vendor Name Character 5 | | | | | | |
| 8 | 0 | colspan: Vendor Name Character 6 | | | | | | |
| 9 | 0 | colspan: Vendor Name Character 7 | | | | | | |
| 10 | 0 | colspan: Vendor Name Character 8 | | | | | | |
| 11 | 0 | colspan: Product Description Character 1 (7-bit ASCII code) | | | | | | |
| 12 | 0 | colspan: Product Description Character 2 | | | | | | |
| 13 | 0 | colspan: Product Description Character 3 | | | | | | |
| 14 | 0 | colspan: Product Description Character 4 | | | | | | |
| 15 | 0 | colspan: Product Description Character 5 | | | | | | |
| 16 | 0 | colspan: Product Description Character 6 | | | | | | |
| 17 | 0 | colspan: Product Description Character 7 | | | | | | |
| 18 | 0 | colspan: Product Description Character 8 | | | | | | |
| 19 | 0 | colspan: Product Description Character 9 | | | | | | |
| 20 | 0 | colspan: Product Description Character 10 | | | | | | |
| 21 | 0 | colspan: Product Description Character 11 | | | | | | |
| 22 | 0 | colspan: Product Description Character 12 | | | | | | |
| 23 | 0 | colspan: Product Description Character 13 | | | | | | |
| 24 | 0 | colspan: Product Description Character 14 | | | | | | |
| 25 | 0 | colspan: Product Description Character 15 | | | | | | |
| 26 | 0 | colspan: Product Description Character 16 | | | | | | |
| 27 | colspan: Source Device Information | | | | | | | |

Figure 79

| Field Name | Offset | Length | Description |
|---|---|---|---|
| ISRC1 | 12 | 18 | International Recording Code 1 of the current track. |

Figure 80

| Byte # | Bit 7 | Bit 6 | Bit 5 | Bit 4 | Bit 3 | Bit 2 | Bit 1 | Bit 0 |
|---|---|---|---|---|---|---|---|---|
| 0 | ISRC_Cont | ISRC_Valid | Rsvd(0) | | | ISRC_Status | | |
| 1 | Rsvd(0) | | | | | | | |
| 2 | UPC_EAN_ISRC_0 | | | | | | | |
| 3 | UPC_EAN_ISRC_1 | | | | | | | |
| 4 | UPC_EAN_ISRC_2 | | | | | | | |
| 5 | UPC_EAN_ISRC_3 | | | | | | | |
| 6 | UPC_EAN_ISRC_4 | | | | | | | |
| 7 | UPC_EAN_ISRC_5 | | | | | | | |
| 8 | UPC_EAN_ISRC_6 | | | | | | | |
| 9 | UPC_EAN_ISRC_7 | | | | | | | |
| 10 | UPC_EAN_ISRC_8 | | | | | | | |
| 11 | UPC_EAN_ISRC_9 | | | | | | | |
| 12 | UPC_EAN_ISRC_10 | | | | | | | |
| 13 | UPC_EAN_ISRC_11 | | | | | | | |
| 14 | UPC_EAN_ISRC_12 | | | | | | | |
| 15 | UPC_EAN_ISRC_13 | | | | | | | |
| 16 | UPC_EAN_ISRC_14 | | | | | | | |
| 17 | UPC_EAN_ISRC_15 | | | | | | | |

Figure 81

| Field Name | Offset | Length | Description |
|---|---|---|---|
| ISRC2 | 12 | 16 | International Recording Code 2 of the current track. |

Figure 82

| Byte # | Bit 7 | Bit 6 | Bit 5 | Bit 4 | Bit 3 | Bit 2 | Bit 1 | Bit 0 |
|---|---|---|---|---|---|---|---|---|
| 0 | colspan="8" | UPC_EAN_ISRC_16 |||||||
| 1 | colspan="8" | UPC_EAN_ISRC_17 |||||||
| 2 | colspan="8" | UPC_EAN_ISRC_18 |||||||
| 3 | colspan="8" | UPC_EAN_ISRC_19 |||||||
| 4 | colspan="8" | UPC_EAN_ISRC_20 |||||||
| 5 | colspan="8" | UPC_EAN_ISRC_21 |||||||
| 6 | colspan="8" | UPC_EAN_ISRC_22 |||||||
| 7 | colspan="8" | UPC_EAN_ISRC_23 |||||||
| 8 | colspan="8" | UPC_EAN_ISRC_24 |||||||
| 9 | colspan="8" | UPC_EAN_ISRC_25 |||||||
| 10 | colspan="8" | UPC_EAN_ISRC_26 |||||||
| 11 | colspan="8" | UPC_EAN_ISRC_27 |||||||
| 12 | colspan="8" | UPC_EAN_ISRC_28 |||||||
| 13 | colspan="8" | UPC_EAN_ISRC_29 |||||||
| 14 | colspan="8" | UPC_EAN_ISRC_30 |||||||
| 15 | colspan="8" | UPC_EAN_ISRC_31 |||||||

Figure 83

| Field Name | Offset | Length | Description |
|---|---|---|---|
| ACP | 12 | 30 | Audio Content Protection |

Figure 84

| Byte # | Bit 7 | Bit 6 | Bit 5 | Bit 4 | Bit 3 | Bit 2 | Bit 1 | Bit 0 |
|---|---|---|---|---|---|---|---|---|
| 0 | ACP_Type ||||||||
| 1 | Rsvd(0) ||||||||
| 2-29 | ACP_Type_Dependent ||||||||

Figure 85

| Field Name | Offset | Length | Description |
|---|---|---|---|
| Status | 12 | 1 | 0 for not muted.<br>1 for muted. |

Figure 86

| RTP Header | | |
|---|---|---|
| Field | Number of Bits | Description |
| V (version) | 2 | This field identifies the version of RTP. The version defined by this specification is two (2) which is based on RFC3550. |
| P (padding) | 1 | If the padding bit is set, the packet contains one or more additional padding octets at the end which are not part of the payload. The last octet of the padding contains a count of how many padding octets should be ignored, including itself. |
| X (extension) | 1 | If the extension bit is set, the fixed header MUST be followed by exactly one header extension. In this specification, it is set. |
| CC (CSRC count) | 4 | The CSRC count contains the number of contributing source identifiers that follow the fixed header. In this specification, CC = 0 since CSRC identifiers are not used. |
| M (marker) | 1 | The interpretation of the marker is defined by a profile. In this specification, it marks the first packet of an audio or video frame. However this is of limited use since the packet with the M bit set may be lost. Instead we append "frame number" and "packet number in frame" for frame boundary identification. |
| PT (payload type) | 7 | This field identifies the format of the RTP payload. In this specification, we define 0x50 (80) for audio stream and 0x51 (81) for video stream. |
| sequence number | 16 | This number is the lower 16-bit of the sequence number defined in the extension (see below). |
| timestamp | 32 | The transmitter puts the transmitter clock value at the sampling instant to the timestamp field. The transmitter clock is a 32-bit counter incremented periodically by the encoding hardware at a rate significantly higher than the frame rate (e.g. 10x) in order to allow accurate synchronization. |
| SSRC identifier | 32 | This field identifies the synchronization source. Since in this application there is only one synchronization source which is the transmitter, this field is unused and should be set 0. |

Figure 94A

| RTP Header | | |
|---|---|---|
| Field | Number of Bits | Description |
| extension identifier | 16 | This is the extension identifier defined to be 0x0001. |
| extension length | 16 | This is the extension length equal to the number of 32-bit words in the extension, which is 5 in this protocol. |
| extension – sequence number | 32 | This number increments by one for each RTP packet sent, and is used by the receiver to detect packet loss. |
| extension – frame number | 32 | This number increments by one after each audio/video frame. An audio frame is defined to be the collection of audio data sampled within the duration of a video frame. The frame number for packets belonging to the same frame is identical. |
| extension – frame size | 32 | Number of bytes in the audio/video frame to which this packet belongs. |
| extension – packet size | 32 | Number of bytes in each packetization unit of the frame. Note that the last packet of the frame may be shorter than this. However in this project, the last packet is padded to packet size. |
| extension – packet number | 1B6 | This field identifies the position of the packet in an audio/video frame. This number is 0 for the first packet in a frame and increments by one for each subsequent packet in the same frame. |
| extension – packet count | 16 | Total number of packets in the audio/video frame to which this packet belongs. |

Figure 94B

| Sync | | |
|---|---|---|
| Field | Number of Bits | Description |
| V (version) | 2 | This field identifies the version of RTP. The version defined by this specification is two (2) which is based on RFC3550. |
| P (padding) | 1 | If the padding bit is set, the packet contains one or more additional padding octets at the end which are not part of the control information but are included in the length field. The last octet of the padding contains a count of how many padding octets should be ignored, including itself. |
| ST (sub-type) | 5 | It indicates the sub-type of this packet. It is defined to 0 for Sync which is to synchronize the transmitter and receiver clocks. |
| PT (packet type) | 8 | It is defined to 205 for custom RTCP packets defined in this specification. |
| length | 16 | This field is equal to the length of this packet in 32-bit words minus one. This is defined in the same way as standard RTCP packets. |
| SSRC identifier | 32 | This field identifies the synchronization source. Since in this application there is only one synchronization source which is the transmitter, this field is unused and should be set 0. |
| Current Transmitter Timestamp | 32 | Current 32-bit timestamp value at the transmitter. The receiver makes use of it to calculate the offset between the transmitter and receiver timestamp. |

Figure 96

| V | P | ST = 1 | PT = 205 | length |
|---|---|---|---|---|
| synchronization source (SSRC) identifier ||||
| count || reserved |||
| 1st sequence number ||||
| ... ||||
| last sequence number ||||

Single NACKs

| V | P | ST = 2 | PT = 205 | length |
|---|---|---|---|---|
| synchronization source (SSRC) identifier ||||
| count || reserved |||
| 1st sequence number ||||

Sequential NACKs

Figure 97

| Single NACKs |||
| --- | --- | --- |
| Field | Number of Bits | Description |
| V (version) | 2 | This field identifies the version of RTP. The version defined by this specification is two (2) which is based on RFC3550. |
| P (padding) | 1 | If the padding bit is set, the packet contains one or more additional padding octets at the end which are not part of the control information but are included in the length field. The last octet of the padding contains a count of how many padding octets should be ignored, including itself. |
| ST (sub-type) | 5 | It indicates the sub-type of this packet. It is defined to 1 for Single NACKs which is the negative acknowledge of a list of single sequence numbers. |
| PT (packet type) | 8 | It is defined to 205 for custom RTCP packets defined in this specification. |
| length | 16 | This field is equal to the length of this packet in 32-bit words minus one. This is defined in the same way as standard RTCP packets. |
| SSRC identifier | 32 | This field identifies the synchronization source. Since in this application there is only one synchronization source which is the transmitter, this field is unused and should be set 0. |
| count | 8 | This indicates the number of sequence numbers included in this packet. The maximum is 255. |
| reserved | 24 | (space holder for alignment) |
| nth sequence number | 32 | This sequence number identifies a lost packet. Retransmission for it is requested. |

Figure 98

| Sequential NACKs | | |
|---|---|---|
| Field | Number of Bits | Description |
| V (version) | 2 | Same as Single NACKs. |
| P (padding) | 1 | Same as Single NACKs. |
| ST (sub-type) | 5 | It indicates the sub-type of this packet. It is defined to 2 for Sequential NACKs which is the negative acknowledge of a range of sequence numbers. |
| PT (packet type) | 8 | Same as Single NACKs. |
| length | 16 | Same as Single NACKs. |
| SSRC identifier | 32 | Same as Single NACKs |
| count | 8 | This indicates the number of consecutive sequence numbers beginning from the $1^{st}$ sequence number specified in this packet. All sequence numbers in the range are negatively acknowledged. The maximum is 255. |
| reserved | 24 | (space holder for alignment) |
| $1^{st}$ sequence number | 32 | This sequence number identifies the first packet of a range of consecutive lost packets. Retransmission for them is requested. |

Figure 99

POINT-TO-MULTIPOINT HIGH DEFINITION MULTIMEDIA TRANSMITTER AND RECEIVER

This application claims priority to U.S. Patent Application No. 60/842,706, filed Sep. 7, 2006, the entire contents of which is incorporated herein by reference.

FIELD OF THE INVENTION

This relates to point to multipoint transmission and reception of high definition video communications.

BRIEF DESCRIPTION OF THE DRAWINGS

The invention is better understood by reading the following detailed description with reference to the accompanying drawings in which:

FIGS. 28-31 are video packet formats;

FIGS. 32-33 are audio packet formats;

FIGS. 38-41 are example main processor memory maps;

FIG. 42 is a set up for the expansion bus from the main processor to the expansion connector;

FIG. 43 is a set up for the expansion bus from the main processor to the FPGA programming;

FIG. 44 is a schematic representation of three PCI slot specifications;

FIG. 45 is a schematic representation of four serial port specifications;

FIG. 46 is an example main processor board clock tree;

FIG. 47 is an example main processor board clock register set up;

FIG. 48 is a table of GPIO pin set ups for the main processor;

FIG. 49 is a table of boot options as defined by the main processor board;

FIG. 50 is a table of user defined values for boot options;

FIGS. 51A-B together are a table of expansion board connections;

FIGS. 55-61 are example message formats for ALIP messages;

FIGS. 68-86 are example message formats for ASIP sessions;

FIGS. 93-99 are example RTP message formats.

DETAILED DESCRIPTION OF THE INVENTION & BACKGROUND AND SUMMARY

Figure 1:
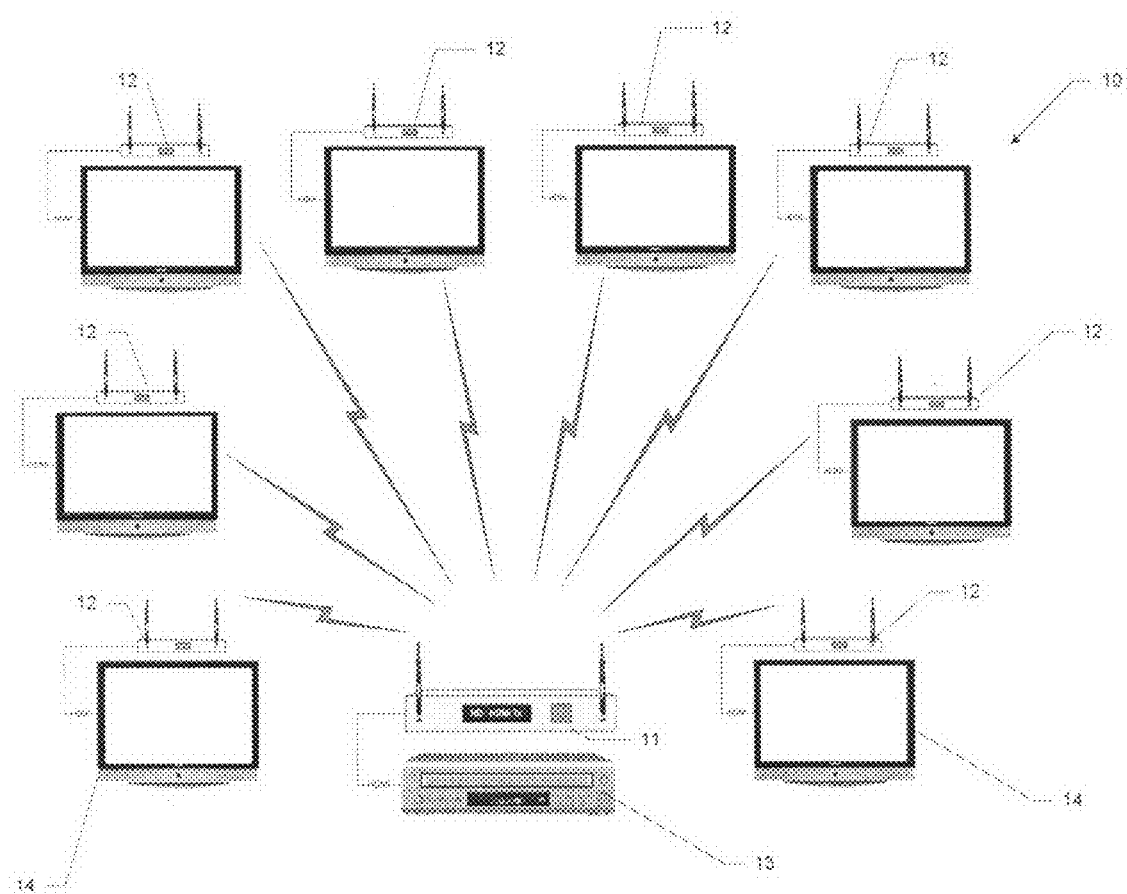
FIG. 1 is a schematic representation of a system according to an example embodiment of the present invention.

Certain commercial specifications and protocols are relevant to the present description, each of which is incorporated herein by reference. They include:
(1) "High-Definition Multimedia Interface Specification, Version 1.2";
(2) "High-bandwidth Digital Content Protection System";
(3) "RTP: A Transport Protocol for Real-Time Applications";
(4) "RTP Payload Format for JPEG 2000 Video Streams";
(5) "The Secure Real-time Transport Protocol"; and
(6) "Avocent Audio Visual Protocol Specification," a copy of which is included in U.S. Patent Application No. 60/842, 706, filed Sep. 7, 2006.

Certain papers and books provide background material for the present description, the teachings of which will be assumed to be known to the reader. They include:
(1) O'Reilly, "802.11 Wireless Networks The Definitive Guide," Sebastopol, Calif., 2005;
(2) Castro, Elizabeth, "HTML for the World Wide Web, Fifth Edition, with XHTML and CSS: Visual QuickStart Guide," Berkeley: Peachpit Press, 2003;
(3) Castro, Elizabeth, "Perl and CGI for the World Wide Web, Second Edition: Visual QuickStart Guide," Berkley: Peachpit Press, 2001;
(4) "Intrastream Synchronization for Continuous Media Streams: A Survey of Playout Schedulers";
(5) "Multipoint Mutilmedia Teleconference System with Adaptive Synchronization";
(6) "The Design of the OpenBSD Cryptographic Framework"; and
(7) "Survey of Error Recovery Techniques for IP-Based Audio-Visual Multicast Applications."

Some manuals and documents are relevant to the operation of the main processor board. Each of them are incorporated herein by reference, and include:

Certain manuals and datasheets describe in more detail various aspects of the present description, each of which are incorporated wherein by reference. They include:

For the processor:
(1) Intel IXP45X and Intel IXP46X Product Line of Network Processors Developer's Manual (located at http://www.intel.com/design/network/products/npfamily/docs/ixp4xx.htm
(2) For the processor, Intel IXP45X and Intel IXP46X Product Line of Network Processors Data Sheet (located at same link immediately above)

For the audio visual subsystem:
(3) HDMI Display Interface—Preliminary Technical Data—AD9398
(4) 800 Mbit High Performance HDMI/DVI Transmitter—Preliminary Technical Data—AD9889
(5) ADV7401 Integrated Multi-Format SDTV/HDTV Video Decoder and RGB Graphics Digitizer
(6) Multiformat 216 MHz Video Encoder with Six NSV 12-Bit DACs—ADV7320/ADV7321
(7) JPEG2000 Video Codec ADV202
(8) ADV202 JPEG2000 Video Processor User's Guide
(9) Getting Started with the ADV202 Programming Guide
(10) ADV202 Output Formats and Attribute Data Format
(11) Using the ADV202 in a Multi-chip Application
(12) Front Panel Processor (LPC2103)

For the Radio Chips:
(13) AR5002 STA Programmer's Guide
(14) Boa Documentation;

For the DDR:
(15) Micron Double Data Rate (DDR) SDRAM Data Sheet

The documents described above are incorporated by reference.

The present description relates to a multipoint extender (wired or wireless) for transmitting high-definition content from one source to one or more destinations incorporating High-Definition Multimedia Interface (HDMI) technology. In its preferred embodiment, the system can wirelessly transmit high resolution computer graphics, high-definition video, stereo audio, and control data to eight wireless or LAN connected receivers. The multipoint system includes a transmitter and receivers that provide high-definition media support suitable for such applications as professional audio-visual applications. Audio-video synchronization is provided at each display. All wirelessly connected receivers remain synchronized with each other. Interchangeable modules can be added for analog signals including composite video, component video, computer graphics, or digital HDMI/DVI signals.

In FIG. 1, the system 10 provides a wire replacement for a High Definition Multimedia Interface (in the art sometimes abbreviated HDMI, or simply HD) source connecting to an HDMI display. The system is composed of a transmitter 11 and one or more receivers 12. The transmitter will support communication to up to 8 receiver units. Each receiver will utilize a virtual clock that is synchronized by the transmitter therefore allowing each receiver to be in sync with each other receiver.

The audio and video data is encoded by the transmitter 11 that is connected to the HDMI source 13 and transmits the data to a receiver 12. The receiver units 12 can be connected to respective HDMI display devices 14.

The transmitter 11 and receiver 12 are based around JPEG2000 codecs that will support the compression of High Definition Video along with standard definition content. JPEG2000 codecs are not new and are well-known video transmission protocols to the artisan. It is not necessary to repeat their details here.

Video, audio and control data (such as RS-232, infra-red, HDMI, or Consumer Electronics Control codes), which are supported at the hardware level but could be supported either by software or firmware level, are input into the transmitter 11. In the transmitter, the video & audio data is converted to the digital domain, time stamped, compressed, encrypted, packetized, and transmitted over a 10/100 bit Ethernet link or over a wireless link to the receiver. The order in which encryption occurs is not a requirement.

In an example embodiment, the above-described control data is not interpreted at the transmitter, but is forwarded as-is.

At the other end, the receiver 12 decrypts, decompresses, converts/manipulates the data back into the desired format, and outputs to the connected HDMI-supported audio/video equipment (such as video display 14). The control data that is received by the receiver 12 allows for several methods to control the external A/V equipment. In some examples, this is done through RS232 serial, Infra-Red (IR)/IR-Blaster and CEC commands.

The present set of transmitter 11 and receiver 12 systems will allow different A/V modules to be installed, such as the HDMI/Euro-Block module.

The block diagrams and detailed design information for the HW appliances can be found below.

Figure 3:
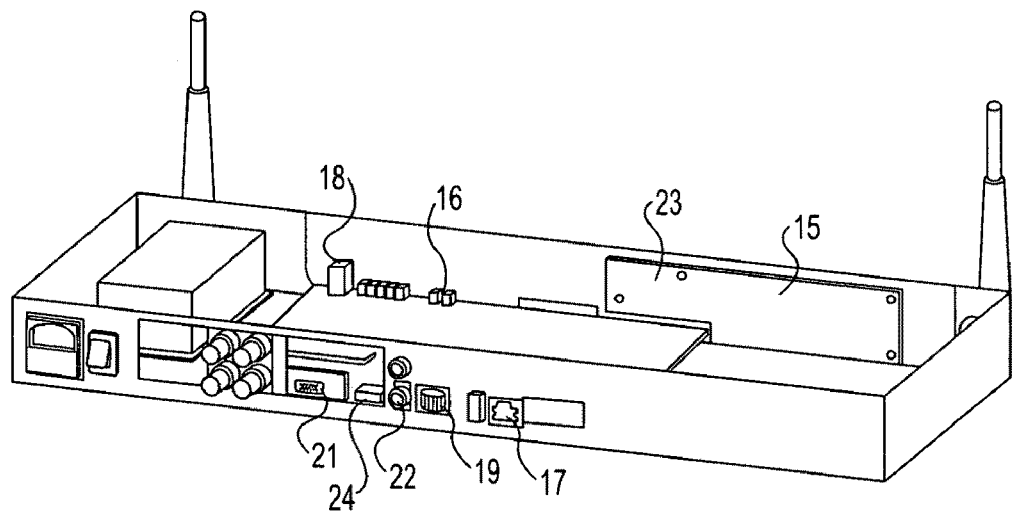

The transmitter is designed to accept an input source 13, such as either a HDMI source (Audio & Video) or one DVI source, either of which will accept PC graphics or video. The rear of the Transmitter is shown in FIG. 3 and includes an 10/100 Ethernet port 17, RS-232 ports 24, and USB Client port 19.

Figure 2:
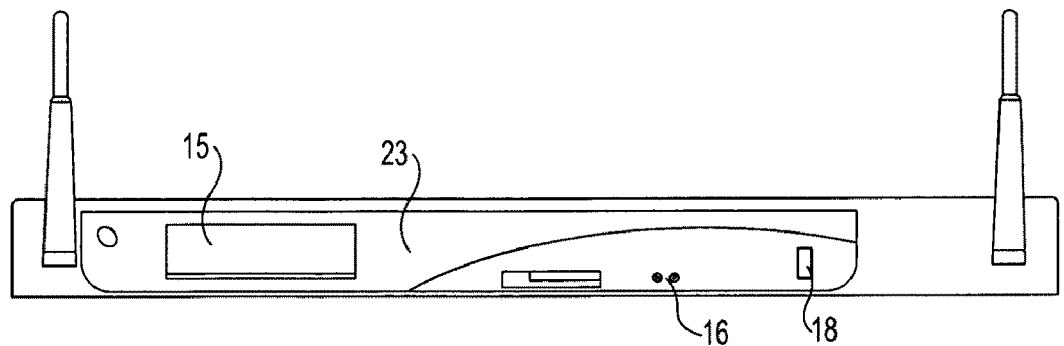
FIGS. 2-3 are perspective views of an example transmitter.

The front of the transmitter is shown in FIG. 2 and includes a Vacuum Fluorescent Display (VFD) 15 or similar display to communicate to the user the state of the device along with pertinent information, InfraRad receiver and blaster pair 16, five control buttons (UP, DOWN, LEFT, RIGHT, and SELECT) 23, and a USB host port 18 to supply power for an optional light.) The transmitter 11 also includes a single lane PCI express port 20, and ports for HDMI or DVI source video 21. Ports 22 receive balanced, stereo audio input.

Figure 4:
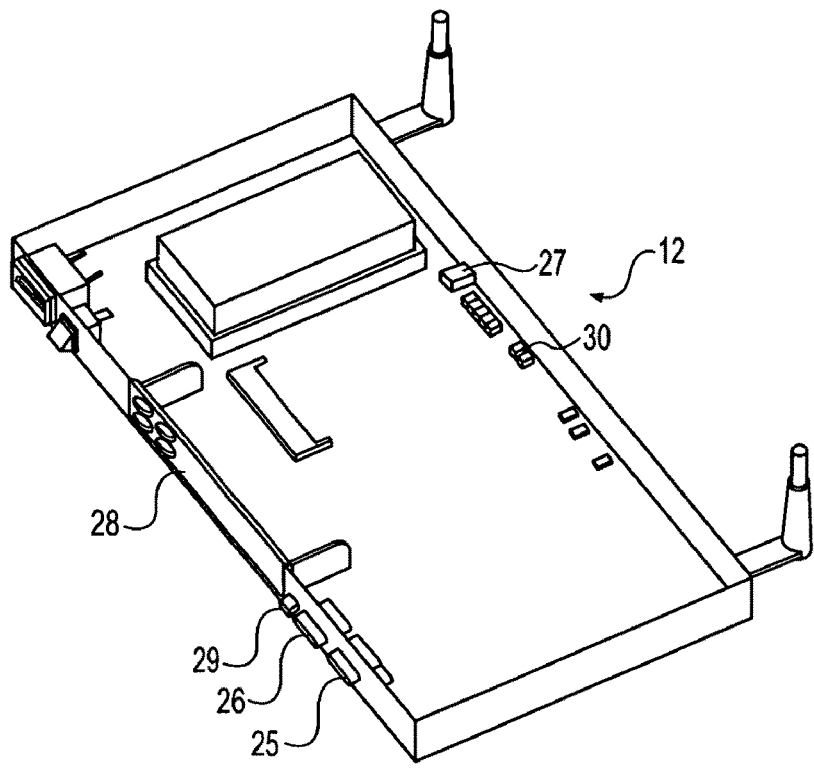
FIG. 4 is a perspective view of an example receiver.

The receiver 12 is shown in more detail in FIG. 4. It includes an HDMI video connector 25, Ethernet port 26, USB host port 27, USB client port 28, RS232 port 29, and InfraRed transmitter and receiver pair 30. The I/R pair 30 (as well as the I/R pair 16 on the transmitter) support signals at 38 KHz signal+/−2 KHz window.

In general, the system incorporates a High Definition source or standard definition source connected to the transmitter 11 (FIG. 1) via an HDMI connection to the HDMI port 21. A distance from the transmitter (which could be in excess of 100 feet) are N number (where N<=8 in the preferred embodiment but more or less as appropriate) of receivers 12 each connected via HDMI to a respective display device 14. Wireless transmission from the transmitter to the receivers is per 802.11 certified radios.

HD-JPEG2000 is employed to compress the video and can run at, optionally, 20 MBps to meet commercial quality requirements.

The processor subsystem of the receiver 12 is based on a PCI Bus architecture, using, for example, an Intel IXP455 processor with DDR memory. The JPEG2000 codecs and WIFI radio communicate via the PCI bus. For that reason, the transmitter includes an 802.11a WIFI mini-PCI radio mounted on a PCI bus. The processor subsystem design allows use of the Linux OS (Kernel Version 2.6.x) which takes advantage of an OS with PCI support, network stacks, USB stacks, Radio drivers and an off the shelf Web server.

The video codecs interface to the PCI bus. A PCI card in the receiver and transmitter supports the video processing circuits, the codec's and the digital front ends. This will allow the front ends, video and audio codec's to be tested prior to the being fully implemented in HW.

An FPGA optimizes the interface between the digital interface and the microprocessor (uP). The FPGA handles (1) Configuration of the digital front ends, (2) audio time stamping, (3) video time stamping, and (4) configuration and read/write of compressed video data to and from the PCI bus.

Firmware on the transmitter 11 provides a number of functions. The firmware assigns each unit an electronic product identification number that is programmed at production time and cannot be modified by the user. It assigns each unit with an electronic OEM identification number that is programmed at production time and cannot be modified by the user. Each unit also has a country code stored in nonvolatile memory.

Each unit has a unique MAC address for each Wireless port (radio) in the device. The MAC address is programmed by the radio manufacturer and cannot be changed at production time or by the user. Each unit also has a unique MAC address for the Ethernet port in the device that is programmed at production time and cannot be modified by the user. For the purpose of management, components can be identified by their Ethernet MAC address.

New operational firmware can be received via the RJ45 connection port. In the event of an interrupted or corrupted transfer, the unit remains sufficiently operational to communicate and receive a valid firmware application. Alternatively, upgrades to firmware can be made via the wireless link. A firmware upgrade operation for the transmitter 11 ideally contains the upgrade code for all processors and sub-processors contained within the transmitter 11, rather than upgrading the parts of the transmitter individually.

The firmware also loads a test image for use in testing video transmission to a receiver 12 and a test tone for use in testing audio transmission to the receiver 12.

The firmware also allows the transmitter 11 to respond to ICMP pings.

The system is configured by the use of web pages. The user can configure the system by the use of an intuitive menu system on multiple web pages.

The factory default configuration will set the IP and subnet and a given password. The user will need to connect the PCs Ethernet port to the device. The user will be required to setup their PC to a valid IP address (other than the factory default IP address) per the subnet mask. The user will then enter the IP address of the unit into their web browser the follow the instructions for configuring the device(s). Examples of the type of information that will be provided and configurable are described below:

A. Transmitter Management Software—Web Pages

The Transmitter unit will allow configuration of the system by the user of a series of web pages. Information regarding specific modes or configuration will be consolidated onto specific web pages however the flow of the pages will be architected to facilitate easy configuration of the system. The information below is an example of the type of information that can be displayed or be allowed to be input by the user.

Status Page
    Display the Transmitter's name
    Display the Transmitter's unique ID
    Display the Receivers in range, signal strength and their status
    Display who is the master Receiver
    Display the 802.11a Wireless channel being utilized.
    Display country code Version Page
    Display AV subsystem firmware version
    Display Front Panel firmware version
    Display system hardware version
    Display front panel hardware version
    Display Transmitter ID
    Display Transmitters name
    Display the receivers joined the system and their:
        IDs
        Names
        FW versions Setup Page
    Set the Transmitter's name
    Set A/V connection type (Wired, Wireless)
    Set IP Address of the Ethernet connection
    Set Subnet mask of the Ethernet connection
    Set the video quality
    Set which Receiver will be part of the A/V system by entering their unique ID
    Set which Receiver will be the Master Receiver.
    Set wireless Channel to utilize
    Set transmit power
    Enable/Disable
        IR Blaster
        RS-232
        Wireless Radio B. Receiver Management Software—Webpages The Receiver unit will allow configuration of the system by the use of a series of web pages. The information below is an example of the type of information that can be displayed or be allowed to be input by the user.

Status Page
    Display the Receiver's name
    Display the Receiver's unique ID
    Display the system's Transmitter's Name, ID, signal strength and Status (Connected or not connected)
    Display the 802.11a Wireless channel being utilized.
    Display country code Version Page
    Display AV subsystem firmware version
    Display system hardware version
    Display Receivers ID
    Display Receivers name Setup Page
    Set the Receivers name
    Set A/V connection type (Wired, Wireless)
    Set IP Address of the Ethernet connection
    Set Subnet mask of the Ethernet connection
    Set the ID of the Transmitter that the Receiver will communicate with.
    Set transmit power
    Enable/Disable
        IR Blaster
        RS-232
        Wireless Radio Within a system 10, a single receiver 12 of the set of receivers (such as are shown in FIG. 1) is designed as the master receiver. Data received by the serial port of the transmitter 11 is passed unmodified to the master receiver 12 which sends it out its RS232 port at the same data rate as received by the transmitter 11. Data received by the serial port of the Master Receiver will be passed unmodified to the Transmitter which will send it out its RS232 port at the same data rate as received by the Master Receiver.

IR data received by the transmitter 11 is sent unmodified out the transmitter IR blaster port 16 (unless disabled) as well as the master receiver IR blaster port 30. IR data received by the Master Receiver will be sent un-modified out the Master Receiver IR (unless disabled) blaster port as well as the Transmitter IR blaster port.

A number of transmitters should be able to operate within a set radius (such as 200 feet) from each other without interfering with each other, although directional antennas may be required depending on the topology specified. Higher density operations may require a wired connection between transmitter and receiver or the use of directional antennas and attenuation material.

Video information is received at the transmitter 11, encrypted, and sent by wireless, wireline or webpage to the appropriate receiver 12. Closed Captioning information located in lines 5-21 of active video inserted at an analog input of the transmitter are recoverable at the output of the receiver.

For audio information, if a load is present on the Euro-block connector of the transmitter 11, then audio is sampled from that input rather than the HDMI stream. The receiver 12 then outputs video on the HDMI connector and Audio on Euro-blocks and/or RCA connectors. Audio received by the transmitter 11 on the HDMI stream is not transcoded by the transmitter 11. Rather, valid HDMI audio is received by the transmitter 11 and simply output to the receiver 12.

Receivers 12 in the system 10 are synchronized so (1) a viewer cannot perceive audio echoes from the display devices, and (2) a viewer cannot perceive that the video frames are not synchronized with the audio.

A protocol that typically causes an appliance to act as the Consumer Electronics Control (CEC) root device will not in this system connect the CEC line to any HDMI output. The transmitter 11 is the CEC root. The transmitter 11 generates the CEC Physical address of all source devices connected to it as per the HDMI specification, by appending a port number onto its own physical address and placing that value in the Extended Display Identification Data (EDID) for that port.

The system 10 acts as a HDMI Repeater/Distributor as defined in the HDMI specification.

The user interface for configuring the transmitter 11 is via a web-based (http) browser. The user interface permits the user to:
Set the transmitter's name;
Set the Wireless Channel used for A/V stream;
Set the A/V connection Type (Wired, Wireless);
Set the IP Address of the Ethernet connection;
Set the Subnet mask of the Ethernet connection;
Set the Gateway for the Ethernet connection;
Display the version information (such as front panel firmware, FGPA Version, hardware version, etc.);
Transmit an internal Test Signal;
Set the video quality level;
Set which Receiver unit(s) will be part of the A/V system by entering their Unique ID (I.e. the MAC address);
Set which Receiver will be the Master Receiver;
Set transmit power below the regions max;
Allow enabling/disabling the IR Blaster (to prevent local loopback);
Allow enabling/disabling the RS-232 pass through;
Set the RS-232 parameters;
Enter a password, before changing settings;
Set a password; and
Restore factory defaults.

The front panel operation is also governed by firmware that provides for several modes of displaying data. The signal strength mode displays the signal strength of a single Receiver unit's transmission at a time. When in signal strength mode, the display periodically changes which Receiver unit's signal strength is displayed.

The error rate mode of display will display an indication of the error rate of the communication channel for a single Receiver unit at a time. When in error rate mode, the display periodically changes which Receiver unit's error rate is displayed.

The channel mode of display will display the wireless channel being utilized if the AV data stream is using wireless mode.

Finally, in the address mode of display, the IP address of the transmitter 11 will be displayed on the VFD display.

On the receiver side, each receiver 12 supports DDC per the HDMI specification. Like the transmitter 11, the receiver 12 has an 802.11a WIFI mini-PCI radio mounted on a mini-PCI bus. Like the transmitter, 802.11a diversity antennae support wireless communications.

If a load is present on the Euro-block and/or RCA connector, then audio will be routed to this output and not the HDMI stream.

Each receiver 12 can be connected or disconnected without causing damage to any other device in the system 10. This goal (hot-plugability) is satisfied in hardware design. When hot-plugging, all receivers 12, transmitter 11, and servers, mice, keyboards, monitors, and other network devices remain uncompromised.

The receiver is controlled by an FPGA running firmware. The firmware assigns each receiver with an electronic product identification number that is programmed at production time and cannot be modified by the user. Each receiver also has an electronic OEM identification number that is programmed at production time and cannot be modified by the user. Each receiver has a country code stored in nonvolatile memory. Each receiver has a unique MAC address for each Wireless port (radio) in the device. Each unit has a unique MAC address for each Ethernet-port in the device that is programmed at production time and cannot be modified by the user. For the purpose of management, components are identified by their Ethernet MAC address. The firmware allows the receiver to respond to ICMP pings.

New operational firmware is received by the receiver via an Ethernet RJ45 connection port. In the event of an interrupted or corrupted transfer, the product shall remain sufficiently operational to communicate and receive a valid firmware application. A firmware upgrade operation of the receiver contains the upgrade code for all processors and sub-processors contained within the receiver, so there is no need to upgrade the parts of the receiver individually. Firmware upgrades can also be done by the wireless link.

The user interface for configuring the receiver 12 is via a web-based (http) browser. The user interface permits the user to:
Set the receiver's name;
Set the IP Address of the Ethernet connection;
Set the Subnet mask of the Ethernet connection;
Set the Gateway for the Ethernet connection;
Set transmit power below the regions max;
Set which transmitters to accept connections with;
Allow enabling/disabling the IR Blaster (to prevent local loopback); and
Restore factory defaults.

The front panel operation is also governed by firmware that controls the display of an indication (by use of the 5 LEDs) that the system is booting and/or fully booted.

As shown in FIG. 1, the system 10 provides an audiovisual product that supports point to multi-point transmission of High Definition (HD) video and audio from the transmitter 11 to one or more remote receivers 12. The link between the transmitter and a receiver is either 100 mega-bit Ethernet (wired) or 802.11a (wireless).

The audiovisual subsystem consists of two video JPEG2000 CODEC's (ADV202, one for Y and the other for $C_B C_R$), an audio CODEC, a multi-format video decoder and graphics digitizer (ADV7401), a HDMI receiver (AD9398), a HDMI transmitter (AD9889) and a video encoder (ADV7321). A Xilinx XC3S500E FPGA is used to interface the AV subsystem to a 32 bit, 33 MHz PCI bus.

In addition to the HDMI and DVI video described, other and/or combined embodiments can support other video standards such as Component Video, Composite Video and S Video.

This section describes the software architecture. The following sections describe the software in terms of the concurrent threads of execution, the calling hierarchy or layers of software, and the strategy for handling incoming events in this event-driven system. Other aspects of the architecture are covered as well, such as error handling and the physical layout of files and folders.

A. The Framework (XFw)

The XFw allows the software engineer to focus on the responsibilities of a specific part of the system. The system can be broken down into Active Objects (AOs) that are responsible for a specific aspect of the system as a whole. The framework provides and handles the common functionality of AOs. Each AO runs in its own thread of execution and only communicates with other AOs via events.

B. Layers

The framework is outside of the layering. Layering is a convenient way to abstract the operating system and hardware to minimize changes in the system when either the hardware or operating system changes. Layering also facilitates testing of Active Objects and Logical Drivers. The relationship between the framework and the layers is shown in FIG. 5.

Figure 5:
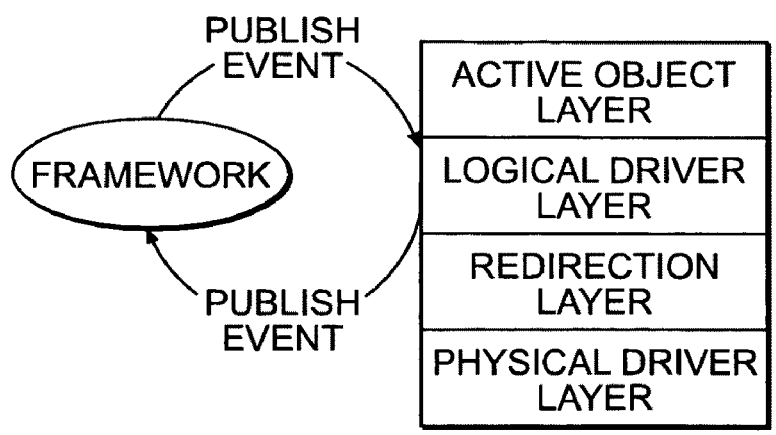
FIGS. 5-6 are schematics of an example software architecture.

In FIG. 5, each active object has its own thread of execution. AOs interpret events and process them as prescribed by the design. AOs can post events to logical drivers directly, but logical drivers must Publish or Post events to AOs only through the framework. In general, AOs should never need to change due to change of OS or hardware platform.

The logical driver, shown in FIG. 5, hides the actual hardware/OS design. An AO posts events directly to a Logical Driver. A logical driver communicates with the system in one of two ways. It can publish an event through the framework or it can post an event directly to an active object by using the framework. Logical drivers will have a thread that blocks on tend to have a thread and therefore tend to be dependent on the operating system. They provide the highest level of abstraction within the system. The Logical Drivers should not need to change when the hardware changes, but probably will require change to accommodate a change in OS.

The redirector provides a convenient hardware abstraction point. By changing the redirector you can direct the requests to any hardware driver you want. For example: If a redirector is used to make calls to an RS-232 serial port (which is a character driver) it is easy to change the redirector to call another character driver such as an I²C driver. Logical drivers or active objects may call a redirector. However, only one object (thread context) may call a redirector. Redirectors do not have threads and merely provide functionality. A redirector may implement user mode driver functionality (such as MMIO) directly. Finally in FIG. 56, the kernel modules interact with the hardware. Only redirectors call kernel modules.

Figure 6:
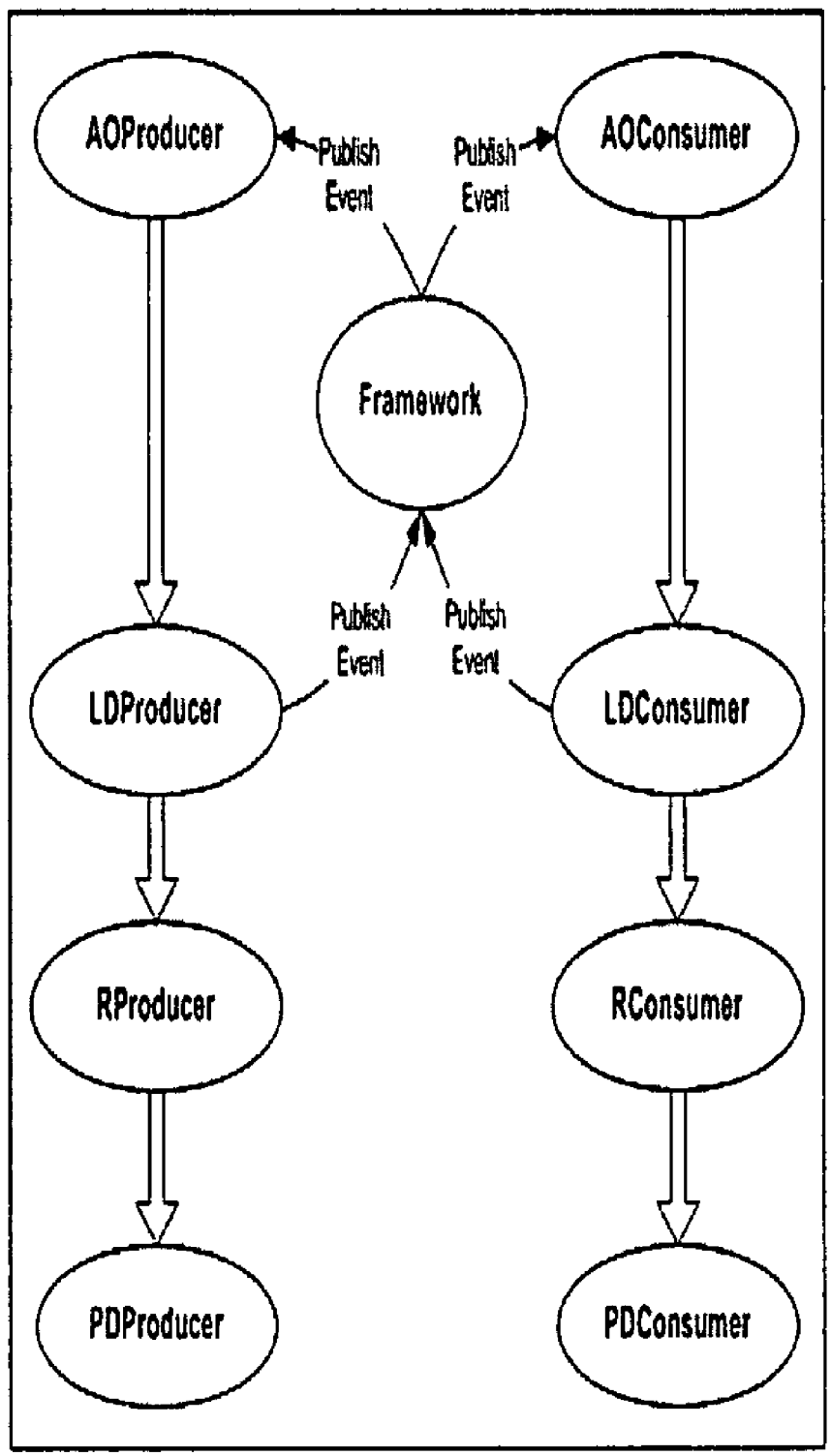

An example layer system is shown in FIG. 6.

Figure 7:
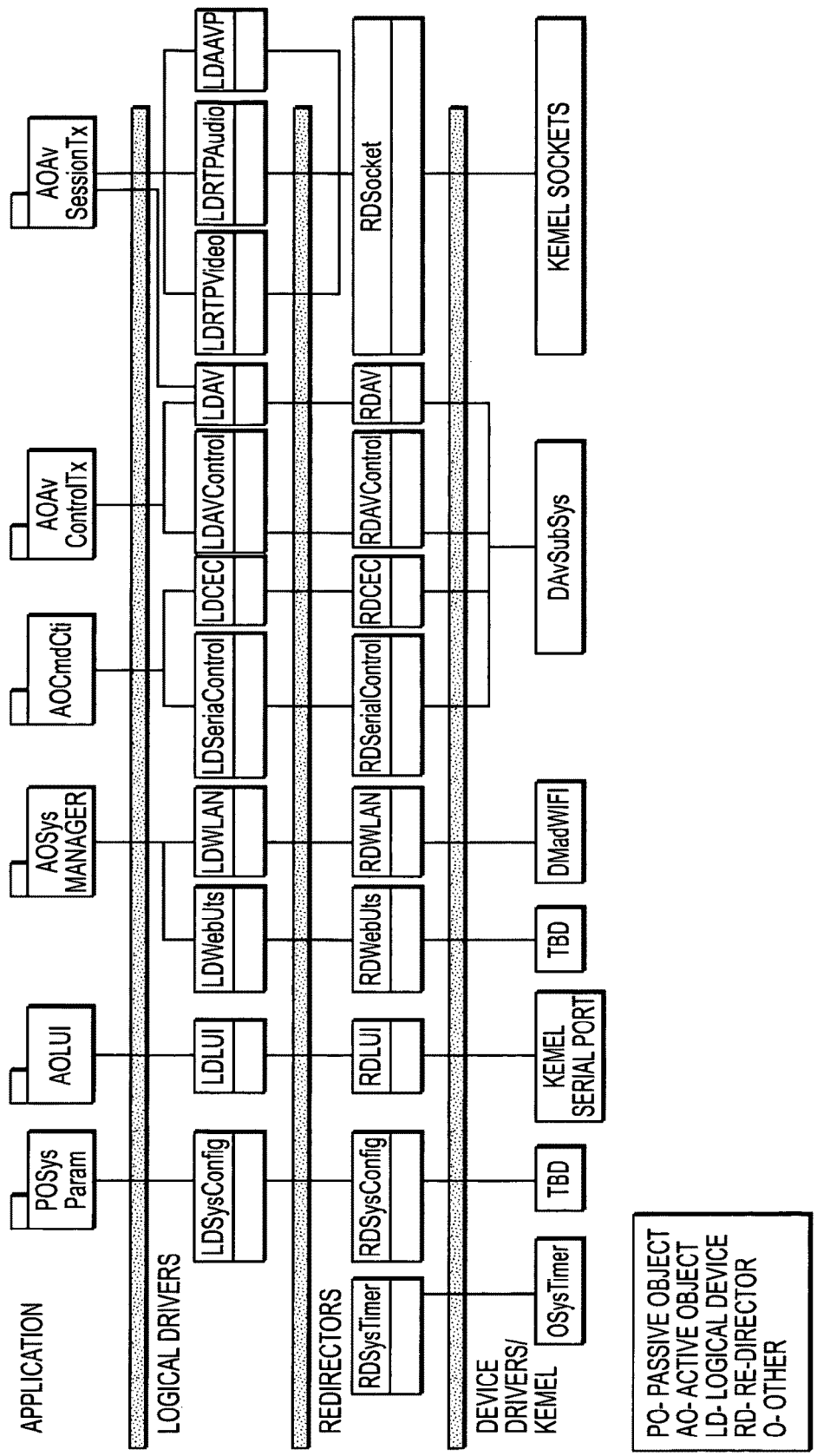
FIGS. 7 and 8 are schematics of example system architectures for example transmitter and receiver, respectively.
Figure 8:
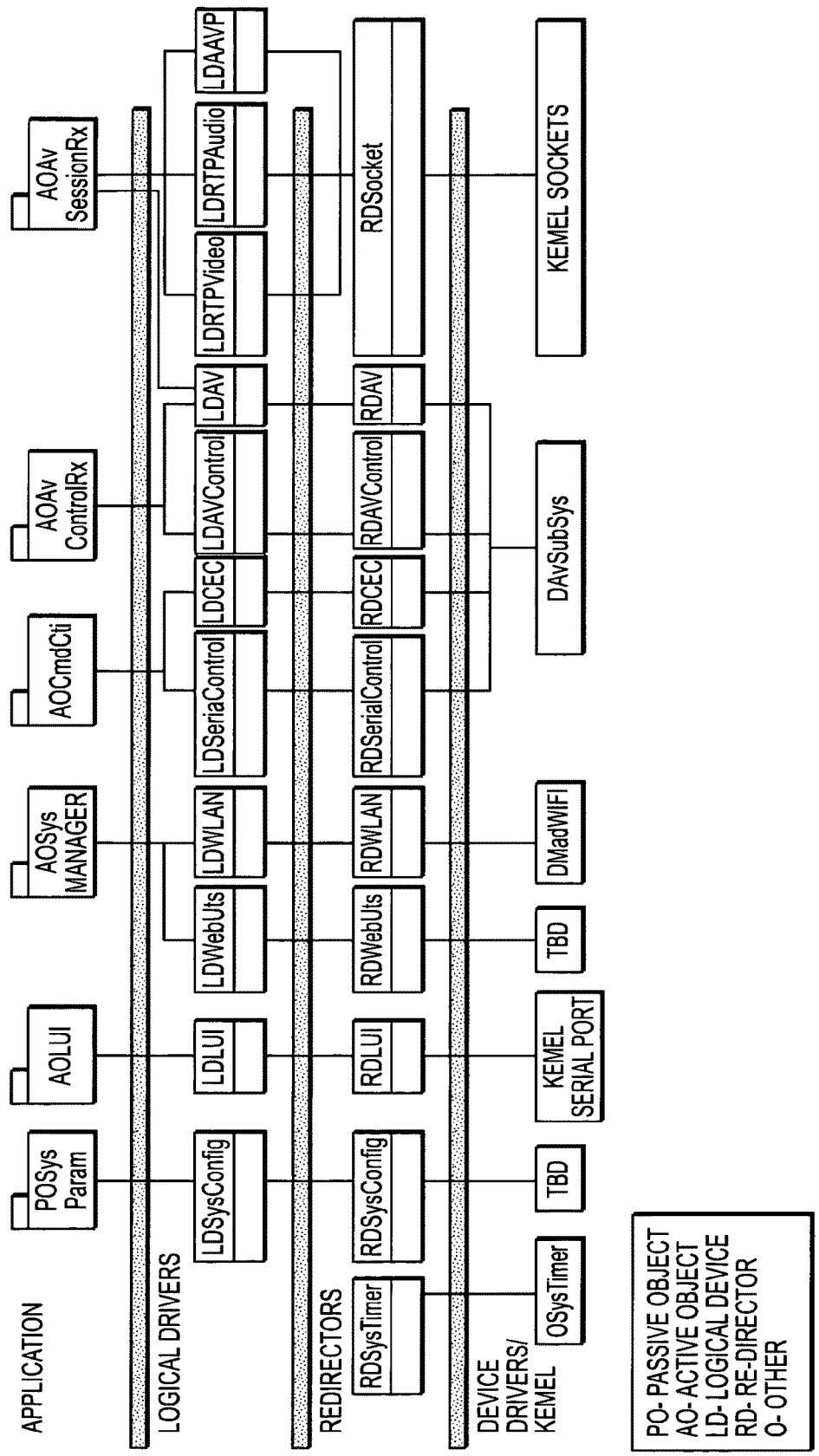

The system architecture can be illustrated by breaking it down into different functional areas and model them as classes. The overall class diagrams for a transmitter and receiver are shown in FIGS. 7 and 8, respectively. There are different types of classes, namely:

1. Active Object Classes: An active object is a state machine with a thread and event queues. It provides an event interface to other objects. It is responsible for modeling the behaviors of one functional area.

2. Passive Object Classes: A passive object is an object without a thread. It provides a function interface to other objects. It does not exhibit state behaviors or process events. Examples include database and utility objects.

3. Logical Driver Classes: A logical driver is an object with a thread and an event queue. Like active objects, it provides an event interface to other objects. However it does not exhibit state behaviors. It serves as an interface to device drivers and network sockets. For example, it is used to convert interrupt status into events.

4. Redirector Classes: A redirector object provides an interface to a device driver or kernel services in order to isolate the upper layers from the actual driver or kernel implementation. It allows us to only swap out the redirector when the underlying hardware or OS is changed.

For classes that are similar or the same for both transmitter 11 and receivers 12, they are shared between the two architectures. As seen in FIGS. 7 and 8, most classes fall into this category. For classes that differ significantly for transmitter 11 and receivers 12, they are distinct in each architecture, such as AOAvSessionTx and AOAvSessionRx.

Active objects are shown as packages in the class diagrams. Each package is composed of the active object itself, as well as any state machine objects implementing the orthogonal regions. This is an overview of the functions of statecharts and class diagrams for active objects:

1. AOSysManager—This is the main active object responsible for overall system control and coordination among active objects. Its tasks include (1) System initialization and reset, (2) Firmware upgrade, and (3) Management of wireless and wired network interface.

2. AOLocalUi—This is the active object that manages the Local User Interface, which includes an LCD front panel and buttons on a transmitter, and signal strength LEDs on a receiver. It handles passing of IR data to the LPC (ARM slave processor). Its tasks include (1) Initialization and firmware upgrade of the ARM slave processor, (2) Button input detection, (3) LCD display and mode control, and (4) LED control.

3. AOAvControlTx—This active object controls the AV subsystem hardware of a transmitter. Its tasks include (1) Hardware initialization, (2) Hot-plug assertion, (3) Video mode detection and configuration, (4) HDCP authentication, and (5) Capturing HDMI control packets (e.g. SPD, ISCR1, ISCR2, ACP) from hardware.

4. AOAvControlRx—This active object controls the AV subsystem hardware of a receiver. Its tasks include (1) Hardware initialization, (2) Hot-plug detection, (3) Video mode configuration, (4) HDCP authentication, (5) Writing HDMI control packets (e.g. SPD, ISCR1, ISCR2, ACP) to hardware.

5. AOAvSessionTx—This active object manages the point-to-multipoint links and sessions from the transmitter to receivers. Its tasks include (1) Link management, including (a) Discovery and validation of new receivers, (b) Assignment of IP addresses to new receivers, and (c) Polling the status of existing receivers; and (2) Session management, including (a)

Session establishment, e.g. sending RTP and A/V parameters to receivers, (b) Receiving audio/video frames from LDAV logical driver and multicast them to receivers using RTP via the LDRTPAudio/LDRTPVideo logical drivers, and (c) Exchanging CEC, HDCP and HDMI control packets with receivers.

6. AOAvSessionRx—This active object manages the point-to-point link and session from a receiver to the transmitter. Its tasks include (1) Link management, including (a) Probing for a transmitter, (b) Joining a transmitter, and (c) Responding to poll requests from the associated transmitter; and (2) Session management, including (a) Session establishment, e.g. receiving RTP and A/V parameters from the transmitter, (b) Reassembly of audio/video frames from received RTP packets, (c) Time synchronization with the transmitter, (d) Playback of audio/video frames to LDAV logical driver, and (e) Exchanging CEC, HDCP and HDMI control packets with the transmitter.

7. AOCmdCtl—This active object manages the flow of command and control data from a transmitter to a receiver, and vice versa. Its tasks include (1) reading serial data from the serial logical driver, (2) processing local IR data (from LDLocalUi), (3) processing remote IR data (from the master receiver), (4) for transmitter, sending the IR & serial data to the master receiver via AOAvSessionTx unless serial pass through is disabled, (5) for receiver, sending the IR & serial data to the transmitter via AOAvSessionRx, (6) writing received serial data to the serial logical driver, unless serial pass through is disabled, (7) publishing IR data to AOLocalUi, and (8) handling CEC.

The AO applications described herein are by way of example. Alternatives could be XFApp or other suitable applications.

The RTP stack protocol is used to transport the audio and video information over the multicast. RTP is a known and popular protocol for transporting real-time data such as audio and video over multicast or unicast network services. It typically runs on top of UDP/IP. It adds a light-weighted header (min 12 bytes) to each packet to carry the sequence number, timestamp, source identifier, etc. An accompanying protocol RTCP provides control functions such as QoS (Quality of Service) reporting and time synchronization.

At least two commercially available RTP stacks are suitable for use in the present embodiments. They are:
ccrtp (http://www.gnu.org/software/ccrtp/)
jrtplib (http://research.edm.luc.ac.be/jori/jrtplib/jrtplib.html)

Although both are suitable, jrtplib is preferred.

Audio and/or video data can be encrypted as they are transmitted across the network, wired or wireless. Various encryption programs are available, including standard cipher algorithms, Secure Socket Layer, OCF (OpenBSD Crytographic Framework), Secure RTP, IPSec, and Openswan. Other encryption schemes will undoubtedly arise in the future. Presently, Openswan is preferred. There are also several approaches for key management, including fixed shared keys, manually set shared keys, and dynamic keys such as described at http://www.securemulticast.org/msec-index.htm. Either manual or fixed shared keys are preferred.

Figure 9:
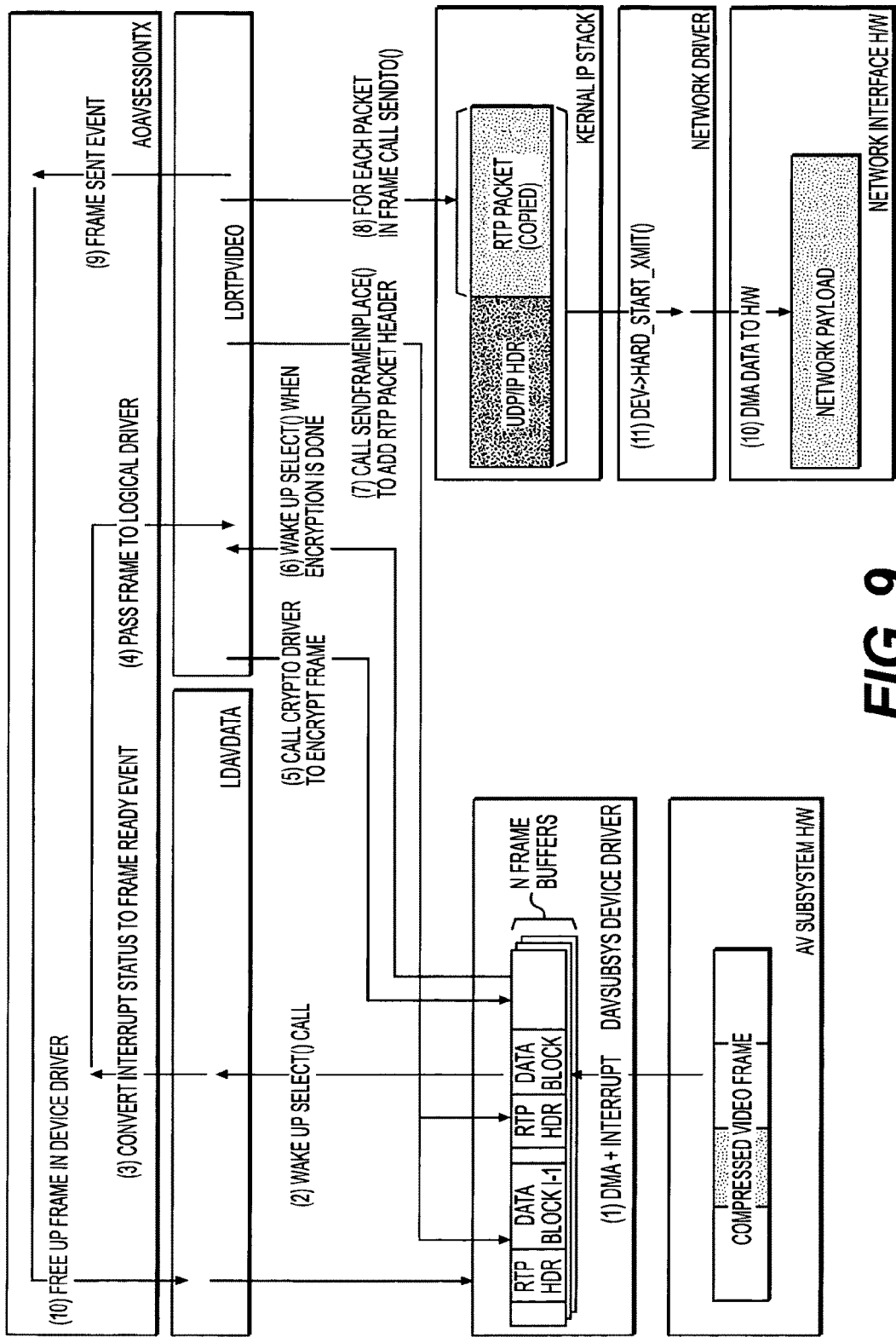
FIGS. 9 and 10 are charts showing data flow for the transmitter and receiver, respectively.

FIG. 9 illustrates the transmission of a video frame using RTP at the transmitter 11. As shown, the hardware signals an interrupt after it has transferred a compressed video frame via DMA to system memory. It breaks the frame into multiple data blocks, leaving gaps in-between for software to insert headers. FIG. 9 shows block i−1 and block i as examples. The device driver wakes up the logical driver which is pending at select( ). The logical driver converts the interrupt status into a frame ready event for the active object. If it is in the right state, the active object passes the frame to the LDRTPVideo logical driver. LDRTPVideo requests the crypto driver to encrypt the frame via an ioctl( ). When it returns, the encryption request has been queued up by the driver. The crypto driver notifies the completion of encryption by waking up LDRTPVideo asynchronously. For each data block in the frame, LDRTPVideo adds an RTP header by calling SendFrameInPlace( ). Since space for the header is already reserved, there is no need to allocate a new buffer and copy the data block. LDRTPVideo sends each RTP packet to the socket by calling sendto( ). It copies the packet to a buffer allocated by the kernel IP stack. After sendto( ) is called for all packets in a frame, LDRTPVideo sends an event to the active object to signal that the frame has been sent (to the socket). The active object releases the ownership of the frame buffer back to the device driver so that it can reuse it to store a new frame. The IP stack adds the UDP and IP headers and asks the network driver to transmit the packet. The network driver sets up a DMA transfer to send the packet to hardware.

Figure 10:
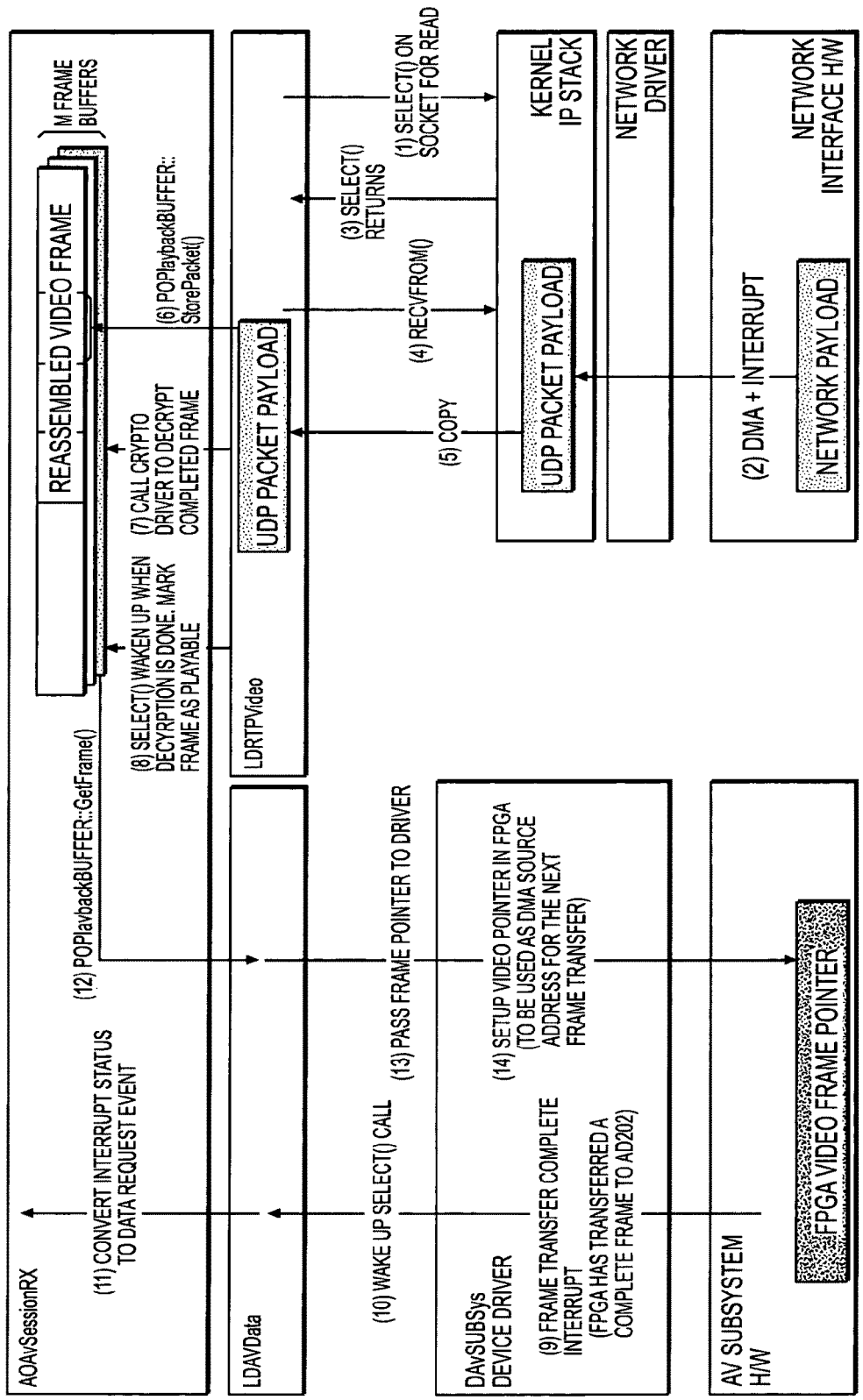

FIG. 10 illustrates the reception of a video frame at the receiver 12. As shown, the LDRTPVideo logical driver waits for packets to arrive by calling select( ) at the socket. When a packet arrives at the network interface, the packet is processed by the kernel IP stack. Since a packet is ready to read, select( ) returns. LDRTPVideo calls recvfrom( ) to read the packet into its buffer. Packet data is copied to the buffer provided by LDRTPVideo. LDRTPVideo call POPlaybackBuffer::StorePacket( ) to store the received packet into the frame buffer to reassemble a complete frame. For efficiency, event is not used here and a function is called directly. Note that the buffer memory is allocated by the AV subsystem device driver. LDRTPVideo calls crypto driver to decrypt the frame when the frame is complete. The crypto driver notifies LDRTPVideo asynchronously when decryption is done. LDRTPVideo marks the frame as playable. The AV subsystem FPGA issues an interrupt when it has completed a frame transfer to AD202 decoder. This interrupt requests software to update the frame pointer in FPGA. Note that the frame pointed to by the original frame pointer in FPGA may still be accessed until the next interrupt. The device driver wakes up the LDAVData logical driver. LDAVData converts the interrupt status into a data request event for the active object. The active object performs time synchronization and gets the frame to playback from the frame buffer. It passes the frame pointer to LDAVData via an event. LDAVData passes the frame pointer to the device driver. The device driver sets up the video frame pointer in FPGA as the next frame to transfer to AD202 decoder.

In order to achieve maximum transmission throughput it is preferable to avoid having the processor copy the data. Therefore a DMA controller within the A/V subsystem FPGA transfers the video/audio data into frame buffers owned by the A/V subsystem driver. The FPGA has an array of pointers to 16 video frame buffers and 16 audio frame buffers. The frame pointer arrays will be initialized by the processor during startup. The FPGA will iterate through all the frame buffers before beginning at the first one again. The frame buffers will be memory mapped by the A/V subsystem logical driver in order to avoid having to copy the data into user space. The A/V subsystem driver will notify the logical driver of the arrival of data. If there is an active session the logical driver will then send an event to AOAvSessionTx to transmit the data, using RTP. Note that the marker bit in the RTP header will be set to indicate the start of a frame. The payload type field will indicate whether the packet is video or audio.

Figure 11:
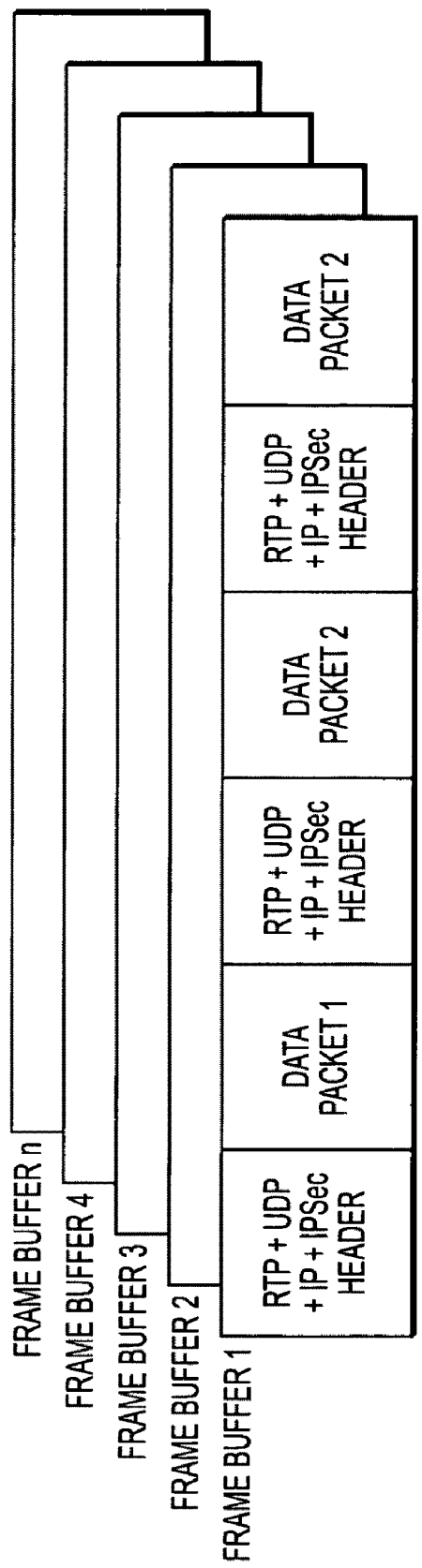
FIG. 11 is a schematic representation of the transmit frame buffers.

FIG. 11 shows example transmit frame buffers. To prevent IP fragmentation the maximum data payload should be the maximum UDP packet size (1472) minus the RTP header, IP header and IPSec header size. In addition the DMA destination address must allow space for the RTP, IP, and IPSec headers to be inserted by the application. The FPGA allows the maximum data packet size and reserved space for a header to be set by the processor.

Figure 12:
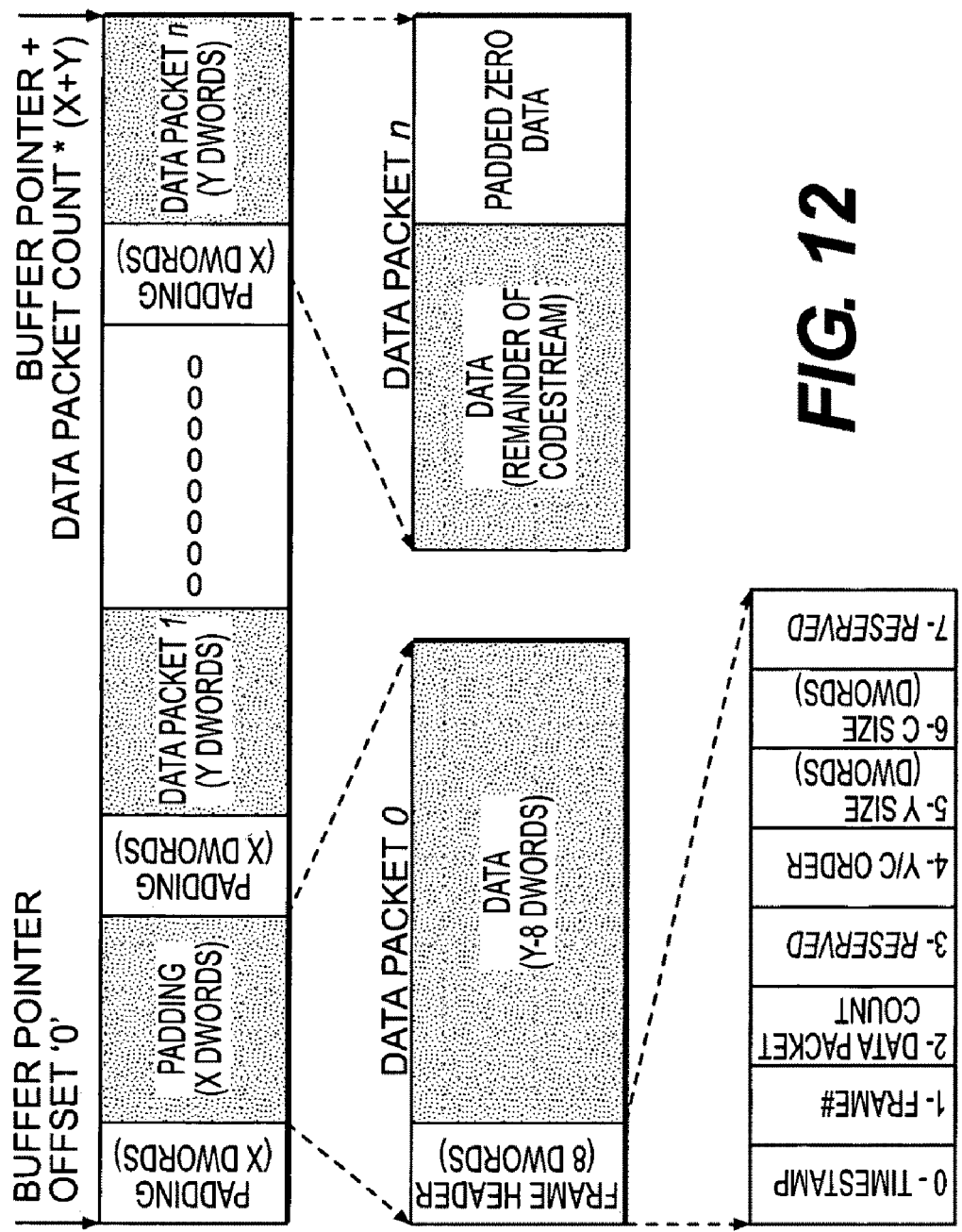
FIG. 12 is a schematic format for the transmitter video frame buffers.

FIG. 12 illustrates how the FPGA places data in a single video frame buffer. The first data packet of the frame has a header appended by the FPGA specifying the timestamp, frame number data packet count, order and size of the chrominance and luminance components.

Figure 13:
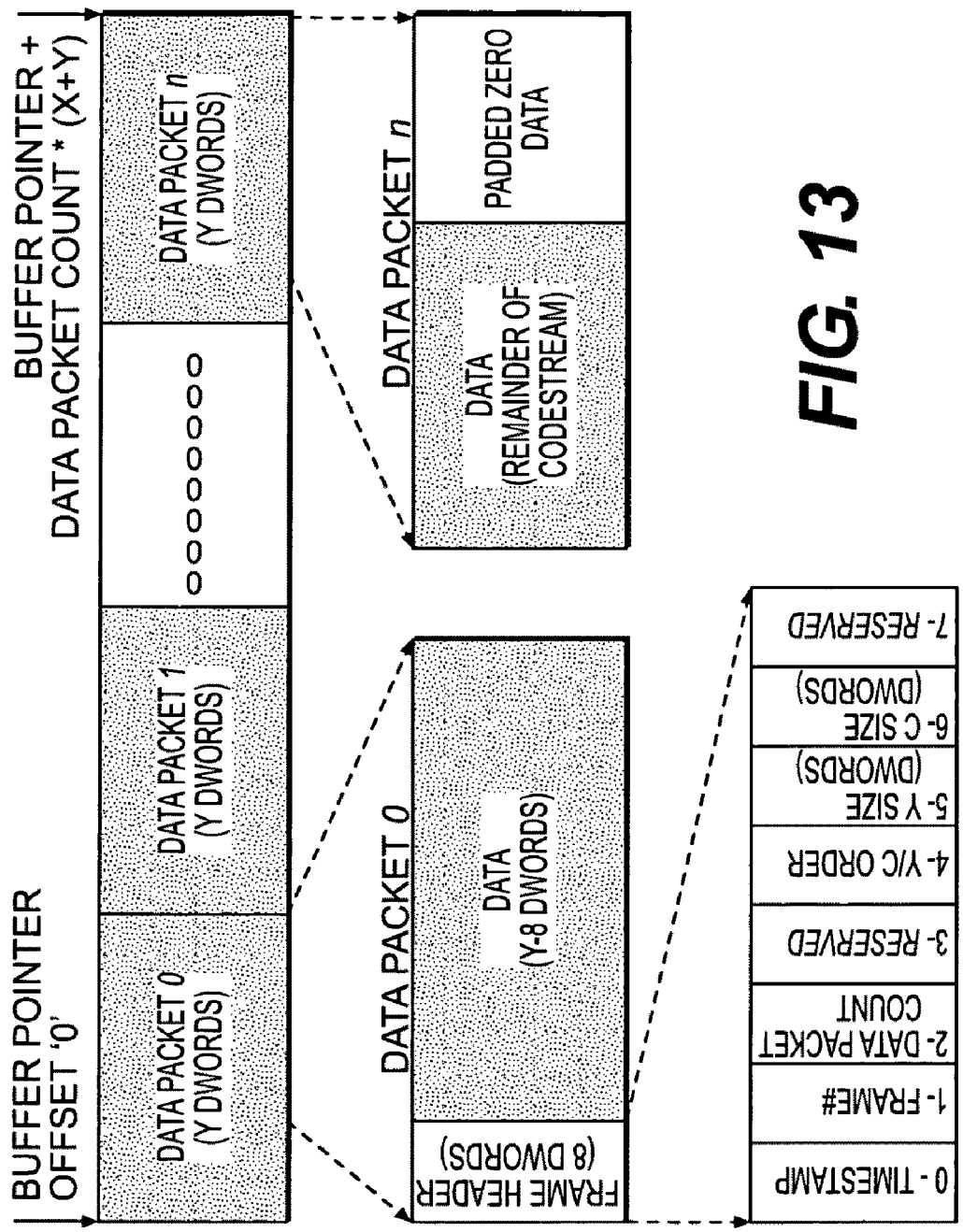
FIG. 13 is a schematic format for the receiver video frame buffers.

The receiver 12 audiovisual subsystem data interface includes an audiovisual subsystem driver that owns an array of receive video and audio frame buffers. An example receive frame buffer format is shown in FIG. 13. The receive frame buffers will be memory mapped by the A/V subsystem logical driver in order to avoid having to copy the data into user space. Video and audio packets minus the RTP header are written to a frame buffer by the AOAvSessionRx object. When a complete frame has arrived the FPGA is informed of the new frame and the next frame buffer can start to be filled by the processor. A frame complete interrupt informs the processor that the frame has been transferred to the decoder and is ready to receive the next frame.

The receivers 12 operate in synchronism. Continuous audio and video streams are delivered in real-time. When using asynchronous networks for data transmission, however, timing information of the media units produced gets lost and a mechanism is required to ensure continuous and synchronous playback at the receiver side. Inter-stream synchronization between audio and video streams, as well as between different receivers are also required.

The paper, Laoutaris, "A Survey of Playout Schedulers" presented a number of synchronization schemes. For this embodiment, the synchronization scheme is a time-orientated one and uses an approximated clock. Media units are timestamped at the transmitter and the receiver clock is synchronized to the transmitter clock at regular intervals. In RTP, this is achieved by using the timestamp field in RTP headers and sending the transmitter clock regularly via RTCP Sender Report packets.

Packets arriving at the receiver are buffered in order to compensate for varying propagation times between the transmitter and receiver. The jitter buffer should be sized to allow for the largest network delay. The total end-to-end delay of a Media unit is fixed and is composed of a variable network delay and buffering delay introduced by the jitter buffer.

Packets that arrive at the receiver with a timestamp larger that the local clock are buffered. Packets that arrive with timestamps smaller the local clock are discarded. Packets are extracted from the buffer and played when the local clock equals their timestamp.

The following sections present the formal and concrete design of the synchronization scheme introduced above. They discuss intra-stream and inter-stream synchronization, as well as how to incorporate reliability into RTP.

1. Intra-Stream Synchronization (Between Transmitter and Receivers)

In this scheme, there is no concept of a global clock. Rather, receivers in the network approximated the transmitter clock and use it to derive the playback clock (or virtual clock).

A. Normalized Offset Between Transmitter and Receiver Clocks

The clocks of the transmitter and receivers are 32-bit counters incremented periodically by the encoding and decoding hardware respectively. They are not physically synchronized to one another so there are offset and will drift among them.

Figure 14:
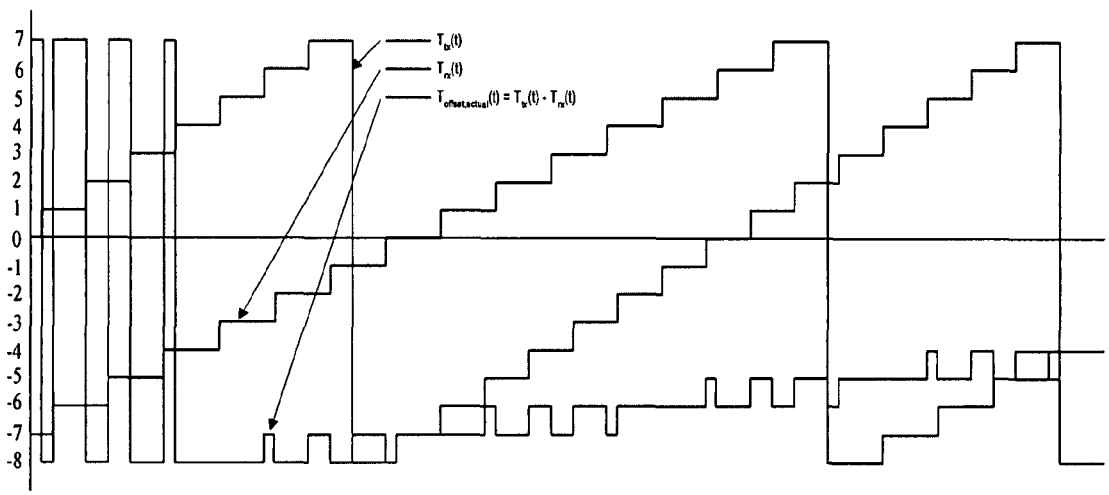
FIG. 14 is a timing diagram of the transmitter and receiver clocks.

Referring to FIG. 14, $T_{tx}(t)$ and $T_{rx}(t)$ are the step functions representing the transmitter and receiver clock values at time t respectively. The goal of synchronization is to produce an accurate estimate of $T_{tx}(t)$, denoted by $T_{tx,\ estimated}(t)$, at the receiver. To achieve this, the transmitter periodically sends its clock value to the receiver via the "RTP timestamp" field in the Sender Report packets. For example at some time $t_n$, it sends $T_{tx}(t_n)$ to the receiver.

When the receiver gets the Sender Report packet at time $t_m$, it measures the current offset between the transmitter and receiver clocks, $T_{offset,\ measured}(t_m)$, by calculating the difference between $T_{tx}(t_n)$ carried by the Sender Report and the current receiver clock value, $T_{rx}(t_m)$. That is:

$$T_{offset,measured}(t_m) = T_{tx}(t_n) - T_{rx}(t_m)$$

Note that all clock and offset values are treated as 32-bit signed integers using 2's complement. That is, 0x7FFFFFFF is the most positive clock value. After one increment, it becomes 0x80000000 which is interpreted as the most negative clock value.

When the offset is positive, we say the transmitter clock is leading the receiver clock. When negative, the transmitter clock is lagging the receiver clock. When zero, the two clocks are in phase. Discontinuity happens when the phase difference between the two clocks crosses 180°. The offset jumps from the most positive to the most negative (or vice versa). For example, consider c=a−b. If a is 0x00001000 and b is 0x80001000, a−b=0x80000000 (most −ve). When b is incremented by just one to be 0x80001001, a−b=0x7FFFFFFF (most +ve). This would cause problems when calculating averages using signed arithmetic. For example, the average of 0x80000000 and 0x7FFFFFFF is zero which incorrectly means in-phase.

To avoid the above problem, we ensure the offset does not overflow or underflow. Let the initial offset at $t_o$ be $T_{offset,\ measured}(t_o)$, we have:

$$T_{offset,measured}(t_o) = T_{tx}(t_p) - T_{rx}(t_o),$$

where $t_p$ is the time when the Sender Report is sent. We derive the normalized receiver clock (FIG. 15) and the normalized offset measured at some time $t_m$ (FIG. 16) as:

$$T'_{rx}(t) = T_{rx}(t) + T_{offset,measured}(t_o)$$

$$T'_{offset,measured}(t_m) = T_{tx}(t_n) - T'_{rx}(t_m) \quad (1)$$

To verify, at initial time $t_o$, $$\begin{aligned}
T'_{offset,measured}(t_o) &= T_{tx}(t_p) - T'_{rx}(t_o) \\
&= T_{tx}(t_p) - T_{rx}(t_o) - T_{offset,measured}(t_o) \\
&= T_{offset,measured}(t_o) - T_{offset,measured}(t_o) \\
&= 0
\end{aligned}$$

Now the initial offset is normalized to 0. Over time, drift between the transmitter and receiver clocks will cause the offset to change slowly. Since the rate of change is so slow, it is safe to assume that the offset will not overflow or underflow before synchronization restarts (for a new RTP session). To validate this argument, assume the resolution of the transmitter and receiver clock is 1 ms (1 increment per ms) and the clock drift is 1 s per minute (which is huge). It would take 4 years for the offset to overflow or underflow.

Figure 16:
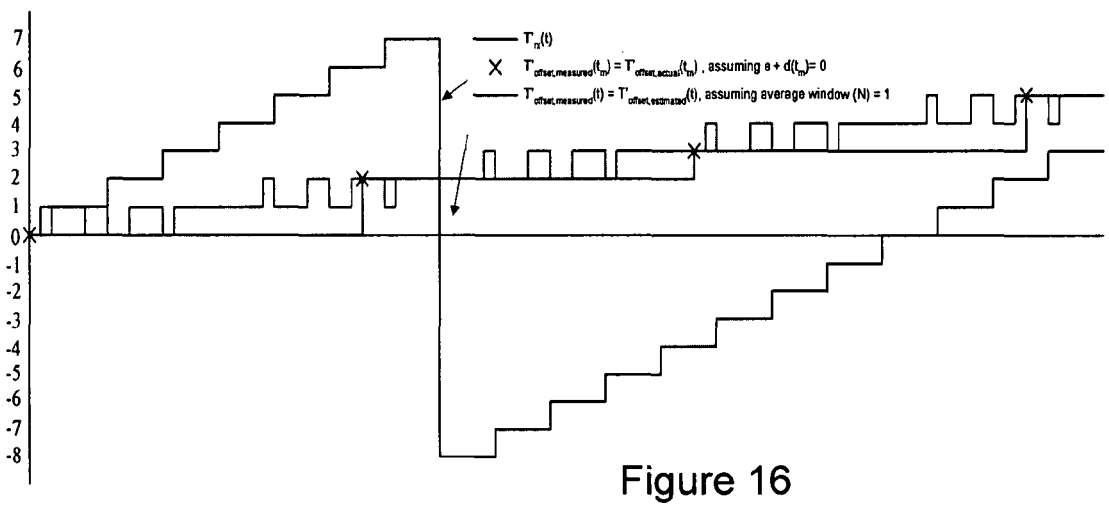
FIG. 16 is a timing diagram of the measured offset between transmitter and receiver clocks.

Using values of $T'_{offset, measured}(t_m)$ for various $t_m$, we can construct the step function $T'_{offset, measured}(t)$ representing the (normalized) measured offset between the transmitter and receiver clocks at time t (FIG. 16).

B. Estimation of Transmitter Clock by Receivers

Figure 15:
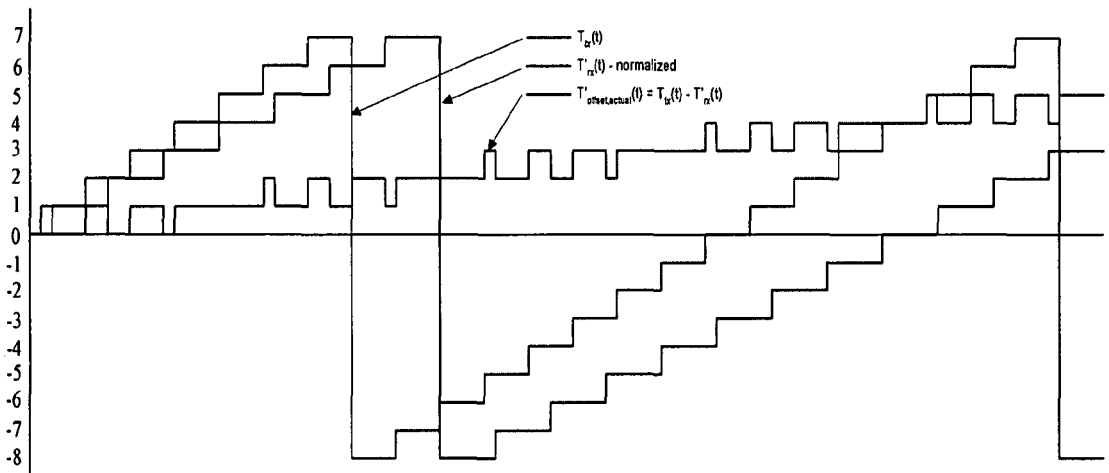
FIG. 15 is a timing diagram of the normalized receiver clock and offset.

In equation (1), because of network and processing delays, $t_n$ and $t_m$ are not identical and hence the measured offset differs from the actual one defined as FIG. 15:

$$T'_{offset,actual}(t)=T_{tx}(t)-T'_{rx}(t)$$

We can represent the measurement error as a constant error $\epsilon$ caused by fixed delays, plus a varying component $\delta(t)$ caused by jitter. Now we have the relation:

$$T'_{offset,actual}(t)=T'_{offset,measured}(t)+\epsilon+\delta(t) \quad (2)$$

Because of clock drift between the transmitter and receiver, $T'_{offset, actual}(t)$ is not constant, but changes slowly over time. However within a small time window, it is almost constant and can be treated as so. Also, $\delta(t)$ averages to zero. Using these two properties, we can estimate the actual offset by calculating the running-average as follows:

Let $\text{average}_{N,L,S}(f(t))$ be the running average of $f(t)$ over the last N samples of $f(t)$, with the largest L samples and the smallest S samples ignored to avoid errors caused by extreme jitters. We have:

$$\begin{aligned}
T'_{offset,estimated}(t) &= \text{average}_{N,L,S}(T'_{offset,measured}(t)) \quad (3)\\
&= \text{average}_{N,L,S}(T'_{offset,actual}(t) - \varepsilon - \delta(t))\\
&\approx \text{average}_{N,L,S}(T'_{offset,actual}(t)) - \varepsilon\\
&\approx T'_{offset,actual}(t) - \varepsilon
\end{aligned}$$

The values of N, L and S are to be determined empirically. Later we prove that the constant error $\epsilon$ can be cancelled out.

Now we introduce $T'_{offset, used}(t)$ to be the offset function actually used by the receiver. In the simplest case, we use the estimated offset function directly:

$$T'_{offset,used}(t)=T'_{offset,estimated}(t) \quad (4)$$

However, as we shall see later, changes in $T'_{offset, estimated}(t)$ over time (due to clock drift) may cause the playback clock to cross the frame boundary which would result in frame skip/repeat. In terms of user experience, it is arguable whether it is better to have frequent but small skip/repeat, or to have rare but large skip/repeat. Introducing $T_{offset, used}(t)$ gives us the flexibility to update it with $T_{offset, estimated}(t)$ only when their difference is larger than a certain threshold. For simplicity, we assume (4) holds for the rest of the discussion.

Figure 17:
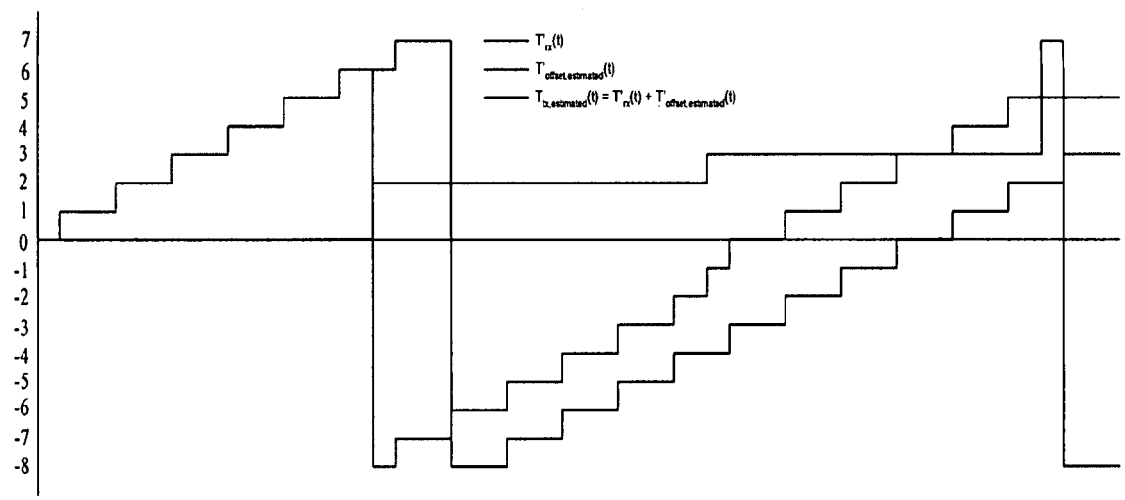
FIG. 17 is a timing diagram of the estimated transmitter clock at the receiver.
Figure 18:
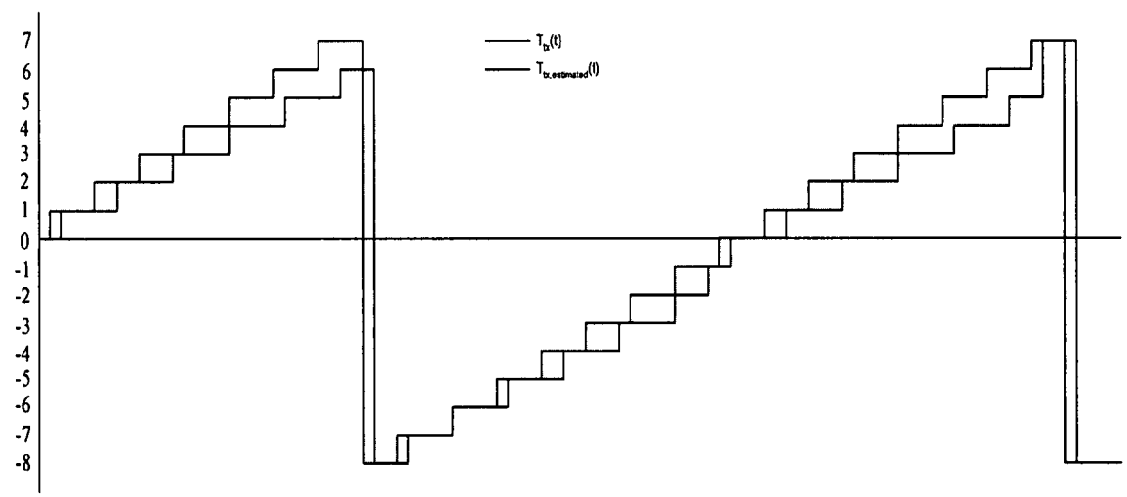
FIG. 18 is a timing diagram of a comparison between estimated and actual transmitter clocks.

With $T_{offset, used}(t)$ defined, the receiver estimates the transmitter clock as below (FIG. 17). FIG. 18 demonstrates how the estimated transmitter clock follows the actual one.

$$\begin{aligned}
T_{tx,estimated}(t) &= T'_{rx}(t) + T'_{offset,used}(t) \quad (5)\\
&= T'_{rx}(t) + T'_{offset,estimated}(t)
\end{aligned}$$

C. Playback Clocks

Once the receiver has an estimate of the transmitter clock, $T_{tx, estimated}(t)$, it can derive the playback clocks from it. Because of the timing difference between audio and video decoding, there are separate playback clocks, $T_{playback, audio}(t)$ and $T_{playback, video}(t)$. They are derived from the estimated transmitter clock as follows:

$$T_{playback,audio}(t)=T_{tx,estimated}(t)-T_{delay,audio} \quad (6a)$$

$$T_{playback,video}(t)=T_{tx,estimated}(t)-T_{delay,video} \quad (6b)$$

where $T_{delay,audio}$ and $T_{delay,video}$ are constant non-negative playback delays (in transmitter clock unit) for audio and video respectively. They allow the receiver to buffer up packets to absorb network and processing jitters.

Now we prove that the playback clock is synchronized to the original transmitter clock within a constant delay. We take audio as example, but it can be generalized to video as well.

$$\begin{aligned}
T_{playback,audio}(t) &= T_{tx,estimated}(t) - T_{delay,audio} \text{ from} \quad (6a)\\
&= T'_{rx}(t) + T'_{offset,estimated}(t) - T_{delay,audio} \text{ from} \quad (5)\\
&\approx T'_{rx}(t) + T'_{offset,actual}(t) - \varepsilon - T_{delay,audio} \text{ from} \quad (3)\\
&= T_{tx}(t) - \varepsilon - T_{delay,audio} \text{ by definition}\\
&= T_{tx}(t) - T'_{delay,audio} \quad (7)
\end{aligned}$$

where $T'_{delay,audio}$ is a constant equal to $T_{delay,audio}+\epsilon$.

D. RTP Timestamps

In each RTP packet, the transmitter puts the transmitter clock value at sampling instant $t_s$, $T_{tx}(t_s)$, into the "timestamp" field of the RTP header. This indicates to the receiver when this packet should be played according to the playback clock, for both audio and video packets. In case time-stamping takes place after video compression, the delay introduced by compression should be compensated to ensure that the packet timestamp represents the sampling instant.

On the receiver side, it saves the received RTP packets into the jitter buffers. The decoding hardware interrupts the processor at fixed frequency equal to the frame rate (according to the receiver clock). We call it the frame interrupt. When handling the frame interrupt, the receiver compares the current playback clocks, $T_{playback,audio}(t_i)$ and $T_{playback,video}(t_i)$ to the "timestamp" fields of the received RTP packets to determine which audio and video packets are to be decoded.

Taking audio as example, the receiver checks whether $T_{playback,audio}(t_i)$ falls into the playback period of each playable audio frame in the jitter buffer, starting from the oldest. As the phrase is used herein, a frame is playable if all of its packets have been received and the frame is decrypted. An audio frame is a set of consecutive audio packets with the same timestamp. The playback period of a frame is defined as the range:

1. if a next playable frame is available in jitter buffer,
   [timestamp of this frame, timestamp of next good frame)
2. otherwise,
   [timestamp of this frame, ∞)

Denote the playback period of a frame as $[P_{lower\ bound}, P_{upper\ bound})$. There are three possibilities:

1. $T_{playback,audio}(t_i)$ within the range.
   (i.e. $T_{playback,audio}(t_i) - P_{lower\ bound} > 0$ and $P_{upper\ bound} - T_{playback,audio}(t_i) > 0$)
   The receiver plays this audio frame.
2. $T_{playback,audio}(t_i)$ earlier than the range.
   (i.e. $P_{lower\ bound} - T_{playback,audio}(t_i) > 0$)
   This means the receiver clock has been running faster than the transmitter clock and it is not the time to play this audio frame yet. The receiver either plays silence, white noise, or the previous frame if one is available (depending on which scheme is best in concealing error.)

3. $T_{playback,audio}(t_i)$ later than the range.
   (i.e. $T_{playback,audio}(t_i) - P_{upper\ bound} >= 0$)
   This means the receiver clock has been running slower than the transmitter clock and the time to play this audio frame has passed. The receiver skips this audio frame and repeats the check on the next frame in the buffer.

As stated before, clock values are interrupted as 32-bit signed integers. This automatically handles the wrap-around cases during comparison. Discontinuity in computing differences is not an issue here since the playback clock is very close the timestamp (far from being 180° out of phase).

In the above example, we observe that packets are sent according to the transmitter clock $T_{tx}(t)$ and they leave the jitter buffer according to the playback clock $T_{playback,audio}(t)$. Since the playback clock is synchronized to the transmitter clock within a constant delay $T'_{delay,audio}$, the number of packets in transit and in the jitter buffer is equal to the number of packets sent in the duration $T'_{delay,audio}$, which is a constant. As the network and processing delays vary, the number of packets in the jitter buffer varies. Provided a large enough buffer, buffer underflow should not happen. In this design, the size of the jitter buffer is determined, empirically without proof.

2. Inter-Stream Synchronization
A. Between Audio and Video Streams

Using intra-stream synchronization explained in the previous section, we can synchronize the playback clock of a stream at the receiver to the transmitter clock. As in this design both audio and video streams are time-stamped using the same clock source, inter-stream synchronization is implicitly achieved by virtue of intra-stream synchronization.

For video stream, all packets of a video frame share the same timestamp as the first packet of the frame. For audio stream, all packets sampled in the duration of a video frame have the same timestamp as the first video packet of the frame. We call the set of those audio packets having the same timestamp to be in an audio frame.

As the decoding time for video packets is longer than that for audio packets, in order to ensure that video and audio packets with the same timestamps output at the decoder simultaneously, the video playback clock $T_{playback,video}(t)$ should be ahead of the audio playback clock $T_{playback,audio}(t)$. That is, the audio playback delay should be larger than the video playback delay and we have:

$$T_{delay,audio} = T_{delay,video} + \eta \quad (8)$$

where $\eta$ is the absolute value of the difference between video and audio decoding times (in transmitter clock unit). $\eta$ is to be determined empirically and has been suggested to be around 2 video frame periods.

B. Among Receivers

Using intra-stream synchronization, the playback clock of a receiver is synchronized to the transmitter clock within a constant delay. Since there is only one transmitter in a network, if all receivers choose the same playback delay ($T_{delay,audio}/T_{delay,video}$), they are effectively synchronized to each other.

Figure 19:
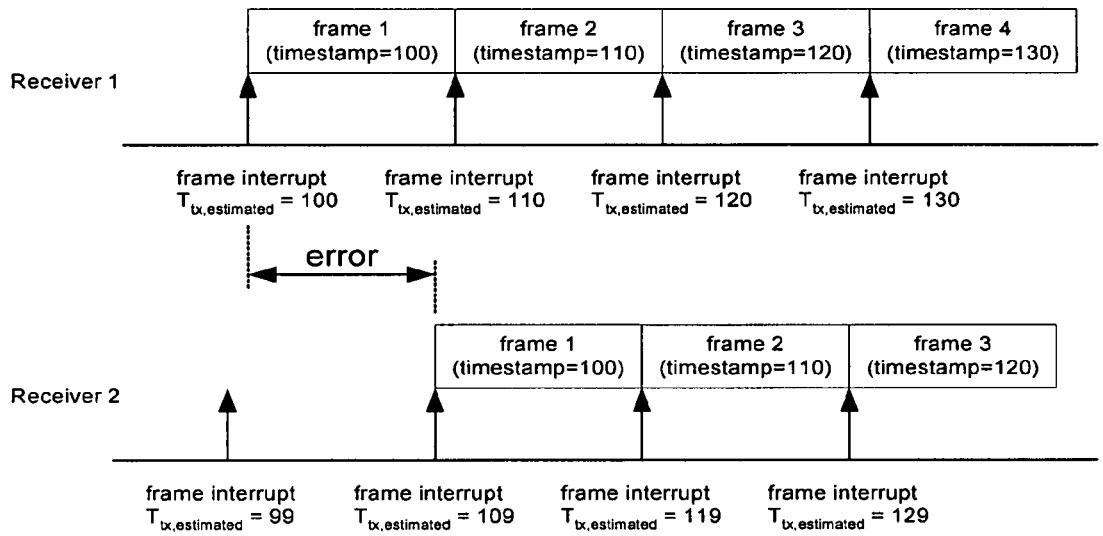
FIG. 19 is a schematic representation of the error caused by phase differences among hardware clocks.

As this synchronization scheme is software-based, the underlying hardware clocks of receivers are still not synchronized. For example, frame interrupts may happen at different times on different receivers. Assuming ideal software synchronization (i.e. $T_{tx,estimated}(t) = T_{tx}(t)$), there are still errors caused by phase differences among hardware clocks, which is upper-bounded by the frame period as illustrated in FIG. 19.

At 30 frames per second, the error is limited by 33 ms. This is acceptable since a delay less than 100 ms will be perceived as reverberation rather than echo.

3. Reliable Multicast

RTP runs on top of UDP which is an unreliable transport protocol. RTP itself does not provide reliability services. In general, this is acceptable to multimedia streams since the emphasis is on efficiency and on meeting the timing requirements of the majority of packets. A retransmitted but delayed packet would be of little use to the user.

While the loss of a single video frame may not be perceived by the user, the loss of an audio frame may be more noticeable. In order to provide a high-quality service, we extend RTP to support reliable multicast for audio. The basic theory has been brought up in an RFC draft called "RTP extension for Scalable Reliable Multicast" dated 1996, which we improve upon and modify into the present environment.

A. Sequence Numbers

The order of packets is identified by a 16-bit sequence number in the RTP header. It increments by one for each packet sent. When it reaches 0xFFFF, it wraps around to 0. Sequence numbers are interpreted as 16-bit signed shorts using 2's complements. Signed arithmetic automatically handles wrap around cases when comparing sequence numbers. Given two sequence numbers a and b, we say a leads (is ahead of) b if a−b>0 and a lags (is behind) b if a−b<0.

A tricky situation occurs when a and b are offset by about half of the total range. A small change in a or b would cause a−b to jump from the most positive to the most negative. In other words, it is ambiguous whether a leads b by vice versa. In reality, we will only compare sequence numbers within a small window relative to the total range, and therefore the ambiguity would not occur.

To assist frame re-assembly, the fixed RTP header is extended to include fields "frame number" and "packet number". Frame number increments by one for each audio/video frame sent and packet number identifies the position of the packet in the frame. They help locate the space in the frame buffer to store a received packet. Like sequence number, the frame number is interpreted as a signed integer (32-bit).

B. Detection of Lost Packets

Unlike TCP in which senders detect packet losses via positive acknowledgements (ACKs), this design places that responsibility to receivers by using negative acknowledgements (NACK), which reduces communication overheads.

Let the sequence number of the first received packet be $N_0$. When the receiver gets the first packet, it sets the expected sequence number $N_{expected}$ to $N_0+1$.

When the receiver gets a packet, it compares its sequence number $N_k$ to $N_{expected}$. There are several possibilities:

1. $N_k = N_{expected}$
   This is the normal case in which the sequence number of the received packet matches the expected one. It means it is an in-order packet. $N_{expected}$ increments by one.

2. $N_k$ leads $N_{expected}$
   ($N_k - N_{expected} > 0$)
   This indicates some packet(s) are missing, which may be caused by packet loss or out-of-order delivery. The number of missing packets is equal to $N_k - N_{expected}$. We add entries for all missing packets to a linked list of MissingPacket objects defined as:

class MissingPacket

```
{
short seqNum;        // sequence number of packet
int nackTime;        // time to send NACKs to transmitter
int ignoreTime;      // until which to ignore duplicate NACKs
};
```

This linked list stores the sequence numbers of missing packets. The purpose of nackTime is to avoid all receivers missing the same packet from sending NACKs at the same time. The purpose of ignoreTime is to allow the receiver to ignore duplicate NACKs arriving within a short period. Their uses are explained in the next section.

Finally, we set $N_{expected}=N_k+1$.

3. $N_k$ lags $N_{expected}$
 $(N_k-N_{expected}<0)$

This indicates an earlier missing packet or a duplicate packet has arrived. If it is a duplicate, it is discarded. If it is a missing packet, it is either delivered out-of-order or retransmitted. In either case, it is stored to the frame buffer and its entry in the linked list of MissingPacket objects is removed.

C. NACK Suppression

In a multicast environment, a packet is sent to multiple receivers. If one receiver misses a packet, it is likely that others miss it too. If all receivers send NACKs at the same time, it may cause network congestion and result in more packet losses. Besides, since a successful retransmission after a single NACK is seen by all receivers, multiple NACKs are unnecessary.

The solution is to have receivers waiting for random times before sending NACKs. We maintain the timer by MissingPacket::nackTime (called nackTime for brevity). It is more scalable than creating a framework-based timer object for each missing packet. When a missing packet is detected, we initialize nackTime according to:

$$\text{nackTime}=T_{rx}(t_c)+\text{multiplier}(\text{timeout\_count})*T_{nack\_wait} \quad (9)$$

where $T_{rx}(t_c)$ is the current receiver clock value, timeout_count is the number of times the timer expired (which is zero here) and $T_{nack\_wait}$ is the initial duration to wait-before-sending NACKs. The function multiplier(n) determines by how much the timeout period is increased after each time-out. The function is to be determined but it is required that multiplier(0)=1 and multiplier(n+1)>=multiplier(n). Possibilities include linear (1+n), exponential (2^n) or constant (1). Incidentally, ignoreTime is initialized to $T_{rx}(t_c)$ such that NACKs will not be ignored initially (see later). The choice of $T_{nack\_wait}$ will be discussed later.

The receiver checks for time-outs periodically by means of interrupts, such as frame interrupts. It scans the list of MissingPacket objects and for each object compares nackTime against the current receiver clock value $T_{rx}(t_c)$. If the timer expires (i.e. $T_{rx}(t_c)-\text{nackTime}>=0$), it multicasts NACKs to request for retransmission. Note that multiple sequence numbers can be carried by one NACKs packet to reduce overhead. After sending NACKs, the receiver increments timeout_count and resets nackTime according to (9) to wait for retransmission. It also sets up ignoreTime as explained in the next paragraph.

If the missing packet is received before time-out, the timer is canceled and its entry in the linked list of MissingPacket objects is removed. If a NACKs packet is received and is not ignored (see later), the receiver treats it as time-out. It increments timeout_count and resets nackTime according to (9) to wait for retransmission. To avoid duplicate NACKs causing nackTime to increase multiple times in a short period, after resetting nackTime, the receiver sets ignoreTime halfway between the current time and the new nackTime. If a NACKs is received before nackTime (i.e. $T_{rx}(t_c)-\text{ignoreTime}<0$), it is ignored. As a special case, set ignoreTime to the current time to not ignore any NACKs.

The original RFC draft requires each receiver sets its initial wait time ($T_{nack\_wait}$) to be a random number within in a certain range [C1, C2] where C1 and C2 are constants. The purpose is to avoid receivers sending NACKs simultaneously. In this design, time-outs are polled by means of interrupts. Assuming frame interrupts are used, the resolution of timeout is limited by the period of frame interrupts, which is 16 ms at 30 frames/sec. With such course resolution, in order to provide enough randomness, the range [C1, C2] should be large. It means a longer wait time before sending NACKs and hence calls for a longer playback delay, which is undesirable.

Fortunately, by the fact that the hardware clock of different receivers are not synchronized to each other, there is a random phase difference between the frame interrupts on any two receivers. As a result, there is randomness in the time when a receiver checks for time-outs and sends NACKs. Therefore, we can choose [C1, C2] to be a small range, yet provides enough randomness. C1 and C2 are to be determined empirically. Possible values are C1=frame period (in receiver clock unit) and C2=2*C1.

D. Retransmission Suppression

Even with NACKs suppression, multiple NACKs from different receivers for the same missing packet may still reach the transmitter within a short period. It is unnecessary to retransmit the packet multiple times. The solution is to start a timer after retransmitting a packet. If NACKs for the same packet arrive before time-out, they are ignored.

First we introduce the class ReTxPacket:

class ReTxPacket

```
{
short seqNum;        // sequence number of packet
int ignoreTime;      // until which to ignore duplicate NACKs
};
```

After a packet is re-sent, the transmitter adds an entry for it in the linked list of ReTxPacket objects. The entry contains its sequence number and the time until which retransmission requests for the same packet are to be ignored. The time is initialized to:

$$\text{ignoreTime}=T_{tx}(t_c)+T_{ignore} \quad (10)$$

where $T_{tx}(t_c)$ is the current transmitter clock value and $T_{ignore}$ is the ignoring duration. $T_{ignore}$ is a constant to be determined empirically.

When a NACKs is received, the transmitter checks the sequence number(s) it contains against those in the linked list of ReTxPacket objects. For each matched object, it checks if ignoreTime has expired. If not (i.e. $T_{tx}(t_c)-\text{ignoreTime}<0$), the retransmission request for that packet is ignored.

The transmitter loops through the linked list of ReTxPacket objects periodically to purge entries with expired ignoreTime.

Figure 20:
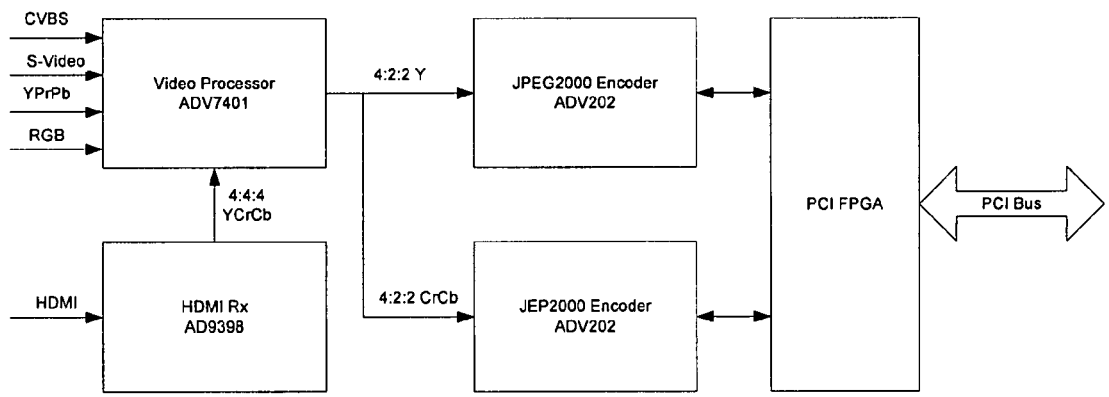
FIG. 20 is a schematic of the encode video path.

Next, the transmitter A/V subsystem control is described with respect to FIG. 20. The HDMI receiver supports the following input pixel encodings.

4:4:4 YCrCb 8 bit
4:2:2 YCrCb 8, 10, and 12 bit
RGB 8 bit

The output of the HDMI receiver is connected to the digital interface of a multi-format video decoder and graphics digitizer. Regardless of the input pixel encoding the HDMI receiver colorspace converter must be used to set the pixel encoding to 4:4:4 YCbCr 24 bit as this is required by the Component Processor of the video decoder. The colorspace converter of the video decoder is used to convert the output to 4:2:2 YCrCb 16 bit necessary for the JPEG2000 encoder. ally to purge entries with expired ignoreTime.

HDMI carries auxiliary data that describe the active audio and video streams. This includes the following data.
  Auxiliary Video Information (AVI) InfoFrame
  Audio InfoFrame
  Source Product Description (SPD) InfoFrame
  Audio Content Protection (ACP) Packets
  International Standard Recording Code ISRC1/ISRC2 Packets The auxiliary data needs to be sent from the source to the sink. In our product this data is treated as out-of-band information and will be sent as control packets over the wired or wireless link. The format of infoFrames and infoPackets can be found in the CEA-861B specification.

When the video source is DVI separate inputs are used for audio. An audio CODEC is used to generate an I2S digital audio stream.

The host processor is required to perform initial configuration of the A/V Subsystem. In addition configuration is required whenever the video resolution or audio format of the source changes. At a high level the following is required.

The HDMI Receiver of FIG. 20 performs the following:
1. Set audio PLL and VCO range
2. Set HSYNC and VSYNC source, polarity and timing
3. If the input encoding is not 4:4:4 YCrCb enable the color space converter and program the coefficients
4. Enable BT656—Start of Active Video (SAV) and End of Active Video (EAV) controls
5. Enable SPDIF audio output
6. Monitor the New Data Flags (NDFs) to detect changes in the auxiliary data
7. Read the AVI, audio and SPD Inframes along with ACP and ISRC1/C2 packets, to send to the receiver The Video Decoder of FIG. 20 performs the following:
1. Set the global registers
2. Set the primary mode to HDMI support
3. Set video standard
4. Set the color space converter to output 4:2:2 YCrCb
5. Set the Component Processor registers The JPEG2000 Encoder of FIG. 20 performs the following:
1. Set PLL registers
2. Set bus mode
3. Load encode firmware
4. Set encode parameters
5. Set dimension registers (If custom mode)
6. Start program In order to support custom formats the dimension registers must be set using the information available in the AVI InfoFrame.

Figure 21:
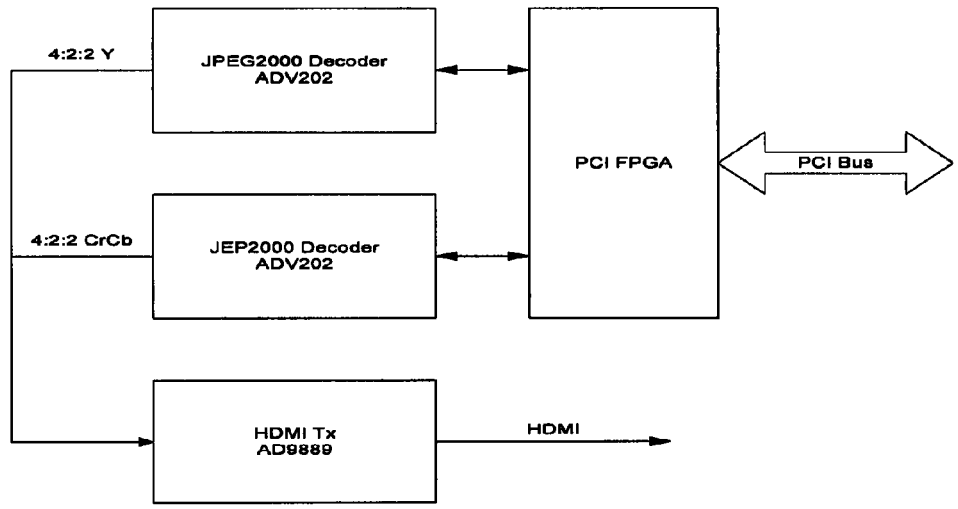
FIG. 21 is a schematic of the decode video path.

The Audio CODEC (TLV320AIC33) of FIG. 20 performs the following:
1. Set the PLL
2. Select the input source
3. Setup the Programmable Gain Amplifier (PGA)
4. Select I2S output
5. Setup the DAC and outputs to provide local audio The receiver A/V subsystem control will now be described with respect to FIG. 21.

In the receiver the host processor sends video frames to the JPEG2000 decoder via the A/V subsystem FPGA. A HDMI transmitter receives uncompressed video from the decoder and outputs an HDMI stream. Audio frames are sent to the A/V subsystem FPGA which after processing forwards the audio data to the HDMI transmitter as well as the audio CODEC. When the source is DVI audio is supplied via separate audio connectors from the audio CODEC.

The host processor performs the following configurations:
JPEG2000 Decoder (ADV202)
  Set PLL registers
  Set busmode
  Load decode firmware
  Set decode parameters
  Set dimension registers
  Start program For custom formats the values for programming the dimension registers come form the AVI InfoFrame sent by the transmitter at the start of a session and whenever a resolution change is detected.

HDMI Transmitter (ADV9889)
  Set audio type to S/PDIF
  Set audio registers (N and CTS parameters)
  Set input pixel encoding to 4:2:2 YCrCb 16 bit with embedded syncs
  Set color space converter to set the output pixel encoding to be the same as the video source Audio CODEC (TLV320AIC33)
  Set the PLL
  Set the volume control and effects
  Select the analog output The Display Data Channel will now be described.

The enhanced display data channel (E-DDC) is used by the Source to read the Sink's Enhanced Extended Display Identification Data (E-EDID) in order to discover the Sink's configuration and/or capabilities. HDMI Sources are expected to read the Sink's E-EDID and to deliver only the audio and video formats that are supported by the Sink. All Sinks contain an EIA/CEA-861B compliant E-EDID data structure accessible through the E-DDC.

Extended EDID (E-EDID) supports up to 256 Segments. A segment is a 256 byte segment of EDID containing one or two EDID blocks. A normal HDMI system will have only two EDID blocks and so will only use segment 0. The first EDID block is always a base EDID version 3 structure 128 bytes in length. This structure contains a Vendor Specific data block defined for HDMI systems and holds the 2-byte Source Physical Address field used for CEC message addressing. The second EDID block is not used by HDMI devices.

The HDMI transmitter reads EDID segment 0 of the connected display device when the Hot-Plug-Detect is asserted and generates an EDID Ready interrupt. The System processor can read the EDID segment via the I2C bus and send it via an out-of-band packet to the transmitter.

The system acts as a Repeater with a Duplicator function i.e. Single-input, multiple-output device, where more than one output is active. The transmitter needs to determine the video standard and audio format to use based on the EDID data from all the receivers in the system. The video standard used must be suitable for the lowest resolution display.

The HDMI/DVI source also prevents all protected audiovisual data from being copied. Content protection is provided by High-bandwidth Digital Content Protection (HDCP) specification version 1.10.

The HDCP Authentication protocol is an exchange between an HDCP Transmitter and an HDCP Receiver that affirms to the HDCP Transmitter that the HDCP Receiver is authorized to receive HDCP Content. This affirmation is in the form of the HDCP Receiver demonstrating knowledge of a set of secret device keys. Each HDCP Device is provided with a unique set of secret device keys, referred to as the Device Private Keys, from the Digital Content Protection LLC. The communication exchange, which allows for the receiver to demonstrate knowledge of such secret device keys, also provides for both HDCP Devices to generate a shared secret value that cannot be determined by eavesdroppers on this exchange. By having this shared secret formation melded into the demonstration of authorization, the shared secret can then be used as a symmetric key to encrypt HDCP Content intended only for the Authorized Device. Thus, a communication path is established between the HDCP Transmitter and HDCP Receiver that only Authorized Devices can access.

Through a process defined in the HDCP Adopter's License, the Digital Content Protection LLC may determine that a set of Device Private Keys has been compromised. If so, it places the corresponding KSV on a revocation list that the HDCP Transmitter checks during authentication. Revocation lists are provided as part of the source media (i.e. on the DVD). Other authorized HDCP receivers are not affected by this revocation because they have different sets of Device Private Keys.

An HDMI Transmitter at the source (i.e. a DVD player) can initiate authentication at any time. The HDMI Receiver responds by sending a response message containing the receivers Key Selection Vector (KSV). The HDCP Transmitter verifies that the HDCP Receiver's KSV has not been revoked.

The Receiver must gather the authentication data of all downstream sinks and report it back to the Transmitter. The required data is as follows.

KSV lists—The KSV's from all attached displays.
Device Count—The number of displays/repeaters in the connection topology.
Depth—The number of connection layers in the topology.
Max_Cascade_Exceeded—A flag that is set if Depth exceeds a maximum value (for example, 7).
Max_Devs_Exceeded—A flag that is set if the Device Count exceeds a maximum value (for example, 127).

The HDMI transmitter EDID and HDCP controller is a state machine that is implemented in hardware. Its purpose is to retrieve the EDID and Key Selection Vectors from downstream receivers. The following steps illustrate the sequence in which the state machine performs the EDID and HDCP handling. This process takes place every time a Hot Plug Detect is sensed (as described in step 1). It will also take place every time the transmitter requests a re-authorization. In this case, software would begin the re-authorization at step 4.

1. Hot Plug Detect goes high (toggled by the attached display)
2. The AD9889 automatically reads EDID segment 0. The EDID Ready flag (0xC5[4]) is set once the EDID has been read successfully and sends an EDID Ready interrupt to the system.
3. After receiving EDID Ready interrupt, the system software evaluates the EDID. (EDID data is stored under at I2C address 0x7E, beginning at offset 0.
4. Once the Receiver has set the video/audio mode it then sets the HDCP Desired bit (0xAF[7]) to high. The HDMI/DVI bit (0xAF[1]) should not be changed after setting the HDCP Desired bit.
5. The receiver's BKSV is reported in the BKSV registers (0xBF-0xC3), the BKSV flag is set (0xC7[7]) (generates an interrupt) and the BKSV count (0xC7[6:0]) is set to 0 by the AD9889.
6. Upon receiving the BKSV flag interrupt, the system software reads the BKSV and clears the BKSV Flag interrupt.
7. Once the BKSV flag is cleared, the AD9889 begins HDCP encryption and checks if the receiver is a repeater.
    a. If not a repeater, then HDCP initialization is complete and the AD9889 begins HDCP management, the firmware will know if this state is reached when HDCP Controller State (0xC8) reaches state '4'. Process complete.
        i. One BKSV should be stored by software at this point.
        ii. DEVICE_COUNT=1
        iii. DEPTH=0
        iv. MAX_DEVS_EXCEEDED=0
        v. MAX_CASCADE_EXCEEDED=0
    b. If the Receiver is a repeater the AD9889 must complete the HDCP repeater authentication, the HDCP Controller State will not reach state '4'. Continue to step 8.
8. The AD9889 reads up to 13 KSV's from the downstream repeater (the AD9889 can only process 13 at a time)
9. The AD9889 signals a BKSV Flag interrupt with the BKSV count (can be up to 13)
10. System software reads bStatus from EDID memory space (device 0x7E) registers 0xF9 (LSB) and 0xFA (MSB). (Only read the first time through this loop)
11. bStatus[6:0] contains DEVICE_COUNT.
12. bStatus[7] contains MAX_DEVS_EXCEEDED.
13. bStatus[10:8] contains DEPTH.
14. bStatus[11] contains MAX_CASCADE_EXCEEDED.
15. If either of the 'MAX . . . ' values are set to 1, then we can exit this routine and just forward those status flags upstream. (Depth and Device_Count don't matter when the maximums are exceeded). Process Complete.
16. System firmware reads the BKSV Count to see how many valid BKSV's are in EDID memory.
17. System firmware reads the BKSV's from the EDID memory. This list of BKSVs is stored in a separate memory space inside the AD9889 that can be accessed by using the I2C device address 0x7E (instead of 0x72 or 0x7A). When you read from this I2C device, up to 13 BKSVs from downstream devices will be in the memory starting with offset 0x00 then 0x05 . . . etc.
18. System software clears the BKSV Flag interrupt.
19. If more KSV's remain (there are more than 13 downstream devices) then go back to step 9. Software will know if more keys remain from the DEVICE_COUNT field read in step 11.
20. System software now has a full list of all downstream KSV's+the directly attached BKSV.

Once the Authentication is complete the AD9889 will manage the ongoing HDCP link authentication every 128 frames. A failure authentication will generate an HDCP/EDID Controller Error interrupt and restart the HDCP authentication.

The system firmware should periodically check the state of the "Encryption ON" status bit (0xB8 [6]) while sending protected audio or video to ensure that HDCP is enabled. This should be checked with a frequency of no less than once every two seconds. Checking this bit protects against third party meddling with the AD9889's register settings to defeat HDCP.

The Transmitter must consolidate all downstream Receiver KSV lists into a single list. The list is represented by a contiguous set of bytes, with each KSV occupying 5 bytes stored in little-endian order. The total length of the KSV list is 5 bytes time the total number of downstream sinks.

The Transmitter must also compare all DEPTH parameters from each attached Receiver. The maximum reported DEPTH will be incremented by 1 and reported to the source. If the new DEPTH is greater than 7, then MAX_CASCADE_EXCEEDED shall be set to 1.

The Transmitter must also collect all DEVICE_COUNT parameters from each Receiver, these numbers will be added together for a total DEVICE_COUNT to be reported to the source. If the total is greater than a maximum value (for example, 127), then MAX_DEVS_EXCEEDED shall be set to 1.

The authentication data must be forwarded to the source by the HDMI Receiver in the Transmitter. An issue here is that AD9398 doesn't provide documented registers for doing this. This issue will be solved with a new ADI HDMI Receiver (AD9399) that will be used in the production hardware.

In addition to HDCP a source may use the ACP packet to convey content-related information regarding the active audio stream. ACP packets received from the source need to be sent to all receivers in the system. The content of the ACP packet is used to program the HDMI transmitter.

This section describes the local user interface, and in particular, the set of messages between the main board and the front panel controller, including the firmware design of the front panel controller. The term "front panel controller" refers to the following components:

LPC2103 ARM7 processor
Noritake MN11216A Vacuum Florescent Display
IR Receiver
IR Transmitter
Buttons physically attached to the front of the unit
LEDs visible on the front of the unit These components may be located on the physical front panel board or the main board. They are all controlled by the LPC2103 processor and compose the "logic" front panel of the unit.

The front panel uses a simple control loop in the "main" function to control the system. This loop checks for event indications from the Interrupt Service Routines (ISRs). The only hardware device that this updated outside an ISR is the vacuum florescent display. Display update timing is controlled by timer0 but the updates are carried out in the foreground.

Figure 22:
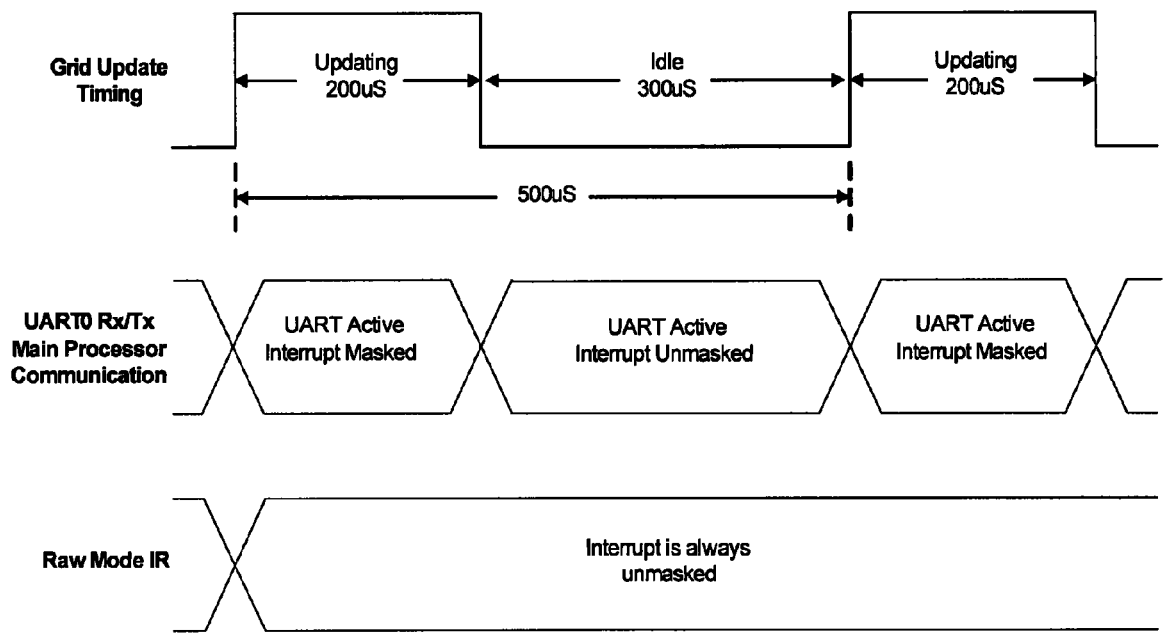
FIG. 22 is a timing diagram of the interrupt timing.

These ISRs run independently of the main loop:
Timer0—display update timer
Timer1—Capture incoming IR data (external capture mode)
Timer2—Drive outgoing IR data (drive external match pin)
UART0—IXP455 communication As shown in FIG. 22, UART interrupts are masked during display updates. The UART has a 16 byte deep FIFO which will prevent data loss while the interrupts are masked. The timer capture and match interrupts supporting IR are not masked during display updates.

During normal operation without IR traffic the display update will block for 200 of every 500 micro seconds.

Flash updates need to be done at the end of a full display update to prevent the display from scrolling. A 256 byte flash update requires 1 mS during which time all ISRs must be masked. Empirical testing shows that a 2 mS delay between the end of one display update and the start of the next is not noticeable on the display. Blocking the UART ISRs for a millisecond may cause data lost depending the on the baud rate and how many bytes are in the fifo when interrupts are masked. Blocking the timer capture and mask interrupts for a millisecond will disrupt IR traffic. The flash update can be held off until the IR transmitter is idle but there is no way to process received IR data during a flash write.

Figure 23:
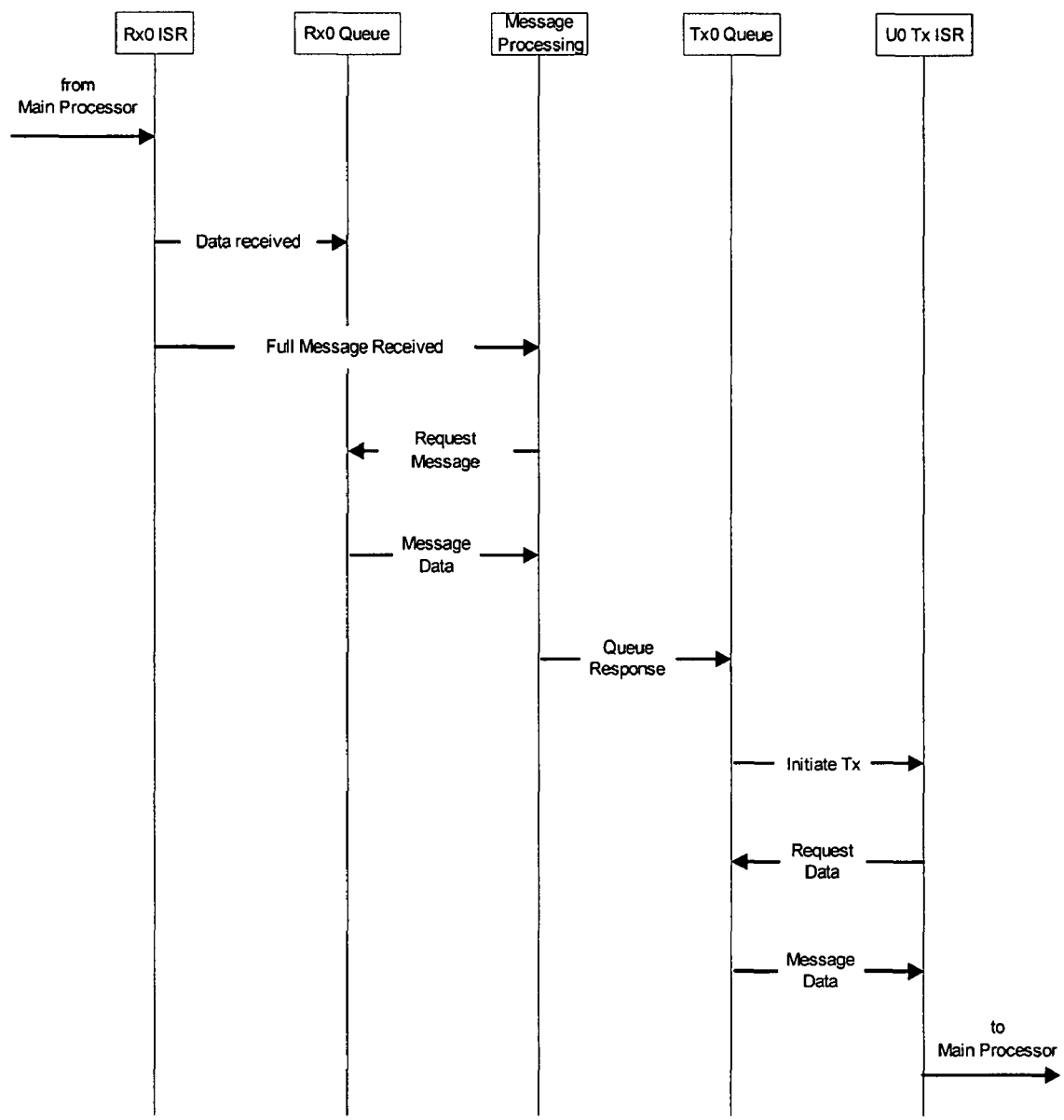
FIG. 23 is a schematic representation of an example main processor communications sequence.

Inter-processor communication is shown in FIG. 23. It is done using a UART on the LPC2103 and another UART on the IXP455. The basic message format is:
Leader <STX>
Size
Command
Payload
Trailer <ETX>

The values of STX and ETX will be contained in some of the binary data involved in the IR messages. The message processor validates messages it removes from the RX queue to correctly assemble messages.

The transmitter units contain a Noritake vacuum florescent display (VFD) on the front panel. The display characteristics are as follows:

Pixel based 112×16 VDF
Smallest updatable unit is a grid, 6×16 pixels
The maximum time to update the complete display is 10 mS per the Noritake specification. We are currently updating the entire display every 20 mS without any noticeable dimming or flicker in the display.
Grid updates are only interrupted by timer 1 and 2 when the IR is running in raw mode. These ISRs must be extremely fast. Interrupting the display for to long can result in visible problems.

The physical display is updated a single grid at a time. Grid updates are controlled by timer0, match register 0, which expires and interrupts every 500 uS. A grid update requires approximately 200 uS.

Figure 24:
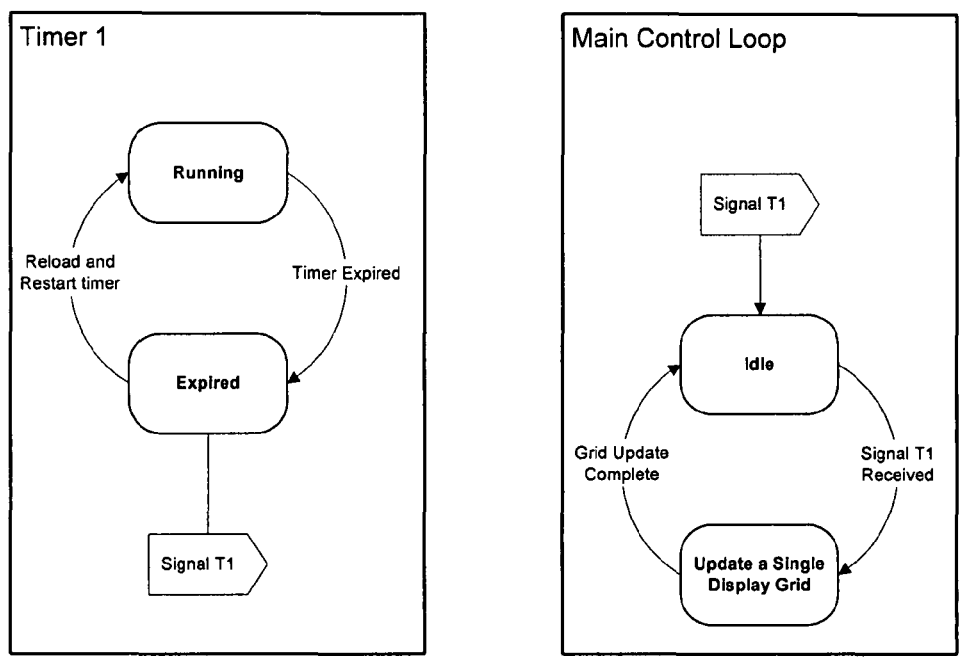
FIGS. 24-25 are diagrams of example display update sequences.
Figure 25:
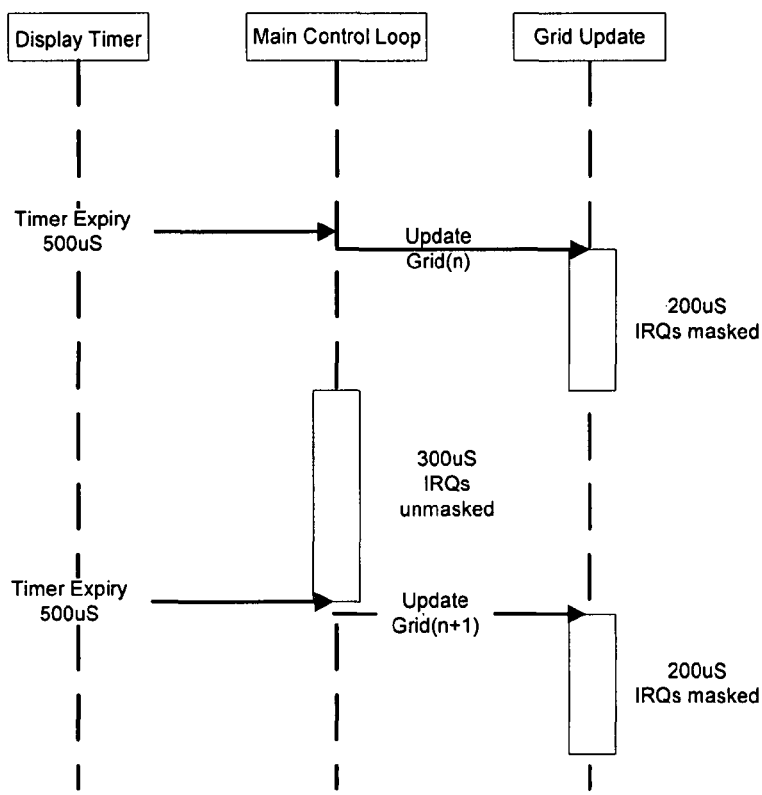

As shown in FIGS. 24 and 25, when timer 1 expires it signals the main loop to begin a grid update. The match register reloads automatically each time it expires so the only action required in the ISR is sending the signal and clearing the interrupt.

The IXP455 can update the front panel display by sending text strings to update part of the display or by sending a full frame buffer. Text based updates will be processed by the front panel processor and written to the frame buffer in a 5×7 LCD font. Full frame buffer updates will not be processed by the front panel; they will be displayed as received.

The front panel provides two frame buffers to the IXP455. The IXP455 may write to either frame buffer at any time. The IXP455 may direct the front panel to change which frame buffer is used to update the physical display.

The IXP455 may update the front panel frame buffers by:
Sending a "Display Text String" command to update a portion of the display.
Sending a "Full Display" command followed by a full update to one of the frame buffers.

The front panel on the receiver unit contains five (5) LEDs in place of the VFD. During boot up of the IXP455 the LEDs will display an "active" pattern to indicate that the unit is alive. Once the Linux kernel has booted and the main application is running the LEDs will be controlled by the IXP455 via FP_LED messages.

The IR Subsystem of the local user interface involves receipt and transmission protocols. IR will be received using a commercial IR receiver, such as those marketed by Sharp Corporation. The receiver demodulates the incoming signal and outputs a waveform representing the received signal.

The output signal from the receiver is connected to an external capture pin on one of the LPC2103's timers. The timer is configured to interrupt on any edge transition on the capture pin. The time of the first edge transition is not recorded but the timer itself will be reset. On subsequent edge transitions the timer value will be recorded and the timer will be reset. The time values will be recorded until it is determined that an entire IR command has been received at which time the timer values will be sent to the IXP455 in an "IR Received" message.

IR is transmitted using an IR LED. A timer running in match mode and an external GPIO pin is used to drive the LED. Upon receipt of an IR message from the man processor the GPIO pin enables the LED and the timers match register will be loaded with the first time value from the IR message. When a match interrupt occurs the GPIO pin will toggle, via the timer logic, and the match register will be loaded with the next value from the IR message. This toggle and reload operation will continue until all timer values contained in the IR message have been used.

The front panel provides the IXP455 with its (1) Firmware Version, (2) Hardware Version, (3) Processor ID, and (4) Boot Loader Version.

The infrared system provides an extension of infrared remote control using an IP based network. The method described extends the range of an infrared (IR) remote control using a wired or wireless IP based network. Although, the method describes extending the range of an IR remote control using an IP based network, the IR remote control could be extended using other types of networks.

Infrared remotes controls use infrared light to control electronic devices. The devices that need to be controlled normally need to be in line of sight with the remote control and at a short distance from the remote, normally 15 feet. This means that an IR remote control will not work with devices that are in another room, too far from the receiver or that are behind obstructions.

Therefore the described method outlines a mechanism to solve these problems and to extent the range of an infrared remote control.

Figure 36:
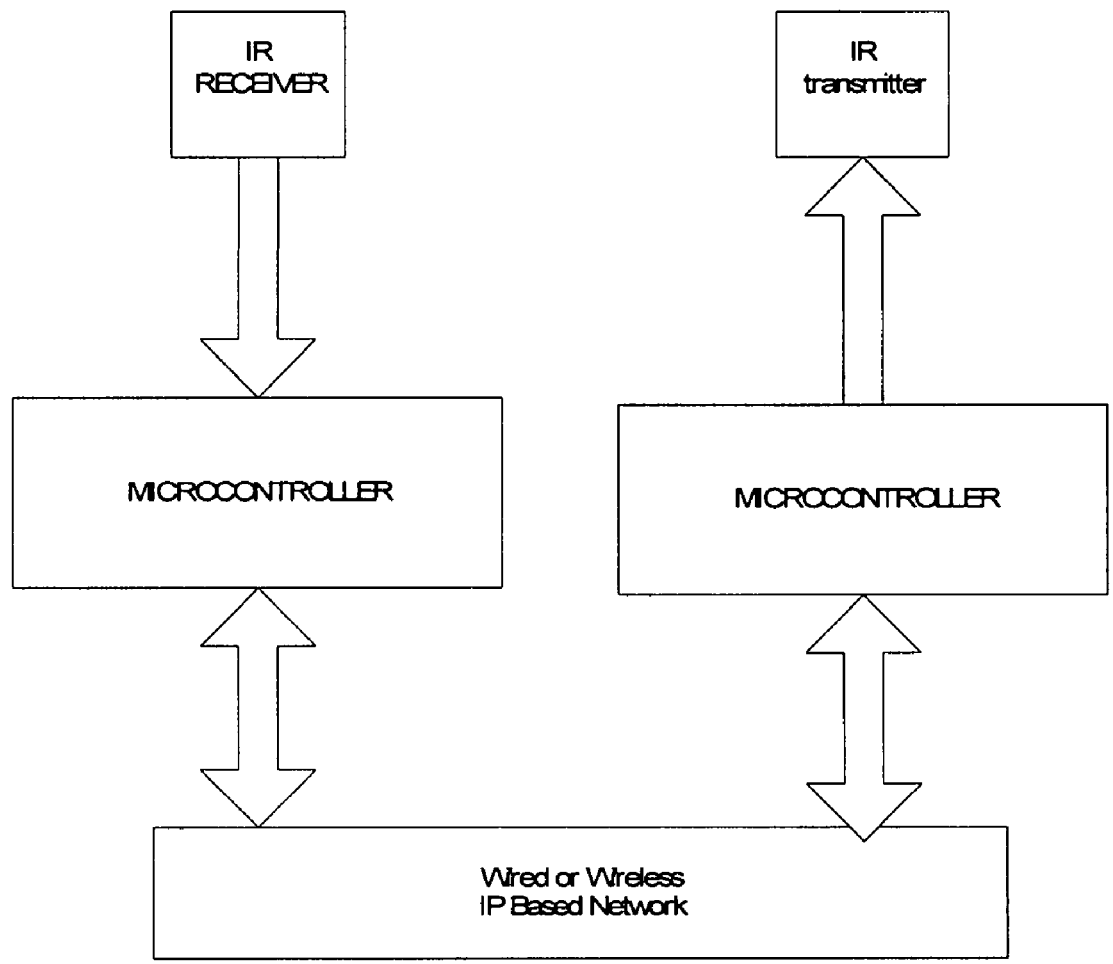
FIG. 36 is a block diagram of an example infrared remote extender.

As shown in FIG. 36, the infrared data from the remote control is detected by an infrared receiver that converts the infrared information into an electrical signal that a microcontroller can read. The microcontroller extracts the timing information. The timing information is transmitted using a wired or wireless IP network to another microprocessor that will use the timing data to reconstruct and re transmit the infrared data using an infrared LED. The microcontroller can be substituted by a microprocessor, or a combination of a microcontroller and a microprocessor.

With a fixed carrier infrared receiver, the infrared receiver converts the infrared light signal into an electrical signal that can be read by the microcontroller. With a fixed carrier infrared receiver the carrier is always known. The carrier is removed from the incoming IR signal and only the data is sent to the microprocessor. The data pin from the IR receiver is connected to a general IO pin. The microprocessor will look for low to high and high to low transition in the data and measure the time between those events. This timing data is packed and sent to another microcontroller using an IP based network. The second microcontroller decodes the data packets from the network and extracts the timing data information. With the timing information the microcontroller reconstructs the infrared data and adds the known carrier to it. The data with the carrier is sent to the infrared transmitter circuit and to the electronic device to be controlled. Normally the infrared transmitter consists of an infrared LED and a small transistor amplifier.

With a universal carrier Infrared Receiver, the method is similar to the fixed carrier, but the infrared receiver does not remove the carrier. The output from the IR receiver is connected to a general IO pin. The microprocessor will look for low to high and high to low transition in the data and measure the time between those events. This timing data is packed and sent to another microcontroller using an IP based network. The second microcontroller or process within the primary microcontroller decodes the data packets from the network and extracts the data and carrier timing information. With the data and carrier timing information the microcontroller then reconstruct the data with the carrier. The carrier does not have to be added because it is embedded in the data received. The data with the carrier is sent to the infrared transmitter circuit and to the electronic device to be controlled.

With a universal carrier Infrared Receiver with carrier detect, the method is again similar to the fixed carrier, but the infrared receiver computes the carrier frequency and removes the carrier from the incoming data. The infrared receiver extracts the carrier from the incoming IR signal, computes the carrier frequency, sends the carrier information and the data to the microcontroller. The microcontroller takes the data from the IR receiver and looks for low to high and high to low transition in the data and measure the time between these events. This timing data and carrier are packed and sent to another microcontroller using an IP based network. The second microcontroller decodes the data packets from the network and extracts the data timing information and the carrier. With the data timing information the microcontroller reconstructs the infrared data and adds the carrier to it. The data with the carrier is sent to the infrared transmitter circuit.

The system of FIG. 1 is a system where extending infrared remote control signals is particularly useful. In FIG. 1, video signals from the transmitter are sent via a wireless IP network to receivers that are connected to respective displays, this way video from the source can be displayed on multiple displays. Transmitter 11 and receivers 12 have infrared receivers and can receive control signals from an infrared remote. Thus, using the extension method described above infrared signals can be received at the transmitter and transmitted to the receivers via the IP network.

Now, the system's web user interface is described. The system provides a Web User Interface System that allows the user to configure system settings; display hardware and firmware version, connection status and signal strength etc; and update firmware. The web interface authorizes a single user, e.g. an audio and video (AV) system integrator, to configure hardware and software settings of Tx and Rx(s) via HTML Web pages. A Web browser communicates with embedded Web server using a 10/100 Ethernet or a 802.11a link connected to either the Tx, Rx(s) directly, through a router, or through web proxy via the Tx/Rx. The Ethernet link also transmits audio, video and control data.

Figure 26:
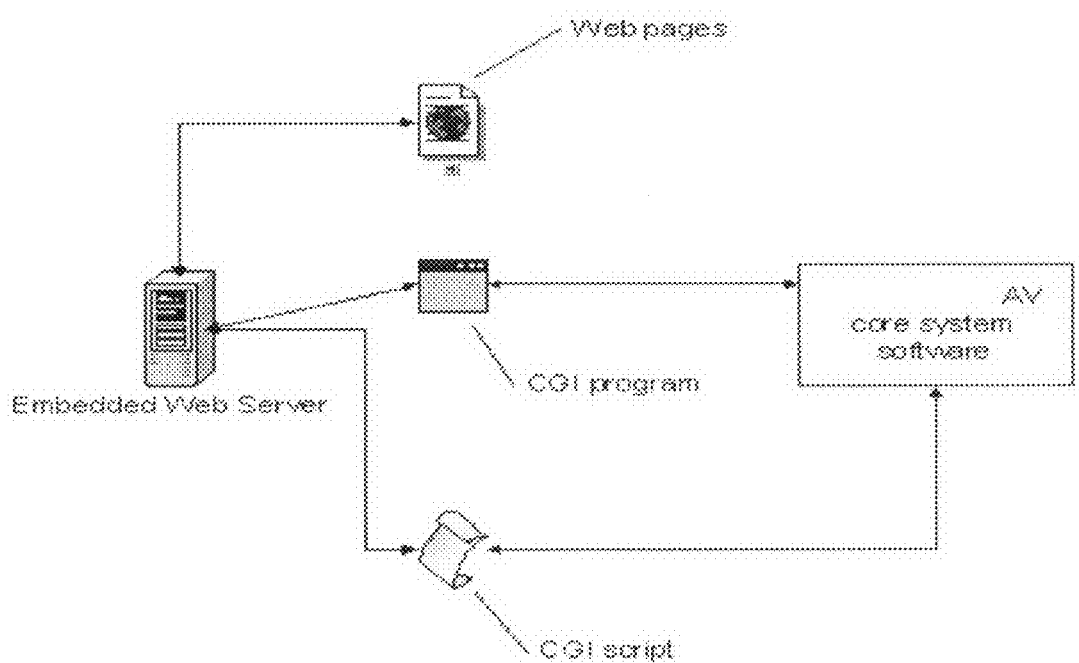
FIG. 26 is a block diagram of example web user interface system.

FIG. 26 shows the basic blocks of the web interface.

Each Tx or Rx unit contains an embedded Web server. When the AV system integrator enters the URL of the IP address of a Tx or Rx, the embedded Web server in the Tx or Rx serves up the default page of the web interface. The system integrator can then log in as the authorized user. Once the Web server authenticated the access, the system integrator interacts with the system through HTML Web pages.

The web interface allows the AV system integrator to enter configuration parameters to configure the device through HTML Web pages. In addition, the system integrator can query hardware and firmware version as well as device status from the system. The Web pages therefore contain dynamic content. The system uses the Common Gateway Interface (CGI) standard to serve up dynamic Web pages.

The Web browser requests the URL corresponding to a CGI script or program, which follows the CGI protocol to retrieve input data from a dynamic Web page as well as compose dynamic Web page content.

The web interface incorporates the following components:
An embedded Web server, such as is available by open source under the name "Boa Web Server;"
HTML Web pages
CGI programs that use Common Gateway Interface (CGI) standard to interface with the AV core system software. The following websites provide basic information on CGI programs:
http://cgi.resourceindex.com/Documentation and
http://hoohoo.ncsa.uiuc.edu/cgi The design of WEBUIS should abstract interfaces between CGI programs and the AV core system so that when we expand Web pages and add CGI programs, the interface remain unchanged.

The Flash Memory Strategy is now described.

Figure 27:
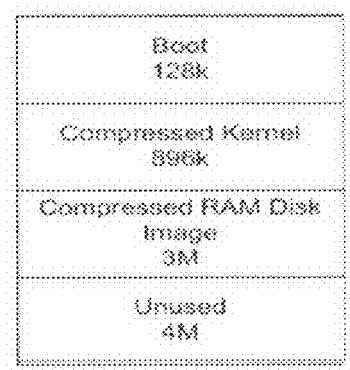
FIG. 27 is a flash memory map.

The flash memory map is split up into 3 regions, shown in FIG. 27:
The Boot region, which contains the boot loader firmware;
The compressed kernel region; and
The compressed image of the CRAMFS region, which contains the application, modules, libraries, FPGA bit stream and utilities.

Persistent storage is required for the kernel, application, front panel and FPGA update files and configuration. Additionally, the receiver upgrade package must be stored to provide for the ability to upgrade receivers from the transmitter.

The kernel is simply stored compressed in flash. When booted, the kernel extracts an initial CRAMFS (initrd) image from flash for use as its root file system. The CRAMFS image is stored as a compressed ext2 file system. The root file system contains the application, utilities, libraries and required update files.

Application upgrades are handled by downloading the compressed CRAMFS image which is then written to FLASH by the application.

Boot itself may be field upgradeable if an application containing boot is downloaded to the appliance and the application reprograms the boot sector.

Dynamic memory allocation is needed for creating objects and events during runtime. Dynamic memory allocation from the heap is limited to boot-up initialization, not only to prevent potential memory leaks, but also to keep code deterministic in terms of memory usage.

The framework provides a memory pool class that may be utilized by any part of the system that requires objects to be created/destroyed dynamically. A memory pool is nothing more than a fixed number of fixed sized blocks set aside at system start. When an object is created, one of the blocks is used for the object. By knowing the type and maximum number of all objects in the system we can predetermine the memory requirements for the system and we can guarantee memory for each object.

The Video Packet Formats are now described. As shown in FIG. 28, a video frame consists of an A/V subsystem Video Header, an ADV202 Header (assuming an ADV202 Raw Format output), a JPEG2000 Header, attribute data and compressed video data.

To avoid IP fragmentation and the associated performance degradation, video frames are packetized into RTP packets such that each can fit into a single IP packet. Since for each packet, an RTP header, UDP header, IPSec ESP header and IP header will be added, the maximize size of payload in each RTP packet will be equal to the MTU of the network (1500 bytes) minus the total length of those headers which is to be determined.

A. A/V Subsystem Video Header is shown in FIG. 29. It is generated by the A/V subsystem FPGA.

The ADV202 will insert a ADV202 specific header at the beginning of the code stream. FIG. 30 contains information about this ADV202 header.

The JPEG2000 Header is shown in FIG. 31. Information about JPEG2000 markers can be found in the ISO/IEC15444-1 standard. The JPEG2000 compliant header contains main and tile headers from the JPEG2000 standard. It consists of all the parameters needed to decode an image correctly, including the quantization stepsizes. FIG. 31 lists the most common markers that are inserted into the compressed codestream by the ADV202.

The A/V subsystem FPGA will append an Audio Header to an audio frame to allow the receiver to synchronize the audio with the correct video frame. Like video frame, the audio frame is packetized into RTP packets such that each fits in an IP packet. FIG. 32 shows an example audio frame format.

The Audio Header of FIG. 32 contains the fields shown in FIG. 33.

Next, we describe playback synchronization and error control models.

A. Adaptive Synchronization Algorithm

The adaptive synchronization algorithm uses minimal knowledge of network traffic characteristics. The algorithm is immune to clock offset and drift between the transmitter clock and the receiver clock while it ensures the QoS in terms of end-to-end delay, delay jitter, and loss ratio.

The details of the algorithm are summarized here, for a full explanation of the implementation see *IEEE journal Vol. 14 No. 7 "Multipoint Multimedia Teleconference System with Adaptive Synchronization"*

Instead of having a fixed playout point the application is allowed to adjust it depending on network conditions. This means fewer packets are discarded because they arrive late. Also instead of discarding all data that arrives late we allow packets that arrive only slightly late to be played back. This adds a small amount of distortion but is better than missing data.

The synchronization scheme requires the user to specify the maximum acceptable jitter, JMax and the maximum acceptable packet loss ratio caused by synchronization measures, LMax. At the transmitter each packet carries a timestamp $t_{i,g}$, indicating its generation time. At the receiver a Playback clock (PBC) and three event counters, namely the wait counter Cw, the nonwait counter Cnw, and the discard counter Cd, with associated thresholds Tw, Tnw, and Td, respectively, are maintained.

The PBC is nothing but a virtual clock at the receiver which emulates the clock at the sender. The motivation to have the PBC is that once the source clock can be reproduced at the sink, the synchronization problem may be readily solved. At the receiver, the PBC is initiated according to the time stamp carried by the first received object, updated by the receiver clock, and adjusted based on the contents of the three counters. The vicinity of a packet's arrival time in reference to the PBC time is partitioned by the wait boundary (Bw) and discard boundary (Bd) in to three regions: the wait region, the nonwait region, and the discard region, shown in FIG. 34.

The arrival time $t_{i,ar}$, in reference to the PBC, of the ith packet may fall into one of the three regions with respect to its associated two boundaries. The synchronization algorithm conforms to the following rules.

1. If the packet with time stamp $t_{z,g}$ arrives before $B_{i,w}$ (within the wait region), then it will be played back at $B_{i,w}$ (waiting until the wait boundary).
2. If the packet with time stamp $t_{i,g}$ arrives after $B_{i,w}$ but before $B_{z,d}$ (within the nonwait region), then it is played back immediately.
3. If the packet with time stamp $t_{z,g}$ arrives after $B_{i,d}$ (within the discard region), then it is discarded.

The PBC is synchronized to the transmitter clock using the following algorithm.

1. Upon receiving the first successfully arrived packet set the initial PBC time equal to the time stamp carried by this packet.
2. Upon receiving the ith packet, compare its time stamp $t_{i,g}$ with its arrival time $t_{i,ar}$, (the current PBC time PBC(t)): if $t_{i,g} > t_{i,ar}$, increase the wait counter by one and do not playback the object until Bw; else if $t_{i,g} < t_{i,g} + E_{max}$, increase the nonwait counter by one and playback the packet immediately; otherwise (i.e., $t_{i,ar} \geq t_{i,g} + E_{max}$) increase the discard counter by one and discard the packet.
3. Check the most recently increased counter: if overflows continue; otherwise go to Step 2.
4. When the nonwait counter or the discard counter overflows: if the wait counter is not full, decrease the PBC:

PBC($t$)=PBC($t$)–Δ and go to Step 5; otherwise go to Step 5. When the wait counter overflows: if the nonwait counter is not full, increase the PBC:

PBC($t$)=PBC($t$)+Δ

5. Reset all counters and go to Step 2.

Figure 34:
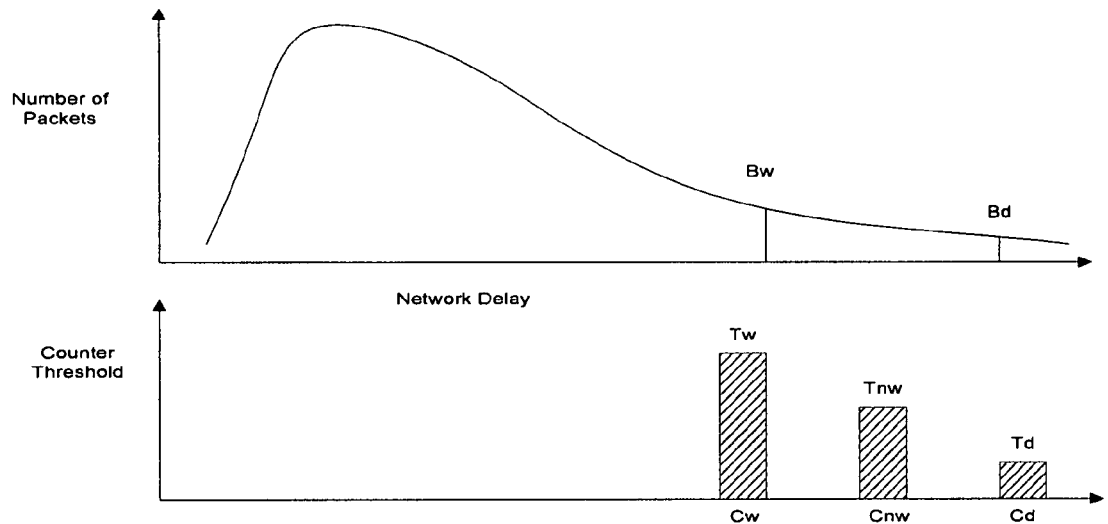
FIG. 34 is an adaptive synchronization algorithm.

The thresholds of the three counters shown in FIG. 34 are critical to the performance of the synchronization algorithm. In particular, the threshold of wait counter, Tw, governs how sensitive the synchronization scheme is to the network improvement. Its value should span a time interval of at least the order of ten seconds. Otherwise the synchronization would be too sensitive to network improvement; consequently too frequent down shift of the PBC would likely occur.

B. Inter-Stream Synchronization

When inter-stream synchronization is needed a Group (Playback Clock) PBC is required. The Group PBC is set to the slowest of all PBC's. This Group PBC dominates the playback of all media in the synchronization group. Meanwhile, each medium in the intermedia synchronization does its own synchronization as if it was not in the group, but the discard decision is made in reference to the Group PBC.

Figure 35:
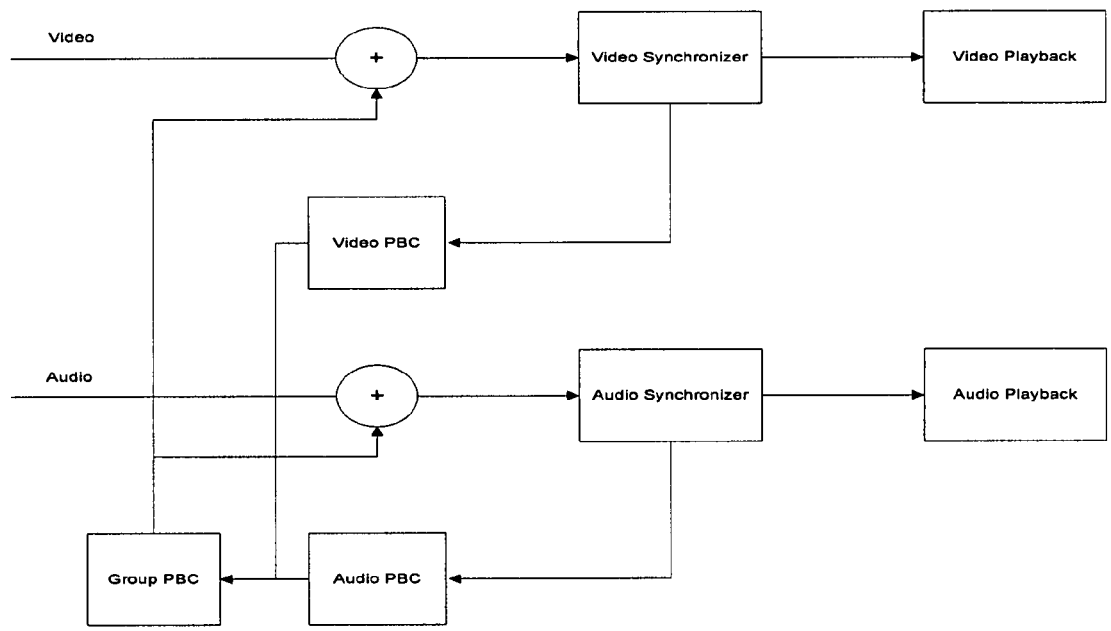
FIG. 35 is a block diagram of the group play back clock.

An example of a group playback clock schematic is shown in FIG. 35.

C. Error Control

There are a number of characteristics of continuous media streams such as audio and video.

Strict timing requirements—If the data is not delivered before a certain point in time it has to be discarded.

Some tolerance of loss—The amount of loss that can be tolerated depends on the medium, the encoding techniques and human perception.

Periodicity—Video or audio should be delivered at a fixed rate. When transmitting continuous data across a network this periodicity is normally lost.

Data transmitted across networks are normally subject to delay, delay jitter, resequencing of packets, and loss of packets.

The RTP protocol uses the packet sequence number to reorder packets in a stream. Buffering packets at the receiver overcomes problems related to network delay jitter. However as RTP uses UDP multicasting to deliver continuous video and audio streams packet loss will occur.

There are several methods for dealing with packet loss of video or audio data in order to provide and acceptable quality of service (QoS).

Automatic Repeat Request (ARQ)
Forward Error Correction (FEC)
Hybrid Error Control (ARQ/FEC)
Interleaving
Error Concealment Using ARQ a lost packet will be retransmitted by the sender. Loss of data can be detected by the sender or by the receiver. Detection by the sender requires that every receiver send an ACK for each received packet. Clearly when multicasting to a number of receivers this consumes significant bandwidth. Detection by the receiver is more efficient in this case. The receiver sends a NAK if a packet sequence number is missed in the stream. If all receiver's miss the same packet this can result multiple NAK's being sent to the sender for the same packet. This can be avoided by multicasting the NAK instead of unicasting so other receivers in the group realize a packet has already been re-requested.

FEC transmits, with the original data, some redundant data, called parities to allow reconstruction of lost packets at the receiver. The redundant data is derived from the original data using Reed-Solomon codes or a scheme which uses the XOR operation. The FEC transmitter sends k packets along with h redundant parity packets. Unless the network drops >h of the h+k packets sent, the receiver can reconstruct the original k information packets. RFC 2733 specifies a RTP payload format for generic forward error correction.

The disadvantage of FEC is that the redundant data consumes bandwidth and the difficulty in choosing the right amount of redundancy for various network conditions. A solution to this is to send redundant data when a retransmission is required instead of the original packet. This is known as Hybrid Error Control.

With ARQ and ARQ/FEC it is important that the retransmitted data or parity packet is received before the playout point otherwise the packet will be discarded. This requires having a jitter buffer at the receiver large enough to provide a delay equal to the network delay plus retransmission of a lost packet. The strict delay requirements of interactive systems usually eliminate the possibility of retransmissions. However in a non-interactive system such as ours a playout delay of 500 ms-1 second should not cause a problem.

When the packet size is smaller than the frame size and end-to-end delay is unimportant, interleaving is a useful technique for reducing the effects of loss. Packets are re-sequenced before transmission so that originally adjacent packets are separated by a guaranteed distance in the transmitted stream and returned to there original order at the receiver. Interleaving disperses the effect of packet losses. Multiple small gaps in the reconstructed stream are less noticeable to the user than a large gap which would occur in a non-interleaved stream.

Techniques for error concealment may be used by the receiver and not require assistance from the sender. These techniques are useful when sender based recovery schemes fail to correct all loss, or when the sender of a stream is unable to participate in the recovery. Error concealment schemes rely on producing a replacement for a lost packet which is similar to the original. Insertion-based schemes are the simplest to implement and repair losses by inserting a fill-in packet. This fill-in for audio data is usually very simple either silence, white noise or the repetition of the previous packet. Silence or noise insertions have poor performance however repetition or repetition with fading is a good compromise when compared to the more complex regenerative concealment methods.

When the system is non-interactive and the transmission is multicast, latency is less important than quality. Bandwidth efficiency is a concern as the transmission link may be wireless. Interleaving is seen to be an effective way of reducing the effect of packet loss coupled with error concealment by repeating the previous packet when a packet is lost.

If interleaving and error concealment do not provide acceptable QoS an ARQ or ARQ/FEC scheme can be substituted.

We now describe the hardware design of the main board. The Main board's purpose is to be the main platform for both the transmitter 11 and receivers 12. This dual purpose for the board is accomplished by providing an expansion connector. The expansion connector will be used to connect a HDMI receiver for the transmitter and a HDMI transmitter for the receiver.

Figure 37:
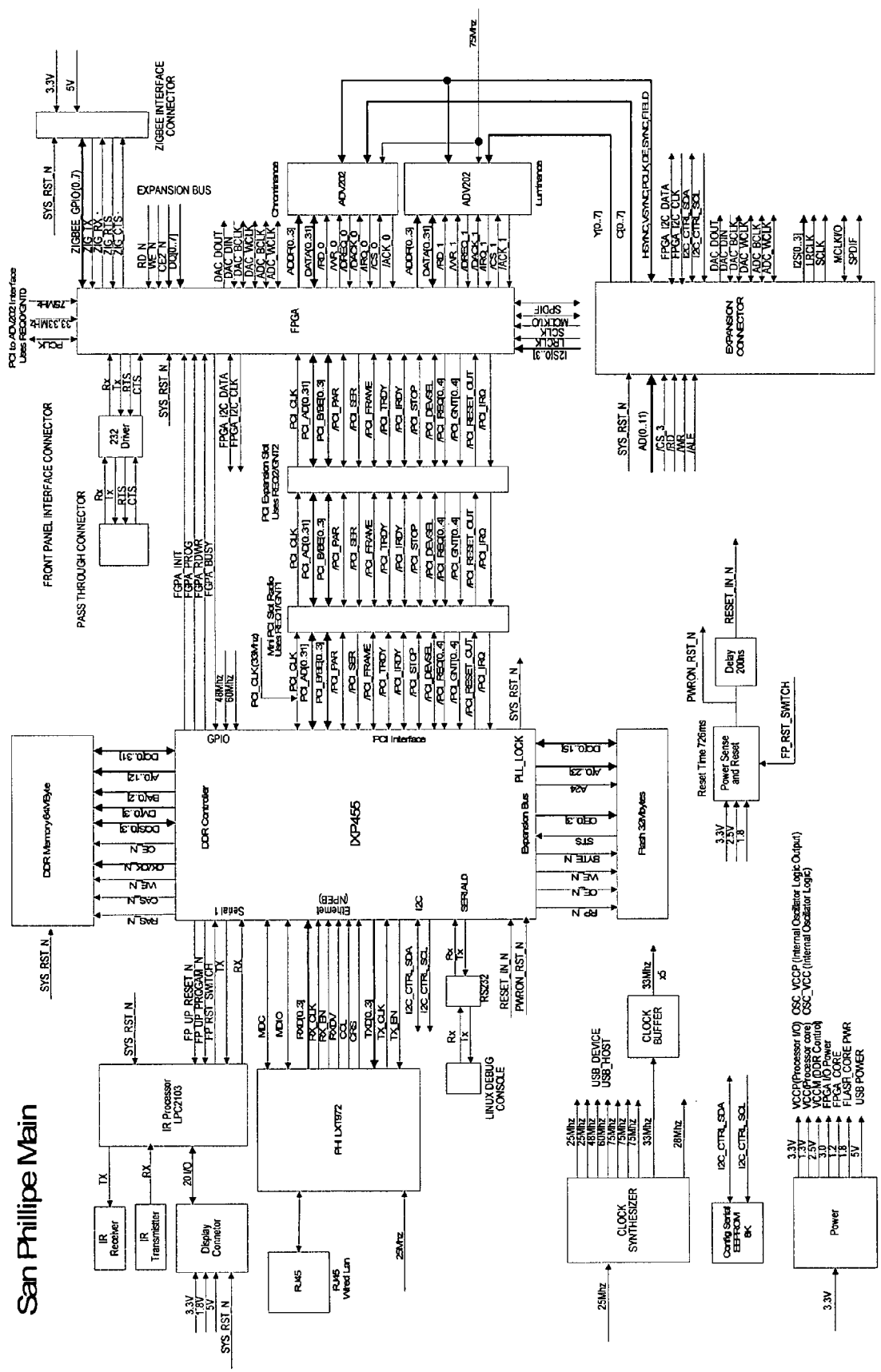
FIG. 37 is a electrical schematic of the main processor board circuit.

The Main board also provides for the addition of a ZIgbee wireless connection, in order to allow easy control of the appliance. An example main board is shown in FIG. 37, and in this example is based on the Intel XSCALE LXP455 processor running at 266 Mhz. The following features of the IXP455 are implemented in order to complete the board:

32 Mbytes of Flash
64 Mbtes of DDR memory running at 266 Mhz (133 Mhz clock) Expandable to 128 Mbytes
1 Mini-PCI slot(Type 3 connector, 3.3V compatible only) running at 33 Mhz with option for second PCI slot is for wireless radio
1 10/100 Ethernet port
1 Front Panel Serial connection
1 Linux debug port
1 USB 2.0 compliant host port
1 USB 1.1 compliant device port
I2C bus
SPI Port In addition to the features directly tied to the IXP455 processor peripherals the following functions are implemented in order to complete the system.

ADV202 JPEG2000 Codecs for real time video compression of up to 1080i
ADV202 to PCI interface implemented inside of an FPGA to allow reuse of video section in multiple platforms
I2S. SPDIF and Audio AD/DA interface via FPGA
Serial Port for Serial Pass through
Serial port for Zigbee expansion board
Serial port for to interface to IR remote controller
DMA engine to move compressed video and audio from codecs into and out of system memory
Second I2C bus implemented in FPGA to allow the buffered access to video chip configuration and audio The details of the memory map for the IXP455 processor can be found in two documents, Intel IXP45X and Intel IXP46X Product Line of Network Processors Developer's Manual (referenced above) and Intel IXP45X and Intel IXP46X Product Line of Network Processors Data Sheet (also referenced above), and will not be repeated herein. Some of the address spaces contain individual control registers.

The memory controller takes care of the fact that most devices on the bus are 32 bits wide, For example one word contains address's zero through three. The processor is Big Endian Data so the most significant byte of a thirty two bit word is stored in memory first followed by the second. For example if the following value was read from the PCI Bus 0xFFEEDDCC and stored in DDR starting at location 0x1000, then FF would be stored at 0x1000, followed by EE at 0x1001, DD at 0x1002 and CC at 0x1003.

The FPGA memory map will be the same as the FPGA, in terms of the ADV202 codec's, will be the same as the PCI card.

The processor supports DDR1 266 Mhz (133 Mhz clock) The device is configurable for 128 Mbit, 256 Mbit, 512 Mbit and 1 Gbit DDR memory as long as they are partitioned on 32 Mbyte boundaries.

FIG. 38 details how the DDR memory fits into the memory map of the processor as designed on the main board.

The Expansion Bus memory is mapped for flash, expansion card i/o, and FPGA parallel programming. FIG. 39 shows the expansion bus flash memory configuration.

Expansion Card I/O memory usage is shown in FIG. 40. Twelve data bits(0 . . . 11), CS_N, RD_N, WR_N and ALE go to the expansion bus connector giving a space of 4K bytes of memory mapped space for I/O expansion. The particular chip select used must be configured in Multiplexed address and data mode. Twelve address bits are latched on the falling edge of ALE after which Data lines 0 thought 7 are available for eight bit reads and writes This address space is for future use on projects where switching logic is required, or for future projects.

The expansion bus of the IXP455 is a general purpose bus broken into eight chip selects that each cover a 32 Mbyte chunk of memory. Each chip select is programmable in terms of its timing, data width, multiplexed or non multiplexed address and data. The following tables show how to set up the expansion bus for the Expansion Connector and to program the FPGA.

Chip select 0 flash is set up by the Boot Configuration register and Redboot. The Chip select for the Expansion connector and the FPGA writes should be set up as shown in FIGS. 42 and 43. FIG. 42 shows the set up for the Expansion bus from the IXP455 to the Expansion Connector and FIG. 43 shows the set up for the Expansion bus from the IXP455 to the FPGA programming.

Each chip select is individually configurable so that different memory spaces on the expansion bus may have different data widths and timing. The Timing and control register for Chip Select 0 is shown below the Timing and Control Registers for the other seven chip selects are essentially identical.

The IXP455 is set up as the arbiter on the PCI Bus. There are three slots on the PCI bus as detailed in FIG. 44. The PCI bus uses a standard 32 bit, 33 Mhz, Mini PCI interface and signals.

The processor implements one Ethernet port. The Ethernet port is uses NPEA B. NPEC must also be enabled in order for the Encryption engine to be enabled. The Ethernet PHI is connected Via a MII interface to the IXP455. The Ethernet port is strapped to address 0, It will support 10/100 full or half duplex with auto negotiation. The I/O lines on NPEC must be pulled up, in order for the MII controller to operate properly. NPEA must be soft disabled by writing a one bit 11 and bit 19 of the EXP_UNIT_FUSE_RESET register.

The board supports four serial ports. Two serial ports are available via the processor and two are available across the PCI bus via the PCI interface as detailed in FIG. 45.

The USB host controller supports the EHCI register Interface, Host Function, Low Speed Interface, and Full Speed Interface. The signaling levels are compliant with the 2.0 specification.

The USB controller on the IXP455 supports USB 1.1 Low and Full speed, however the board pull ups are enabled for Full speed mode. Signaling levels are also compliant with the USB 1.1 specification.

An 8K (64K bit) Serial EEPROM is connected to the IXP455 I2C bus. It is hard wired to address seven. The device supports byte and 32 bit page writes.

A rechargeable battery is provided to maintain at least 100 hours of real time clock after main board power down. During power down, the Real time clock draws 10 uA max on the VBAT pin for the battery.

The Main board uses a programmable clock synthesizer to produce the clocks required for the processor, PCI, DDR, Expansion bus, ADV202's, FPGA, and Ethernet. The programmable clock synthesizer has 8 different registers that allow a different set of clock frequencies to be produced depending of the state three configuration inputs to the chip. These registers are set in the design by a set of external resistors. The clock synthesizer also produces a spread spectrum clock with a −2% 34 Khz modulation on the processor and PCI clock in order to reduce emissions. Using the configuration registers of the Clock synthesizer, the spread spectrum may be turned on or off. The input to the synthesizer is a 25 Mhz clock produced by an external oscillator. FIG. 46 shows the configuration of the clock synthesizers registers.

The main board clock register setup is shown in FIG. 47.

FIG. 48 defines the processor GPIO pins on the IXP455 and their functions.

The IXP455 processor has many options that are only available at boot time. The processor reads the values on the expansion bus address lines during boot in order to determine how these options are set. The address lines are internally pulled up with 47 KOHM resistors. If the address pin is left floating the processor will read a value of one on the address line. Any line that needs to a zero at boot is pulled down with a 4.7 Kohm resistor. The options are read into Configuration Register 0. FIG. 49 shows the boot configuration as defined on the main board. FIG. 50 shows the user defined values board revision. New Revisions can be added if software flow needs to change, i.e., there is a change in memory size etc.

Continuing with the hardware schematic of FIG. 37, each of the ADV202 parts will have a combined address and data bus. Each bus contains the following signal sets. Indicated directions are relative to the FPGA.

Data[31:0]—Bidirectional
Address[3:0]—Output
CS_n, WE_n, RD_n, DACK_n*—Outputs
INTR_n, ACK_n*, DREQ_n*—Inputs
These signals are used by the ADV202 to negotiate DMA transactions. The FPGA assumes worst-case bus timing and pulls/pushes data from the ADV202s as fast as possible.

Another signal, SCOMM5, will be a single FPGA output that will be routed to both ADV202s scomm pins.

Expansion Support is via the expansion board connections of FIG. 37. Those connections are shown in detail in FIGS. 51A and 51B.

This now describes the so-called Avocent Audio Visual Protocol (AAVP). It is intended for the communication among audio visual products. It is used to establish and manage an IP-based network for the transmission of real-time audio-visual data over a wired or wireless medium. Instead of being a monolithic protocol, AAVP is a collection of related protocols organized in planes and layers.

Figure 52:
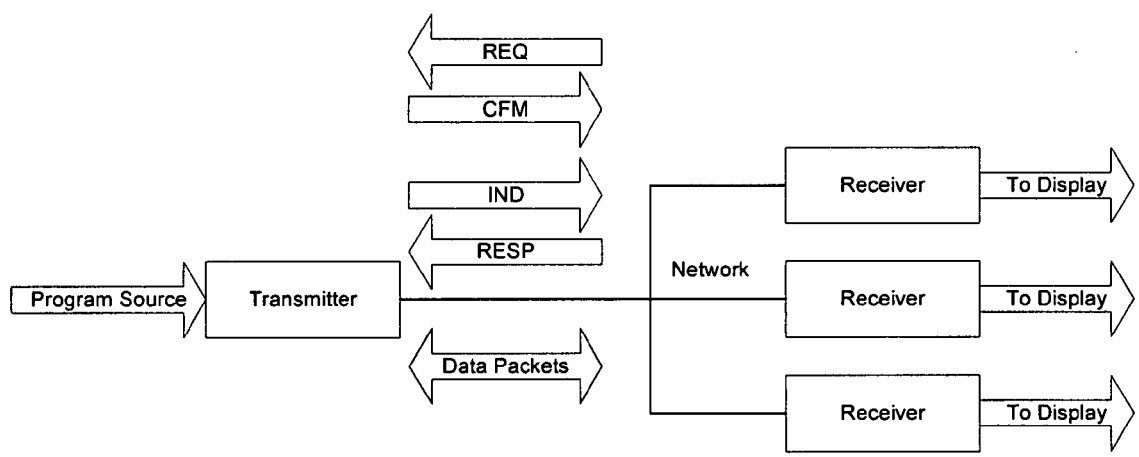
FIG. 52 is a model of an example audio visual communication protocol.

FIG. 52 illustrates the model of this protocol. The transmitter shown is the source of audio-visual data generated from the program source. The receiver is the sync of such data. A transmitter and one or more receivers form a network. This protocol describes the messages exchanged between the transmitter and receivers over the network.

The functions of this protocol can be divided into Control Plane and Data Plane. In the Control Plane, there are four types of messages, namely REQ (Request), CFM (Confirm), IND (Indication) and RESP (Response). A receiver sends REQ to the transmitter which responds with CFM. Reversely, the transmitter can send IND to a receiver which in some cases responds with RESP. The purpose of the Control Plane is to establish real-time transport sessions in the Data Plane to transfer data packets across the network.

The physical medium of the network can be wired (e.g. Ethernet) or wireless (e.g. 802.11a).

Figure 53:
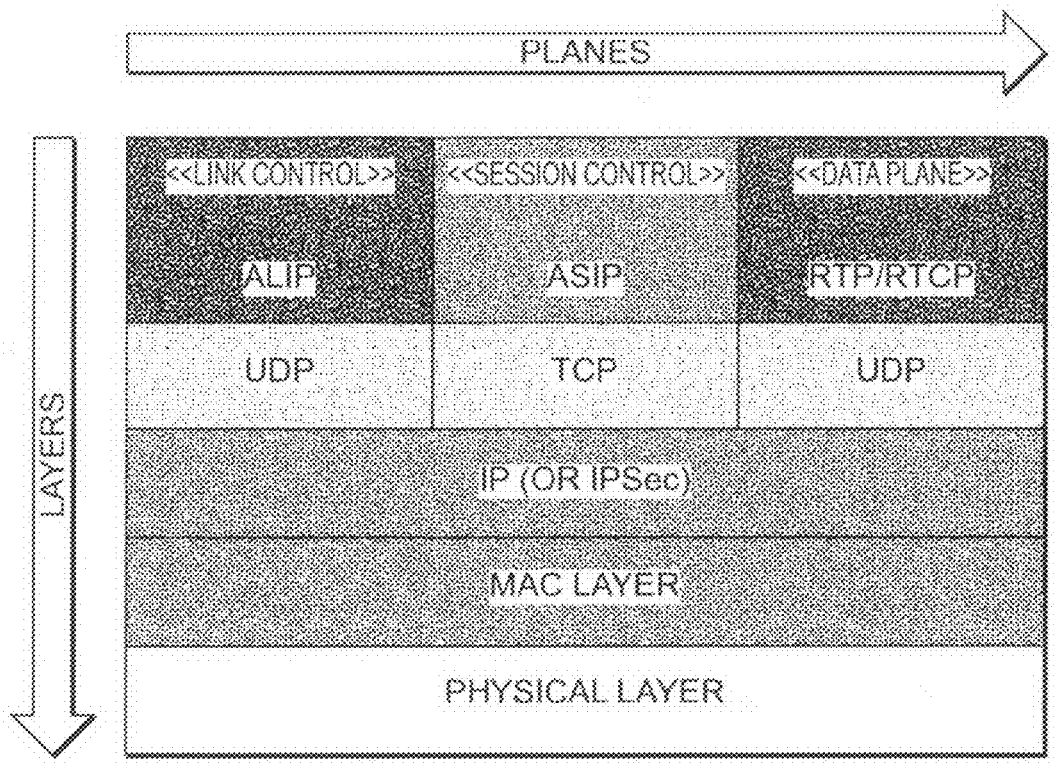
FIG. 53 is an illustration of example A/V planes and layers of the example system.

This section explains the functions of Control Plane and Data Plane. The Control Plane is further divided into Link Control and Session Control. Each plane is implemented as multiple layers. The concept of planes and layers is illustrated in FIG. 53.

1. Control Plane

A. Link Control

This establishes the communication link between a transmitter and a receiver. It enables the transmitter and receiver to communicate with each other. The protocol used for this is called Avocent Link Initiation Protocol (ALIP) and is described in more detail below. A receiver probes for any transmitters by sending a probe request message. A transmitter responds with a probe confirm message. The receiver then joins the network by sending a join request message. The transmitter can accept or deny the request based on MAC address filtering. The transmitter may assign an IP address to the receiver if the receiver does not have a manual IP address. The above process applies to both wired and wireless media. For wired medium, this is straight-forward. For wireless medium, it may involve scanning different radio channels for a transmitter.

B. Session Control

This establishes an audio-visual session between a transmitter and a receiver. It enables the receiver to receive and play back audio-visual data coming from the transmitter. The protocol used for this is called Avocent Session Initiation Protocol (ASIP) and is described in greater detail below. The transmitter informs the receiver of the UDP ports used by the RTP streams, the multicast address, as well as the audio/video parameters.

2. Data Plane

This transfers RTP and RTCP packets to convey real-time audio-visual data. The RTP protocol is extended to support reliable multicast which may be necessary for audio data as audio packet loss is more perceptible.

The Link Protocol: ALIP

Figure 54:
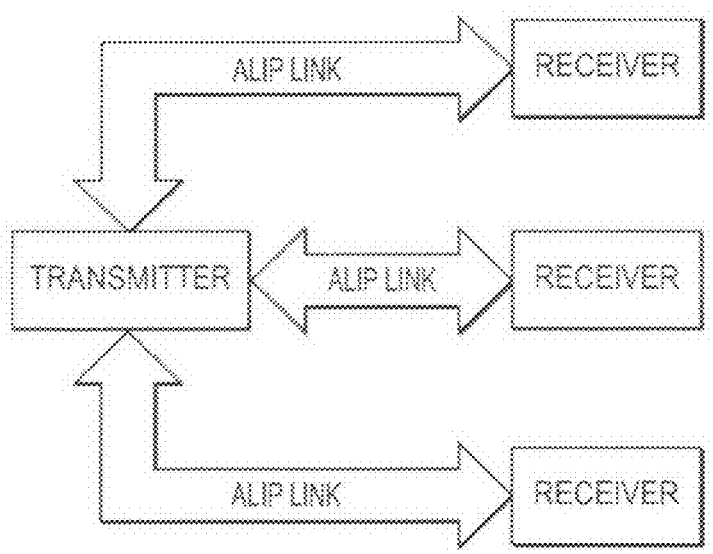
FIG. 54 is a schematic of example ALIP links.

ALIP is used to establish and maintain the communication link between a transmitter and a receiver in a network. It also passes control and information messages between transmitter and receivers. If there are multiple receivers, there is one ALIP link between the transmitter and each receiver. The concept of ALIP links is illustrated in FIG. 54. Some ALIP messages are carried by UDP packets since they may be broadcast before an IP address is assigned.

The ALIP message format is as follows. Each ALIP message is made up of a header and a payload. The payload follows immediately after the header. All multi-byte fields are transmitted in network byte order (big-endian). The message header has a fixed length of 12 bytes and consists of the fields shown in FIG. 55.

The message payload contains fields specific to the message type. They are listed in the next section. Type codes are shown in the parentheses following the type names. The status codes are shown in FIG. 56 and are used in various ALIP messages to indicate either a reason for a request or the failure reason in a response.

1. Message Type: ALIP_PROBE_REQ (0x0001)
A receiver broadcasts this message to probe for a transmitter. On a wireless network, it uses this message to discover a transmitter on a particular radio channel. If no response is received within the timeout period ALIP_PROBE_REQ_TO, it retries on the same radio channel for ALIP_PROBE_RETRY_CNT time(s). When retries fail, it scans the next radio channel. On a wired network, it always retries on the same physical medium. This message is broadcast because the receiver does not know the IP address of a transmitter yet.
ALIP_PROBE_REQ_TO=200 ms (or other suitable timing)
ALIP_PROBE_RETRY_CNT=2
Destination IP address=255.255.255.255

2. Message Type: ALIP_PROBE_CFM (0x0002)
A transmitter broadcasts this message in response to ALIP_PROBE_REQ. It allows a receiver to learn about the presence and properties of the transmitter. The parameters of this message are shown in FIG. 57. It is broadcasted because the transmitter does not know the IP address of the receiver.
Destination IP address=255.255.255.255

3. Message Type: ALIP_JOIN_REQ (0x0003)
The configuration of this message type is shown in FIG. 58. A receiver broadcasts this message to request to join the network. This message is broadcasted because the receiver may not have an IP address yet. If no response is received within the timeout period ALIP_JOIN REQ_TO, it retries for ALIP_JOIN_RETRY_CNT time(s). When retries fail, it regards the request failed.
ALIP_JOIN_REQ_TO=200 ms (or other suitable timing)
ALIP_JOIN_RETRY_CNT=2
Destination IP address=255.255.255.255

4. Message Type: ALIP_JOIN_CFM (0x0004)
The configuration of this message type is shown in FIG. 59. A transmitter broadcasts this message in response to ALIP_JOIN_REQ. This message is broadcast because the receiver may not have an IP address yet.
Destination IP address=255.255.255.255

5. Message Type: ALIP_POLL_REQ (0x0005)
The configuration of this message type is shown in FIG. 60. A receiver sends this message periodically (once every ALIP_POLL_PERIOD) to poll the transmitter in the network it has joined. If it does not receive a response within the timeout period ALIP_POLL_REQ_TO, it retries for ALIP_POLL_RETRY_CNT time(s). If a response is still not received after retries, the receiver detaches itself from the network.

Figure 62:
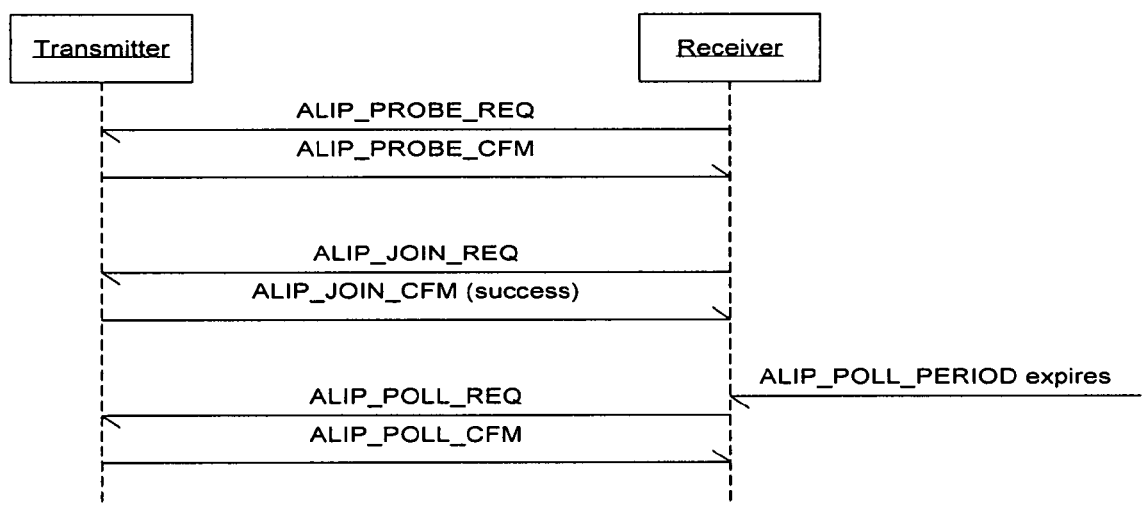
FIGS. 62-66 are example scenarios of ALIP message usages.

On the other hand, a transmitter uses this message to check if a receiver previously joined the network is active. If it does not receive this message from a receiver once in the period 2*ALIP_POLL_PERIOD, it detaches that receiver from the network.
ALIP_POLL_PERIOD=2 s (or other suitable timing)
ALIP_POLL_TIMEOUT=200 ms (or other suitable timing)
ALIP_POLL_RETRY_CNT=2 (or other suitable count)
Destination IP address=Transmitter IP address 6. Message Type: ALIP_POLL_CFM (0x0006)
The configuration of this message type is shown in FIG. 61. A transmitter sends this message as a response to ALIP_POLL_REQ from a receiver.
Destination IP address=Receiver IP address Using the above message types, a normal link establishment is shown in FIG. 62.

Figure 63:
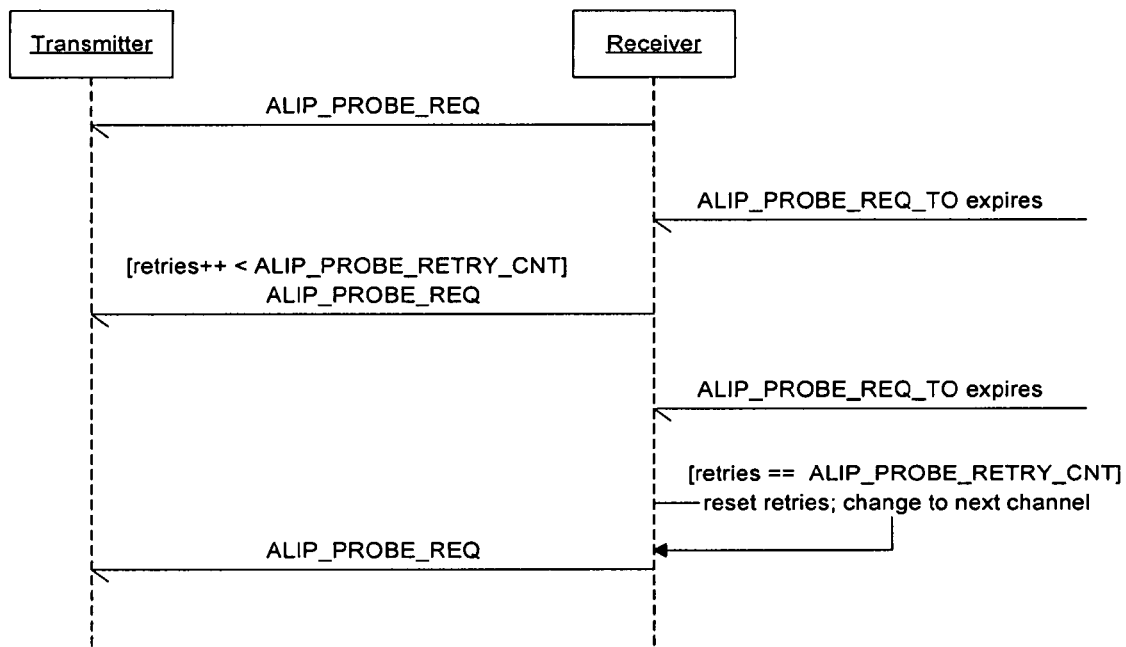

A scenario where the transmitter provides no response to a probe request is shown in FIG. 63.

Figure 64:
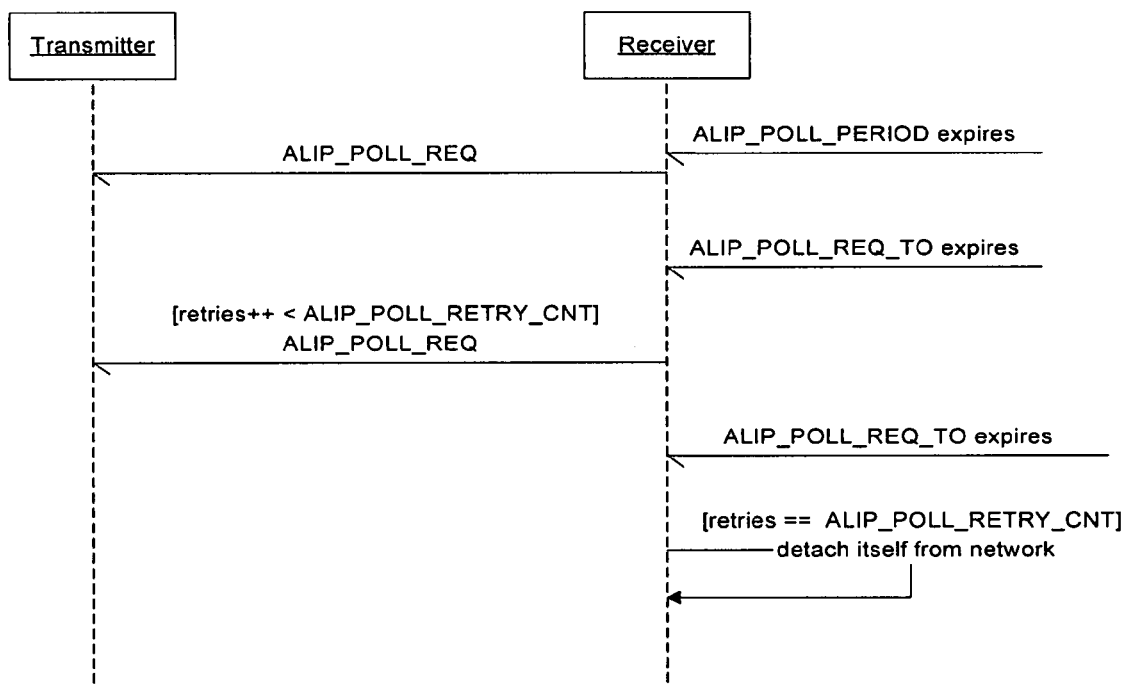

A scenario where the transmitter provides no response to a poll request is shown in FIG. 64.

Figure 65:
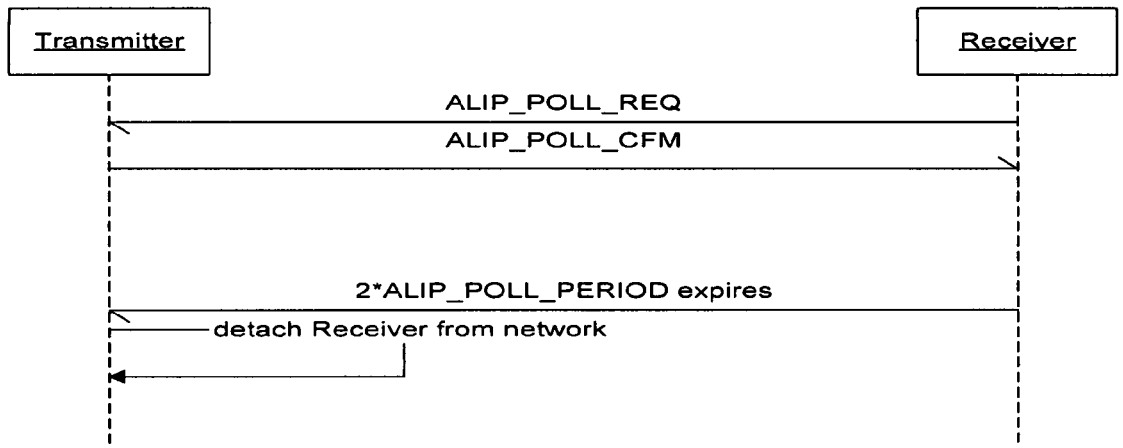

A scenario where the receiver provides no poll request is shown in FIG. 65.

Figure 66:
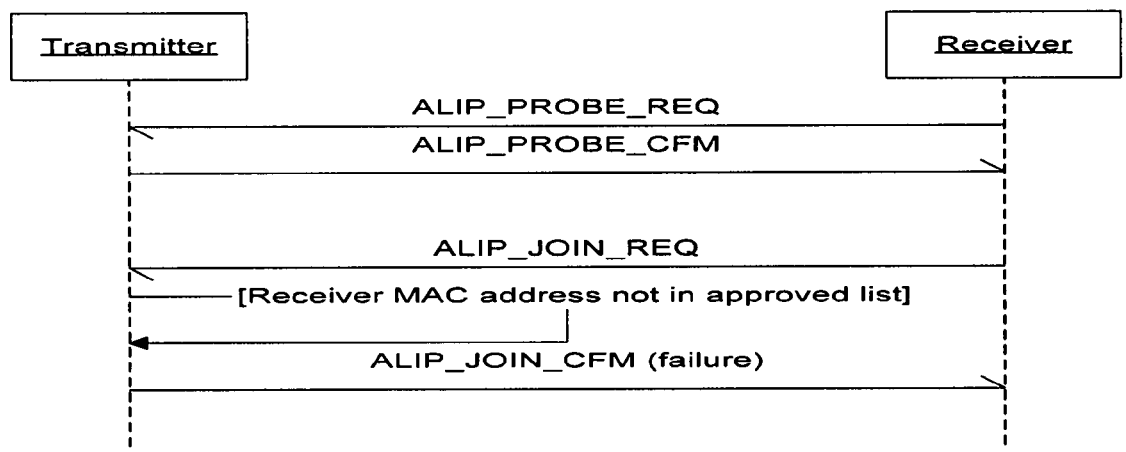

A scenario where a join request fails because a receiver MAC address is not approved is shown in FIG. 66.

Figure 67:
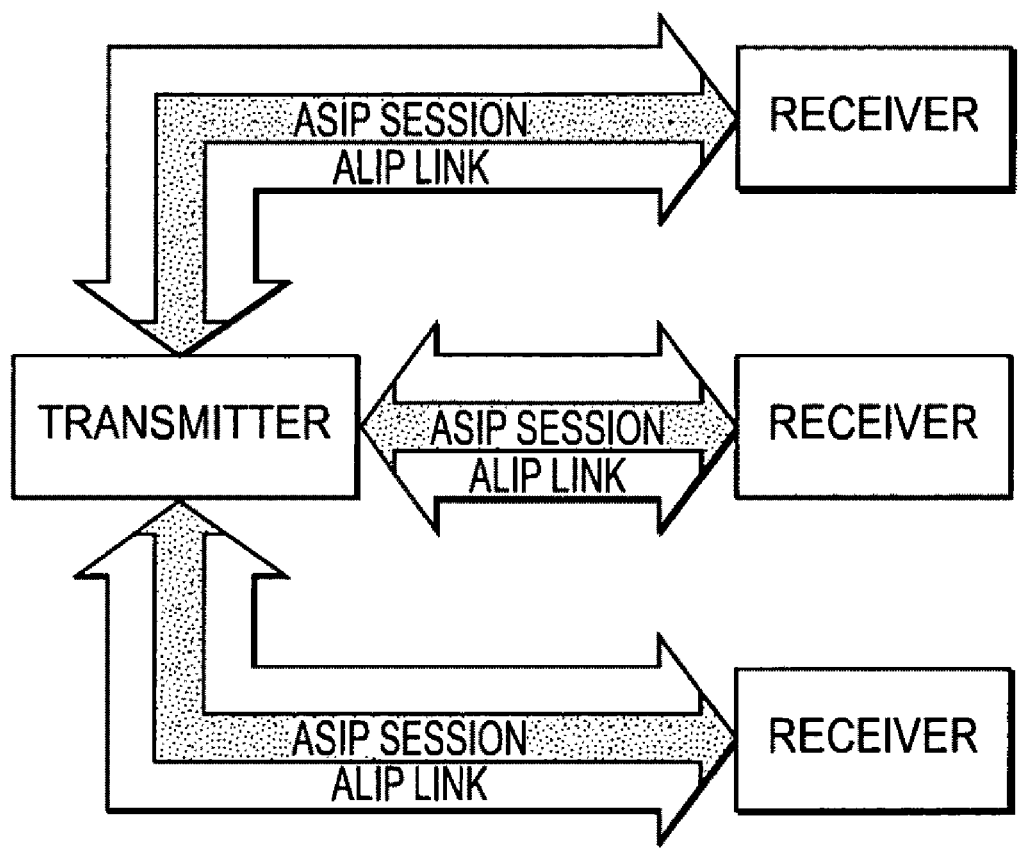
FIG. 67 is a schematic of example ASIP sessions.

This now describes the so-called Avocent Session Initiation Protocol (ASIP). ASIP is used to establish an audio-visual session between a transmitter and a receiver. It enables the receiver to receive and play back audio-visual data coming from the transmitter. If there are multiple receivers, there is one ASIP session between the transmitter and each receiver. The concept of ASIP sessions is illustrated in FIG. 67. ASIP messages are carried by TCP streams which provide reliability transport. TCP is possible because ASIP messages are unicast and the IP addresses of the transmitter and receiver in a session are known to each other (with thanks to ALIP).

The ASIP message format is as follows. Each ASIP message is made up of a header and a payload. The payload follows immediately after the header. All multi-byte fields are transmitted in network byte order (big-endian). The message header has a fixed length of 12 bytes and consists of the fields shown in FIG. 68.

The message payload contains fields specific to the message type. They are listed in the next section. Type codes are shown in the parentheses following the type names. The status codes are shown in FIG. 69 and are used in various ASIP messages to indicate either a reason for a request or the failure reason in a response.

1. Message Type: ASIP_INIT_SESS_REQ (0x0001)
The configuration of this message type is shown in FIG. 70. A receiver sends this message to initiate a session to play the default program source. If it does not receive the response within the timeout period ASIP_INIT_SESS_REQ_TO, it regards the request failed. After request failure, the retry strategy is application specific.
ASIP_INIT_SESS_REQ_TO=1 s
Destination IP address=Transmitter IP address The format of the 128-byte "EDID" field is defined in Section 3.1 (page 9 of 32) of "VESA Enhanced Extended Display Identification Data Standard Release A, Revision 1 Feb. 9, 2000" published by VESA (Video Electronics Standards Association).

The format of the 128-byte "EDID Extension" is defined in Section 7.5 (page 79 of 117) of "A DTV Profile for Uncompressed High Speed Digital Interfaces EIA/CEA-861-B May 2002" published by CEA (Consumer Electronics Association) and EIA (Electronic Industries Alliance).

2. Message Type: ASIP_INIT_SESS_CFM (0x0002)
The configuration of this message type is shown in FIG. 71. A transmitter sends this message to a receiver in response to ASIP_INIT_SESS_REQ. It carries time synchronization data, audio/video parameters and RTP settings for the receiver to configure itself for play-back. If not already started, play-back starts immediately after this message has been sent.

The format of the 15-byte AVI is defined in Section 6.1.3 (page 60 of 117) of "A DTV Profile for Uncompressed High Speed Digital Interfaces EIA/CEA-861-B May 2002" published by CEA and EIA. For reference, it is also listed in FIG. 72.

The format of the 12-byte AAI is defined in Section 6.3 (page 65 of 117) of "A DTV Profile for Uncompressed High Speed Digital Interfaces EIA/CEA-861-B May 2002" published by CEA and EIA. For reference, it is also listed in FIG. 73.

3. Message Type: ASIP_TEARDOWN_REQ (0x0003)

The configuration of this message type is shown in FIG. 74. A receiver sends this message to tear down an established ASIP session. If no response is received from the transmitter within the period ASIP_TEARDOWN_REQ_TO, it regards the request successful.

4. Message Type: ASIP_TEARDOWN_CFM (0x0004)

The configuration of this message type is shown in FIG. 75. A transmitter sends this message in response to ASIP_TEARDOWN_REQ. After receiving a teardown request, the transmitter removes the receiver from the active list. If there are no more active receivers, it stops the encoding hardware.

5. Message Type: ASIP_TEARDOWN_IND (0x0005)

The configuration of this message type is shown in FIG. 76. A transmitter sends this message to forcefully teardown a session with a receiver.

6. Message Type: ASIP_ANNOUNCE_IND (0x0006)

A transmitter sends this message to notify a receiver that an A/V source has become available. It awakes the receiver if it has entered the sleep state so that it may initiate a session again.

7. Message Type: ASIP_AUTH_REQ (0x0007)

A transmitter sends this message to request for HDCP authentication data of a receiver.

8. Message Type: ASIP_AUTH_CFM (0x0008)

The configuration of this message type is shown in FIG. 77. A receiver sends this message in response to ASIP_AUTH_REQ. It contains HDCP authentication data of the receiver. In case the receiver is an HDMI repeater, this message contains the authentication data of all HDMI sinks attached to it.

9. Message Type: ASIP_SDP_IND (0x0009)

The configuration of this message type is shown in FIG. 78. A transmitter sends this message to notify a receiver of the Source Product Description of the source.

The 28-byte SPD contains the fields shown in FIG. 79.

10. Message Type: ASIP_ISCR1_IND (0x000A)

The configuration of this message type is shown in FIG. 80. A transmitter sends this message to notify a receiver of the International Recording Code 1 of the current track.

The 18-byte ISRC1 contains the fields shown in FIG. 81.

11. Message Type: ASIP_ISCR2_IND (0x000B)

The configuration of this message type is shown in FIG. 82. A transmitter sends this message to notify a receiver of the International Recording Code 2 of the current track.

The 18-byte ISRC1 contains the fields shown in FIG. 83.

12. Message Type: ASIP_ACP_IND (0x000C)

The configuration of this message type is shown in FIG. 84. A transmitter sends this message to notify a receiver of the Audio Content Protection of the source.

The 30-byte ACP contains the fields shown in FIG. 85.

13. Message Type: ASIP_AVMUTE_IND (0x000D)

Figure 87:
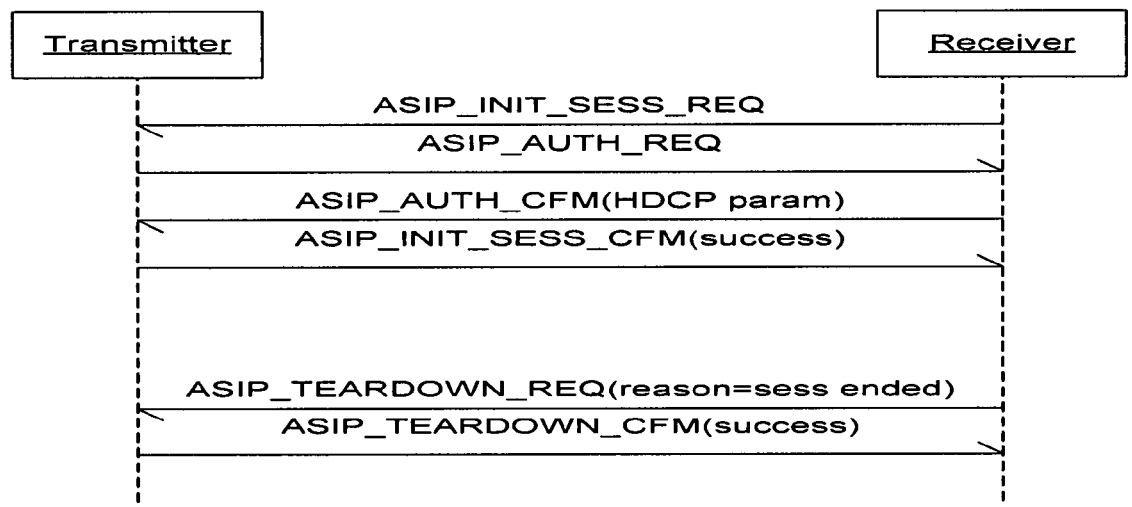
FIGS. 87-91 are example scenarios of ASIP sessions.

Using the above message types, a normal session establishment and tear down is shown in FIG. 87.

Figure 88:
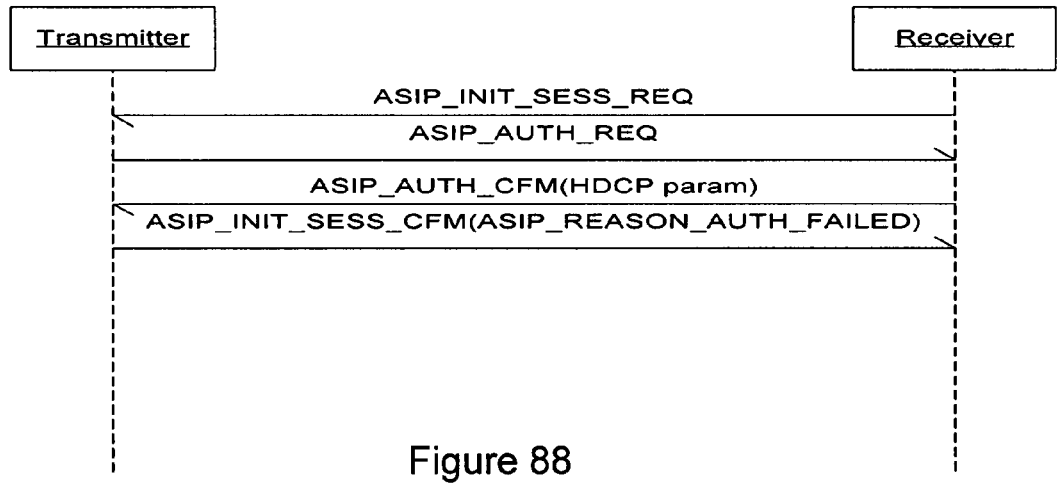

A scenario where there was authentication failure is shown in FIG. 88.

Figure 89:
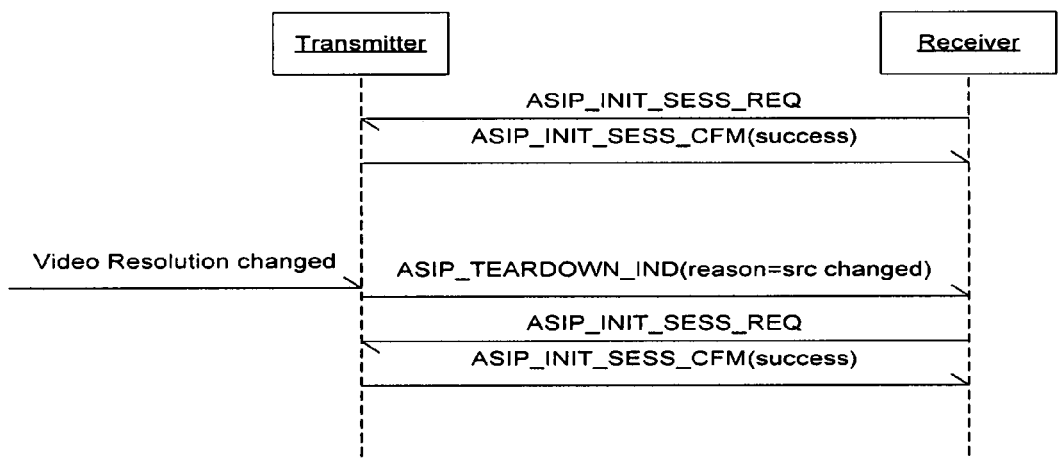
Figure 90:
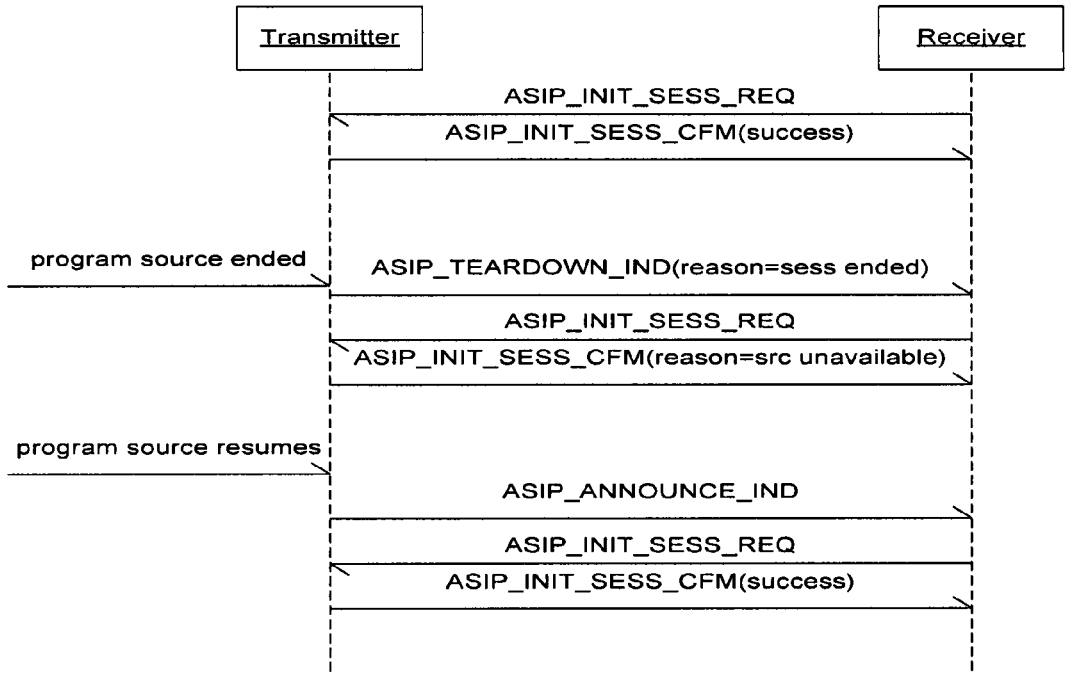

A scenario where a new session is established due to changes in the source is shown in FIG. 89.

A scenario where there is an interruption of the program source is shown in FIG. 65.

Figure 91:
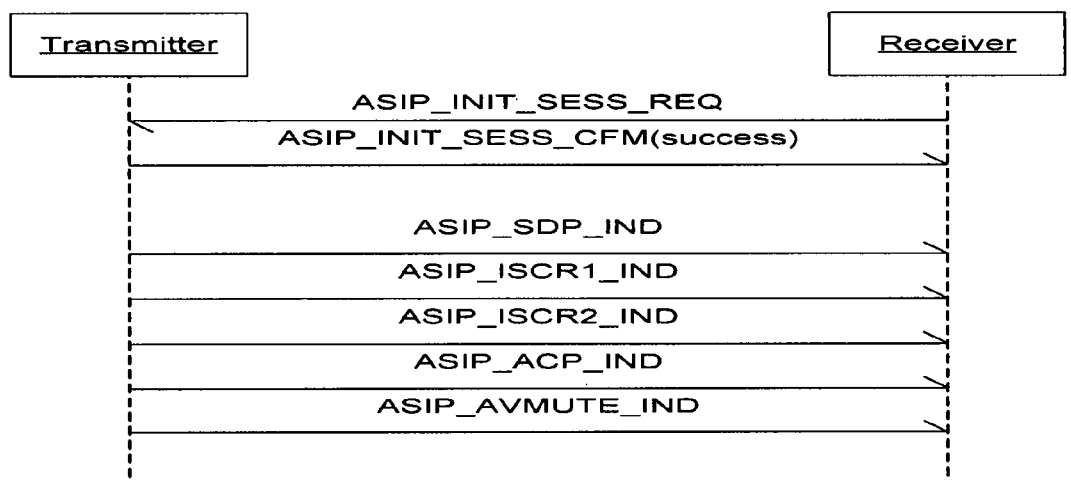

A scenario showing control messages in a session is shown in FIG. 91.

This now describes the real-time transport protocol (RTP) and real time transport control protocol (RTCP) employed by the present system 10. An RTP session is an association among a set of participants communicating with RTP. While RTP carries real-time data across the network, RTCP monitors the quality of service and conveys information about the participants in an on-going RTP session.

Figure 92:
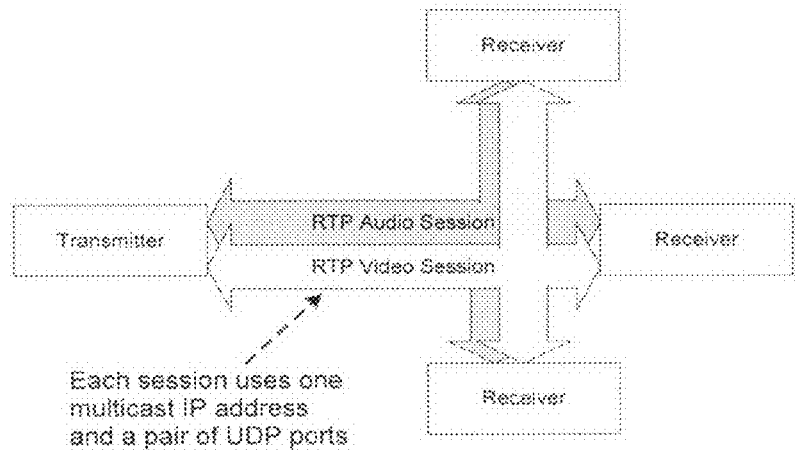
FIG. 92 is a schematic representation of example RTP audio and video sessions.

In this protocol, two RTP sessions are used, with one for audio data and the other for video data. All participants in each RTP session communicate using a multicast IP address and two adjacent UDP ports. The even (2n) port is used by RTP and the odd (2n+1) port is used by RTCP. The purpose of the Control Plane (ALIP and ASIP) is to establish the audio and video RTP sessions in the Data Plane. The concept of RTP sessions is illustrated in FIG. 92.

Figure 93:
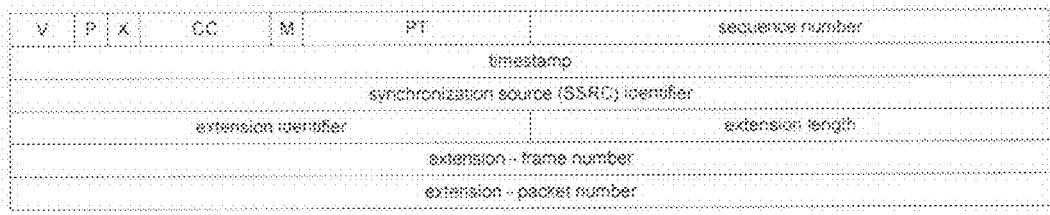

The format of the RTP header customized for this protocol is shown in FIG. 93 and the fields for the header are explained in FIG. 94.

Some custom RTCP packets are employed as well.

1. Custom Packet: Synchronization

Figure 95:
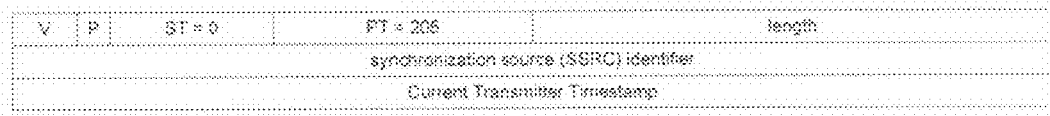

To synchronize the clocks between a transmitter and a receiver, the RTCP packet shown in FIG. 95 is used. A description of the fields is shown in FIG. 96. We define a custom packet instead of using the pre-defined Sender Report because the one we define is smaller and more efficient to process. The packet type (PT) of the custom RTCP packets is 205 and the subtype for Sync is 0.

2. Custom Packet: Retransmission

In order to support reliable multicast in RTP, the custom RTCP packets shown in FIG. 97 are defined. An explanation of the fields for Single NACKs is shown in FIG. 98 and for Sequential NACKs in FIG. 99. The packet type (PT) of the custom RTCP packets is 205 and the subtypes for. Single NACKs and Sequential NACKs are 1 and 2 respectively. Collectively, they are called NACKs.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for communicating high definition video, comprising:
a transmitter, including:
a video receiver to receive original video from a video source and to output information identifying the original video in a predetermined video format;
a transmitter-side bus;
a transmitter-side channel communicating with the transmitter-side bus;
a video encoder receiving the information identifying the original video in the predetermined video format from the video receiver and outputting new information identifying the original video in a compressed format;
a transmitter-side programmed logic device receiving the new information identifying the original video in the compressed format, time-stamping the new information identifying the original video in the compressed format by placing a time-stamp in an associated packet header, and placing the time-stamped new information identifying the original video in the compressed format onto the transmitter-side bus and to the transmitter-side channel; and a transmitter-side clock producing clock information communicated to the transmitter-side bus, the clock information being periodically packeted as control information and provided to the transmitter-side channel;

multiple receivers to simultaneously communicate with the transmitter, each including:

a receiver-side bus;

a receiver-side channel communicating with the receiver-side bus and with the transmitter-side channel asynchronously as to the others of the multiple receivers, the receiver-side channel to receive the new information identifying the original video in the compressed format from the transmitter-side channel and to place the new information identifying the original video in the compressed format onto the receiver-side bus;

a receiver-side clock periodically calibrated to the transmitter-side clock using the clock information packeted as control information and provided to the receiver-side channel via the transmitter-side channel;

a receiver-side programmed logic device to read the new information identifying the original video in the compressed format from the receiver-side bus, reading the time-stamping of the new information identifying the original video in the compressed format, and (1) if the time-stamping information of the new information is larger than the receiver-side clock, buffering the new information identifying the original video in the compressed format and (2) if the time-stamping information of the new information is smaller than the receiver-side clock, discarding the new information identifying the original video in the compressed format;

a video decoder receiving the buffered new information identifying the original video in the compressed format from the receiver-side programmed logic device and decompressing the new information into a decoded format of information identifying the original video;

a high definition display port for communication with a high definition display; and a video transmitter to receive the decoded format of information identifying the original video, to convert the decoded format of information identifying the original video to a high definition format of information identifying the original video, and outputting the high definition format of information identifying the original video to the high definition display port.

2. A system according to claim 1, wherein the transmitter-side and receiver-side channels are wireless channels.

3. A system according to claim 1, wherein the transmitter-side and receiver-side channels are packet-switched network ports.

4. A system according to claim 1, wherein:

the transmitter has an assigned unique address associated with the transmitter-side channel and each receiver has an assigned unique address associated with its receiver channel, the transmitter packets the time-stamped new information identifying the original video in the compressed format and addresses the packeted time-stamped new information identifying the original video in the compressed format to selected ones of the receiver channels.

5. A system according to claim 1, wherein the transmitter has a transmitter-side packet-switched network port communicating with the transmitter-side programmed logic device, and each receiver has a receiver-side packet-switched network port communicating with the receiver-side programmed logic device, the transmitter-side programmed logic device and each receiver-side programmed logic device providing users with Web pages via, respectively, the transmitter-side packet-switched network port and each receiver-side packet-switched network port, the Web pages providing the user with executable configuration options for the system.

6. A system according to claim 1, wherein the transmitter-side programmed logic device and the receiver-side programmed logic device each include an operating system with bus support for respectively, the transmitter-side bus and receiver side bus; network stacks; channel drivers for, respectively, the transmitter-side channel and receiver-side channel; and a Web server.

7. A system according to claim 1, wherein the video source provides consumer electronics control codes, and the transmitter provides the consumer electronics control codes to selected ones of the multiple receivers via one of an Ethernet channel or a wireless channel.

8. A system according to claim 7, wherein the transmitter provides the consumer electronics control codes to the selected ones of the multiple receivers without modification.

9. A system according to claim 7, wherein the transmitter provides the consumer electronics control codes to the selected ones of the multiple receivers from the transmitter-side channel to the receiver-side channel.

10. A system according to claim 1, wherein the transmitter has an infrared transceiver and the transmitter provides infrared transceiver codes to selected ones of the multiple receivers.

11. A system according to claim 10, wherein the transmitter provides the infrared transceiver codes to selected ones of the multiple receivers from the transmitter-side channel to the receiver-side channel.

12. A system according to claim 1, wherein the transmitter further receives audio corresponding to the original video, the transmitter-side programmed logic device transmitting the audio information corresponding to the audio after time-stamping the audio information, the receiver-side programmed logic device receiving the audio information and extracting the time-stamping of the audio information, and the receiver further outputting the audio synchronized to the output of the original video based on the time-stamping of the audio information and the time-stamping of the time-stamped new information identifying the original video.

13. A system according to claim 12 wherein the receiver further outputs the audio synchronized to the output of the original video based on the time-stamping of the audio information with respect to a particular frame, the time-stamping of the time-stamped new information identifying the original video with respect to the particular frame, and the receiver-side clock.

14. A system according to claim 1, wherein the receiver-side programmed logic devices of the multiple receivers read the new information identifying the original video in the compressed format from corresponding ones of the receiver-side buses, read the time-stamping of the new information, and using the time-stamping of the new information effectively synchronize themselves relative to each other and to the transmitter.

15. A system according to claim 12, wherein each of the multiple receivers provides audio playback delay for the audio information and, independently of the audio playback delay, video playback delay for the original video.

16. A method of communicating media information, comprising:
- receiving video information from a video source;
- receiving audio information corresponding to the video information from an audio source;
- packeting the video information;
- packeting the audio information;
- adding a header to the packeted video information with time-stamp information;
- adding a header to the packeted audio information with time-stamp information;
- packeting control codes for at least one of the audio and video information;
- transmitting the packeted video information with corresponding time-stamp information, packeted audio information with corresponding time-stamp information, packeted control codes, and a transmission-side clock to multiple receivers;
- simultaneously at the multiple receivers receiving the transmitting the packeted video information with corresponding time-stamp information, packeted audio information with corresponding time-stamp information, packeted control codes, and a transmission-side clock;
- using the transmitted transmission-side clock, independently synchronizing the video information to the audio information using the corresponding time-stamp information of the packet video information and the corresponding time-stamp information of the audio video information;
- in each of the multiple receivers, reproducing on associated visible media the synchronized video information and in associated audible media the synchronized audio information and, using the transmitted transmission-side clock, effectively synchronizing the reproductions of the synchronized video information and synchronized audio information among the multiple receivers.

17. A method according to claim 16, wherein the steps of transmitting and simultaneously receiving are performed wirelessly.

18. A method according to claim 16, wherein the control codes are consumer electronics control codes, and wherein the consumer electronics control codes are packeted for transmission without modification.

19. A method according to claim 16, wherein the control codes are infrared transceiver codes, and wherein the infrared transceiver codes are packeted for transmission without modification.

20. A method according to claim 16, wherein the step of transmitting includes the step of uniquely addressing the packeted video information, packeted audio information, packeted control codes, and transmission-side clock to the multiple receivers.

* * * * *